US010810241B2

(12) United States Patent
Hughes et al.

(10) Patent No.: US 10,810,241 B2
(45) Date of Patent: Oct. 20, 2020

(54) ARRANGEMENTS OF DOCUMENTS IN A DOCUMENT FEED

(71) Applicant: Apple Inc., Cupertino, CA (US)

(72) Inventors: Dominic J. Hughes, Cupertino, CA (US); Steve E. Marmon, Mountain View, CA (US); Chi Wai Lau, Santa Clara, CA (US)

(73) Assignee: Apple, Inc., Cupertino, CA (US)

( * ) Notice: Subject to any disclaimer, the term of this patent is extended or adjusted under 35 U.S.C. 154(b) by 30 days.

(21) Appl. No.: 15/274,161

(22) Filed: Sep. 23, 2016

(65) Prior Publication Data

US 2017/0357619 A1 Dec. 14, 2017

Related U.S. Application Data

(60) Provisional application No. 62/369,171, filed on Jul. 31, 2016, provisional application No. 62/363,822,
(Continued)

(51) Int. Cl.

| G06F 16/30 | (2019.01) |
| G06F 16/34 | (2019.01) |
| G06F 16/35 | (2019.01) |
| G06F 16/93 | (2019.01) |
| G06F 16/951 | (2019.01) |
| G06F 16/901 | (2019.01) |
| G06F 40/106 | (2020.01) |
| G06F 40/186 | (2020.01) |
| G06F 3/0482 | (2013.01) |
| G06F 3/0485 | (2013.01) |
| G06F 3/0488 | (2013.01) |
| G06Q 30/02 | (2012.01) |

(Continued)

(52) U.S. Cl.
CPC .......... *G06F 16/345* (2019.01); *G06F 3/0481* (2013.01); *G06F 3/0482* (2013.01); *G06F 3/0485* (2013.01); *G06F 3/0488* (2013.01); *G06F 16/35* (2019.01); *G06F 16/9024* (2019.01); *G06F 16/93* (2019.01); *G06F 16/951* (2019.01); *G06F 40/106* (2020.01); *G06F 40/186* (2020.01); *G06K 9/00463* (2013.01); *G06Q 30/0277* (2013.01); *G06K 9/00469* (2013.01)

(58) Field of Classification Search
CPC .......... G06F 16/20; G06F 16/30; G06F 17/20; G06F 17/30; G06F 3/048
See application file for complete search history.

(56) References Cited

U.S. PATENT DOCUMENTS

| 7,640,516 B2 | 12/2009 | Atkins |
| 7,788,579 B2 | 8/2010 | Berkner et al. |
| | | (Continued) |

FOREIGN PATENT DOCUMENTS

| WO | 2014005231 A1 | 1/2014 |

*Primary Examiner* — Sanchita Roy
(74) *Attorney, Agent, or Firm* — Fletcher Yoder P.C.

(57) ABSTRACT

Some embodiments provide a GUI for a document reader application that displays an aggregated feed with sections for different groups of personalized documents. Some embodiments provide a method for arranging documents within the different sections and for ordering the different sections within the aggregated feed. In some embodiments, the groups are dynamically generated at a device based on content (e.g., tags) of the documents.

20 Claims, 31 Drawing Sheets

Related U.S. Application Data filed on Jul. 18, 2016, provisional application No. 62/349,028, filed on Jun. 12, 2016.

(51) Int. Cl.
   *G06F 3/0481* (2013.01)
   *G06K 9/00* (2006.01)

(56) References Cited

U.S. PATENT DOCUMENTS

| | | | |
|---|---|---|---|
| 8,291,314 B2 | 10/2012 | Atkins | |
| 8,327,262 B2 | 12/2012 | Tarumi | |
| 8,332,439 B2 | 12/2012 | Marvit et al. | |
| 8,665,294 B2 | 3/2014 | Hirooka | |
| 9,152,292 B2 | 10/2015 | Xiao et al. | |
| 9,396,167 B2 | 7/2016 | Doll et al. | |
| 2005/0055635 A1 | 3/2005 | Bargeron et al. | |
| 2005/0210399 A1 | 9/2005 | Filner et al. | |
| 2006/0150092 A1* | 7/2006 | Atkins | G06Q 10/043 |
| | | | 715/251 |
| 2006/0242140 A1* | 10/2006 | Wnek | G06F 16/355 |
| 2007/0300152 A1 | 12/2007 | Baugher | |
| 2008/0117448 A1 | 5/2008 | Ijams et al. | |
| 2008/0155473 A1 | 6/2008 | Duhig | |
| 2009/0049380 A1 | 2/2009 | Rehling et al. | |
| 2010/0191741 A1* | 7/2010 | Stefik | G06F 16/3328 |
| | | | 707/748 |
| 2011/0179020 A1* | 7/2011 | Ozzie | G06F 17/3089 |
| | | | 707/723 |
| 2011/0202834 A1 | 8/2011 | Mandryk et al. | |
| 2011/0289088 A1 | 11/2011 | Yarin et al. | |
| 2012/0016877 A1* | 1/2012 | Vadrevu | G06F 17/30696 |
| | | | 707/737 |
| 2013/0198661 A1 | 8/2013 | Matas | |
| 2013/0332523 A1* | 12/2013 | Luu | G06Q 30/0251 |
| | | | 709/204 |
| 2013/0339840 A1 | 12/2013 | Jain et al. | |
| 2014/0075275 A1 | 3/2014 | Aleksandrovsky et al. | |
| 2014/0089777 A1 | 3/2014 | Roiniotis et al. | |
| 2014/0115432 A1 | 4/2014 | Turner | |
| 2014/0143259 A1* | 5/2014 | Jain | G06F 17/30864 |
| | | | 707/748 |
| 2014/0156681 A1 | 6/2014 | Lee et al. | |
| 2014/0207860 A1* | 7/2014 | Wang | H04L 65/403 |
| | | | 709/204 |
| 2014/0258849 A1 | 9/2014 | Chung et al. | |
| 2015/0019943 A1 | 1/2015 | Ying et al. | |
| 2015/0040043 A1 | 2/2015 | Sakhardande et al. | |
| 2015/0074518 A1 | 3/2015 | Rumsey et al. | |
| 2015/0100922 A1 | 4/2015 | Lefebvre | |
| 2015/0262069 A1* | 9/2015 | Gabriel | G06F 17/30867 |
| | | | 706/48 |
| 2015/0286711 A1 | 10/2015 | Chin et al. | |
| 2015/0331575 A1 | 11/2015 | Fernandez-Ruiz | |
| 2015/0363407 A1* | 12/2015 | Huynh | H04W 4/21 |
| | | | 707/738 |
| 2016/0012019 A1 | 1/2016 | Bagwell et al. | |
| 2016/0012053 A1 | 1/2016 | Weening et al. | |
| 2016/0224557 A1 | 8/2016 | Chi et al. | |

\* cited by examiner

501

502

503

601

602

603

ARRANGEMENTS OF DOCUMENTS IN A DOCUMENT FEED

BACKGROUND

Document readers are often used for viewing electronic documents, such as digital articles or webpages, on a device. The digital articles are often personalized (e.g., selected based on user preferences) from various sources or publishers, and related to a variety of different topics. Some document readers provide an aggregated feed that displays summaries for the assortment of personalized documents for viewing by the user. However, an unorganized display of such a wide variety of different articles can be difficult to navigate and to read.

BRIEF SUMMARY

Some embodiments provide a document reader application (also referred to as a document viewing application) for viewing and navigating between documents from a variety of different sources and related to a variety of different topics. The document reader application of some embodiments collects documents (e.g., magazine articles, web blog posts, word processing documents, slides of a presentation, etc.) from the variety of different sources (e.g., websites, magazine publishers, newspapers, etc.).

The document reader application of some embodiments includes a graphical user interface (GUI) that presents document panes (e.g., visual summaries) for documents of an aggregated feed in a display area of a device. The aggregated feed includes common documents (e.g., curated content, advertisements, trending stories, curated topics, etc.), which are not selected based on preferences of a user, and personalized documents, which are selected based on user preferences (e.g., favorite sources, favorite topics, reading habits, etc.).

In some embodiments, the personalized documents are received from a server and dynamically grouped into various document groups at the device on which the document reader application executes. The dynamic grouping of some embodiments is performed based on a topic associated with each group. The topics of some embodiments are identified based on an analysis of the received personalized documents (e.g., through an analysis of tags associated with the documents).

The GUI of some embodiments displays the common and personalized documents in various sections of the aggregated feed. In some embodiments, the GUI includes at least one common section that displays document panes for common documents and several group sections for the personalized documents. Each group section displays a set of document panes for a corresponding group of personalized documents. The group sections of some embodiments display various controls for interacting with the group. For example, some embodiments of the group sections provide a user interface (UI) control for displaying additional documents related to a corresponding topic associated with a particular section. In some embodiments, the GUI also provides a UI control for adding the corresponding topic to a list of favorite topics associated with the user. In some embodiments, the GUI also displays an ungrouped section that displays document panes for a set of personalized documents that are not grouped with any other personalized documents. The aggregated feed of some embodiments intersperses common sections between the group sections.

The common sections of some embodiments are displayed with a different appearance (e.g., color, format, etc.) from that of the group sections.

The GUI of some embodiments also displays at least one featured section for displaying document panes for a set of featured documents. The featured documents of some embodiments include premium content specified by the publishers of the content, content that requires a subscription, curated and high-quality content, etc. In some embodiments, the featured section displays (or emphasizes) a single featured document at a time, and displays the documents by animating transitions between document panes for the featured documents. In some embodiments, the document pane for at least one featured document includes a multi-layer image, and animating the transition creates a parallax effect using the different layers of the multi-layer image. In some embodiments, the document panes for the featured documents are based on images associated with the featured document and sized according to various aspect ratios (e.g., 3:4, 4:3, 1:1, etc.) of the associated image.

In some embodiments, the GUI arranges group sections along a first dimension of the display area of the device, while displaying document panes for featured documents of the featured section along a different, second dimension in the display area. For example, in some embodiments, the first dimension is a vertical dimension and the second dimension is a horizontal dimension.

In some embodiments, the GUI initially presents a set of common sections for display while performing the dynamic grouping of the personalized documents. The group sections for the grouped personalized documents are then displayed upon receiving input (e.g., through a swipe motion) to navigate through the documents of the aggregated feed.

The document reader application of some embodiments will provide different groups for the personalized documents depending on the amount of time before the input is received. In some embodiments, when the input is received before an acceptable grouping is completed, a subset of the personalized documents are presented in an ungrouped layout, providing the user with personalized content to review, while still attempting to dynamically generate group sections for the remaining personalized documents.

Some embodiments provide a method for arranging and displaying document panes for documents in sections of a display layout. The method identifies several dynamically grouped document groups, and, for each document group, arranges document panes for the documents of the document group in a section of the display layout. Each section, in some embodiments, includes a single head subsection and zero or more body subsections. The head subsection of some embodiments displays a primary document pane for a primary document. In some embodiments, the primary document pane is the largest document pane in the section and is displayed with a special color scheme that is different from color schemes of the secondary document panes. The primary document pane of some embodiments is the only document pane to display excerpt (or summary) text.

In some embodiments, the method arranges document panes using a set of static templates. The method of some embodiments selects the templates from different sets of templates, based on a size or resolution of the display area. The static templates of some embodiments include a set of head templates for a head subsection and a set of body templates for body subsections. Some of the head templates further display secondary document panes along with the primary document pane. In some embodiments, a head template can span two primary document panes. The templates of some embodiments are selected based on various criteria (e.g., number of documents in the document group, transitions (or alignment) of portions of the different templates, etc.).

In some embodiments, the primary document for the primary document pane is identified based on a set of relevance scores, but the remaining documents are positioned within the templates of the head and body subsections based on visual scores calculated for the documents of the group. The visual score of some embodiments is calculated based on elements of the document pane (e.g., whether it has an image, a short or long headline, etc.).

In some embodiments, the method generates multiple layouts for a section and determines whether to use a layout based on a set of scores calculated for the section. In some embodiments, the method evaluates the layout of each section (e.g., determining how well the different elements fit together). Alternatively, or conjunctively, the method evaluates the layout of each section relative to the surrounding sections. For example, the method of some embodiments provides a lower score for a section layout that reuses a particular head template in consecutive sections. In some embodiments, the method generates the multiple layouts for a specified period of time, or a specified number of times, and then selects the highest scoring layout. The method of some embodiments performs a single-pass selection method that evaluates the section layout as it is generated, and does not generate multiple different layouts for a single section.

As mentioned, some embodiments display documents that are dynamically arranged in groups below the common content (e.g., top stories, trending content, etc.). In some embodiments, the device receives a number of documents (e.g., new documents since the last time the user has viewed the document feed) and dynamically arranges these documents into groups. The documents as received are assigned one or more tags that each indicate relevancy to a topic, and these tags are used for the groups in some embodiments. Of all the possible tags that are assigned to the received documents, the device identifies some or all of the tags for use in grouping the documents. The device then dynamically assigns the documents to groups for at least a subset of these identified grouping tags. In some embodiments, this dynamic grouping involves iteratively selecting tags and assigning some or all of the documents assigned that tag to a group for the tag, then removing the assigned documents for the next iteration. With the documents assigned to groups, the device adds the groups of documents to the feed (e.g., below the trending topics). In some embodiments, documents that are not assigned to any group are displayed below the groups in the feed.

In some embodiments, the device receives a set of documents that are new since the last time the feed was accessed. This may be a large number of documents, and the device then selects a subset of these documents according to a personalization algorithm in some embodiments (that personalizes the feed according to past history and/or specified preferences of the user of the device). Some embodiments select up to a fixed number of documents using the personalization algorithm (e.g., 25, 60, 100, etc.).

Each of the selected documents (and the unselected documents, for that matter) are assigned zero or more tags, which in some embodiments identify that the document relates to a particular topic. In some embodiments, the tag assignment is performed by the servers that amalgamate the documents and distribute the documents to the user devices. In general, documents will have more than one tag, as the tags may range from specific (e.g., a specific person) to general (a high-level topic such as politics, sports, etc.). Of all the tags that are assigned to at least one document, some embodiments identify a set of the tags to use for grouping (referred to as groupable tags) based on a set of criteria. For instance, some embodiments require that the tag be assigned to a minimum number of documents to form an aesthetic group in the feed (e.g., 3, 5, etc.). Alternatively, or in addition, some embodiments select tags from a "whitelist" (i.e., a set of tags defined for use in grouping). This whitelist may be predefined in the code of the device, or updated by the set of servers as different topics become more popular within the articles provided by the set of servers. In some embodiments, the whitelist primarily contains more general tags for high-level topics in favor of very specific tags.

With the groupable tags identified, the device dynamically assigns the documents to groups. In some embodiments, the device iteratively selects a tag to use to form a group, identifies one or more potential groups of documents for the tag (out of all of the documents that are assigned the tag), uses a set of heuristics to select one of the identified potential groups, and assigns the documents in the selected potential group to a group for the selected tag. The device then removes the documents in the selected group for the next iteration. In some embodiments, the goal of the iterative process is to minimize the number of documents that are left unassigned to any group. In assigning documents to groups, some embodiments ensure that each group has at least a minimum number of documents (e.g., 3, 5, etc.) and no more than a maximum number of documents (e.g., 10, 12, 20, etc.), in order to form aesthetic groupings.

One aspect of this iterative process is that the selection of documents for a tag in a first iteration will affect which tag is selected in the next iteration (and in subsequent iterations). That is, in some cases, selecting a first group of documents for a first tag results in the device selecting a second tag in the next iteration of the process, whereas selecting a second group of documents for the first tag results in the device selecting a third tag in the next iteration of the process rather than the second tag. This result occurs because documents may be assigned multiple groupable tags, and assigning a document to a group for a first one of its tags means that it will not be assigned to a group for any of its other tags.

Different embodiments may use different criteria at various decision points in the process. For instance, to determine which tag should be used for a group at a particular iteration of the process, some embodiments use as criteria the number of documents for which the tag is the only assigned tag (referred to as "solos") and the number of documents overall that are assigned the tag. (e.g., preferring tags with a larger numbers of solos, using overall size for the tag as a tiebreaker). Further ties may be broken by a random selection in some embodiments.

Once a tag is chosen for a particular iteration, some embodiments identify a set of potential groupings of the documents for the tag, with each potential group including all of the solos for the group (unless the number of solos is larger than the maximum number in a group). For each potential group, the process calculates a short-term impact score, such as the number of documents that would remain that no longer have any tags for which there are the minimum number of documents for a group (referred to as "orphans"). For example (assuming a minimum number of three documents per group), if three documents are assigned tag A, but one of these documents is then assigned to a group for tag B, this will leave only two remaining documents for tag A. If these documents are not assigned tags for any other groups, then at this point they will not be able to be assigned to a valid group, and are thus orphans. As mentioned, some embodiments calculate an initial score for each potential group that identifies the short-term impact in terms of the number of orphans created by the group.

Some embodiments then select the top potential group for the iteration based on this short-term impact evaluation (e.g., choosing one of the potential groups randomly if there is a tie), and commit that group (thereby removing the selected documents for the next iteration). Some embodiments, however, identify more than one of the top potential groups based on the short-term impact, and compute a longer-term impact heuristic for each of these groups. For the longer-term impact heuristic, some embodiments use a greedy algorithm that approximates the rest of the groupings and identifies a number of orphans that result. Of these potential groups, the process selects the group with the best longer-term heuristic score (again choosing randomly in case of a tie) and commits the group.

Because the processing may be time-constrained (the groups need to be determined before the user scrolls past the initial static content), some embodiments initially use only the short-term impact evaluation when iterating through the grouping process. If additional time is available, the process re-evaluates the entire set of groups by identifying more potential groups for longer-term impact evaluation at each iteration, in order to identify groups that leave fewer of the documents unassigned. Some embodiments continue to increase the number of potential groups for which the longer-term impact is calculated until time runs out (because the user has scrolled past the static content) or until a pre-set maximum number of evaluations is reached.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
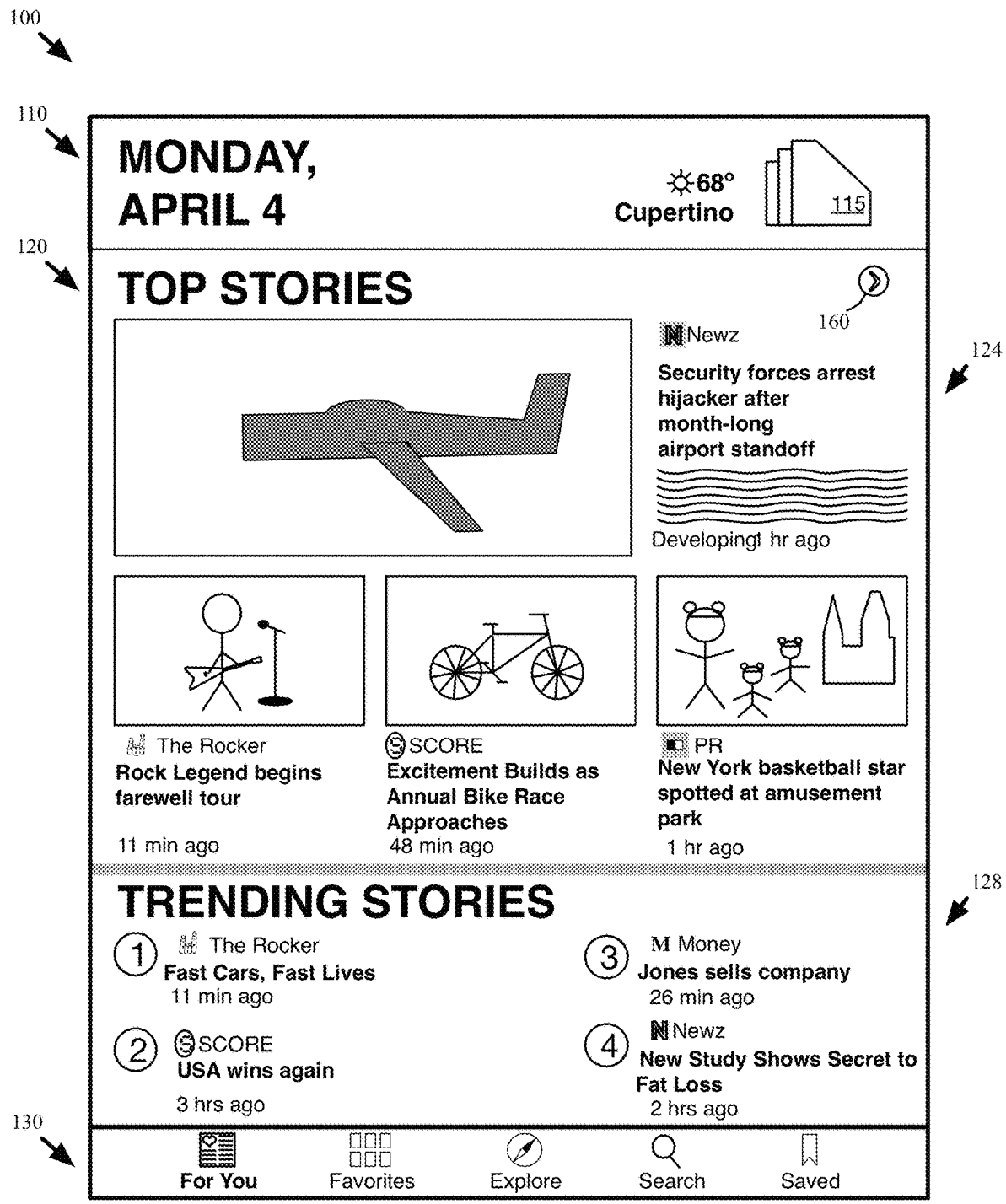
FIG. 1 illustrates an example of a GUI for a document reader application that displays sections of common content.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a document reader application (also referred to as a document viewing application) for viewing and navigating between documents from a variety of different sources and related to a variety of different topics. The document reader application of some embodiments collects documents (e.g., magazine articles, web blog posts, word processing documents, slides of a presentation, etc.) from the variety of different sources (e.g., websites, magazine publishers, newspapers, etc.).

The document reader application of some embodiments includes a graphical user interface (GUI) that presents document panes (e.g., visual summaries) for documents of an aggregated feed in a display area of a device. The aggregated feed includes common documents (e.g., curated content, advertisements, trending stories, curated topics, etc.), which are not selected based on preferences of a user, and personalized documents, which are selected based on user preferences (e.g., favorite sources, favorite topics, reading habits, etc.).

In some embodiments, the personalized documents are received from a server and dynamically grouped into various document groups at the device on which the document reader application executes. The dynamic grouping of some embodiments is performed based on a topic associated with each group. The topics of some embodiments are identified based on an analysis of the received personalized documents (e.g., through an analysis of tags associated with the documents).

The GUI of some embodiments displays the common and personalized documents in various sections of the aggregated feed. In some embodiments, the GUI includes at least one common section that displays document panes for common documents and several group sections for the personalized documents. Each group section displays a set of document panes for a corresponding group of personalized documents. The group sections of some embodiments display various controls for interacting with the group. For example, some embodiments of the group sections provide a user interface (UI) control for displaying additional documents related to a corresponding topic associated with a particular section. In some embodiments, the GUI also provides a UI control for adding the corresponding topic to a list of favorite topics associated with the user. In some embodiments, the GUI also displays an ungrouped section that displays document panes for a set of personalized documents that are not grouped with any other personalized documents. The aggregated feed of some embodiments intersperses common sections between the group sections. The common sections of some embodiments are displayed with a different appearance (e.g., color, format, etc.) from that of the group sections.

The GUI of some embodiments also displays at least one featured section for displaying document panes for a set of featured documents. The featured documents of some embodiments include premium content specified by the publishers of the content, content that requires a subscription, curated and high-quality content, etc. In some embodiments, the featured section displays (or emphasizes) a single featured document at a time, and displays the documents by animating transitions between document panes for the featured documents. In some embodiments, the document pane for at least one featured document include a multi-layer image and animating the transition creates a parallax effect using the different layers of the multi-layer image. In some embodiments, the document panes for the featured documents are based on images associated with the featured document and sized according to various aspect ratios (e.g., 3:4, 4:3, 1:1, etc.) of the associated image.

In some embodiments, the GUI arranges group sections along a first dimension of the display area of the device, while displaying document panes for featured documents of the featured section along a different, second dimension in the display area. For example, in some embodiments, the first dimension is a vertical dimension and the second dimension is a horizontal dimension.

In some embodiments, the GUI initially presents a set of common sections for display while performing the dynamic grouping of the personalized documents. The group sections for the grouped personalized documents are then displayed upon receiving input (e.g., through a swipe motion) to navigate through the documents of the aggregated feed.

The document reader application of some embodiments will provide different groups for the personalized documents depending on the amount of time before the input is received. In some embodiments, when the input is received before an acceptable grouping is completed, a subset of the personalized documents are presented in an ungrouped layout, providing the user with personalized content to review, while still attempting to dynamically generate group sections for the remaining personalized documents.

Some embodiments provide a method for arranging and displaying document panes for documents in sections of a display layout. The method identifies several dynamically grouped document groups, and, for each document group, arranges document panes for the documents of the document group in a section of the display layout. Each section, in some embodiments, includes a single head subsection and zero or more body subsections. The head subsection of some embodiments displays a primary document pane for a primary document. In some embodiments, the primary document pane is the largest document pane in the section and is displayed with a special color scheme that is different from color schemes of the secondary document panes. The primary document pane of some embodiments is the only document pane to display excerpt (or summary) text.

In some embodiments, the method arranges document panes using a set of static templates. The method of some embodiments selects the templates from different sets of templates, based on a size or resolution of the display area. The static templates of some embodiments include a set of head templates for a head subsection and a set of body templates for body subsections. Some of the head templates further display secondary document panes along with the primary document pane. In some embodiments, a head template can span two primary document panes. The templates of some embodiments are selected based on various criteria (e.g., number of documents in the document group, transitions (or alignment) of portions of the different templates, etc.).

In some embodiments, the primary document for the primary document pane is identified based on a set of relevance scores, but the remaining documents are positioned within the templates of the head and body subsections based on visual scores calculated for the documents of the group. The visual score of some embodiments is calculated based on elements of the document pane (e.g., whether it has an image, a short or long headline, etc.).

In some embodiments, the method generates multiple layouts for a section and determines whether to use a layout based on a set of scores calculated for the section. In some embodiments, the method evaluates the layout of each section (e.g., determining how well the different elements fit together). Alternatively, or conjunctively, the method evaluates the layout of each section relative to the surrounding sections. For example, the method of some embodiments provides a lower score for a section layout that reuses a particular head template in consecutive sections. In some embodiments, the method generates the multiple layouts for a specified period of time, or a specified number of times, and then selects the highest scoring layout. The method of some embodiments performs a single-pass selection method that evaluates the section layout as it is generated, and does not generate multiple different layouts for a single section.

As mentioned, some embodiments display documents that are dynamically arranged in groups below the common content (e.g., top stories, trending content, etc.). In some embodiments, the device receives a number of documents (e.g., new documents since the last time the user has viewed the document feed) and dynamically arranges these documents into groups. The documents as received are assigned one or more tags that each indicate relevancy to a topic, and these tags are used for the groups in some embodiments. Of all the possible tags that are assigned to the received documents, the device identifies some or all of the tags for use in grouping the documents. The device then dynamically assigns the documents to groups for at least a subset of these identified grouping tags. In some embodiments, this dynamic grouping involves iteratively selecting tags and assigning some or all of the documents assigned that tag to a group for the tag, then removing the assigned documents for the next iteration. With the documents assigned to groups, the device adds the groups of documents to the feed (e.g., below the trending topics). In some embodiments, documents that are not assigned to any group are displayed below the groups in the feed.

In some embodiments, the device receives a set of documents that are new since the last time the feed was accessed. This may be a large number of documents, and the device then selects a subset of these documents according to a personalization algorithm in some embodiments (that personalizes the feed according to past history and/or specified preferences of the user of the device). Some embodiments select up to a fixed number of documents using the personalization algorithm (e.g., 25, 60, 100, etc.).

Each of the selected documents (and the unselected documents, for that matter) are assigned zero or more tags, which in some embodiments identify that the document relates to a particular topic. In some embodiments, the tag assignment is performed by the servers that amalgamate the documents and distribute the documents to the user devices. In general, documents will have more than one tag, as the tags may range from specific (e.g., a specific person) to general (a high-level topic such as politics, sports, etc.). Of all the tags that are assigned to at least one document, some embodiments identify a set of the tags to use for grouping (referred to as groupable tags) based on a set of criteria. For instance, some embodiments require that the tag be assigned to a minimum number of documents to form an aesthetic group in the feed (e.g., 3, 5, etc.). Alternatively, or in addition, some embodiments select tags from a "whitelist" (i.e., a set of tags defined for use in grouping). This whitelist may be predefined in the code of the device, or updated by the set of servers as different topics become more popular within the articles provided by the set of servers. In some embodiments, the whitelist primarily contains more general tags for high-level topics in favor of very specific tags.

With the groupable tags identified, the device dynamically assigns the documents to groups. In some embodiments, the device iteratively selects a tag to use to form a group, identifies one or more potential groups of documents for the tag (out of all of the documents that are assigned the tag), uses a set of heuristics to select one of the identified potential groups, and assigns the documents in the selected potential group to a group for the selected tag. The device then removes the documents in the selected group for the next iteration. In some embodiments, the goal of the iterative process is to minimize the number of documents that are left unassigned to any group. In assigning documents to groups, some embodiments ensure that each group has at least a minimum number of documents (e.g., 3, 5, etc.) and no more than a maximum number of documents (e.g., 10, 12, 20, etc.), in order to form aesthetic groupings.

One aspect of this iterative process is that the selection of documents for a tag in a first iteration will affect which tag is selected in the next iteration (and in subsequent iterations). That is, in some cases, selecting a first group of documents for a first tag results in the device selecting a second tag in the next iteration of the process, whereas selecting a second group of documents for the first tag results in the device selecting a third tag in the next iteration of the process rather than the second tag. This result occurs because documents may be assigned multiple groupable tags, and assigning a document to a group for a first one of its tags means that it will not be assigned to a group for any of its other tags.

Different embodiments may use different criteria at various decision points in the process. For instance, to determine which tag should be used for a group at a particular iteration of the process, some embodiments use as criteria the number of documents for which the tag is the only assigned tag (referred to as "solos") and the number of documents overall that are assigned the tag. (e.g., preferring tags with a larger numbers of solos, using overall size for the tag as a tie-breaker). Further ties may be broken by a random selection in some embodiments.

Once a tag is chosen for a particular iteration, some embodiments identify a set of potential groupings of the documents for the tag, with each potential group including all of the solos for the group (unless the number of solos is larger than the maximum number in a group). For each potential group, the process calculates a short-term impact score, such as the number of documents that would remain that no longer have any tags for which there are the minimum number of documents for a group (referred to as "orphans"). For example (assuming a minimum number of three documents per group), if three documents are assigned tag A, but one of these documents is then assigned to a group for tag B, this will leave only two remaining documents for tag A. If these documents are not assigned tags for any other groups, then at this point they will not be able to be assigned to a valid group, and are thus orphans. As mentioned, some embodiments calculate an initial score for each potential group that identifies the short-term impact in terms of the number of orphans created by the group.

Some embodiments then select the top potential group for the iteration based on this short-term impact evaluation (e.g., choosing one of the potential groups randomly if there is a tie), and commit that group (thereby removing the selected documents for the next iteration). Some embodiments, however, identify more than one of the top potential groups based on the short-term impact, and compute a longer-term impact heuristic for each of these groups. For the longer-term impact heuristic, some embodiments use a greedy algorithm that approximates the rest of the groupings and identifies a number of orphans that result. Of these potential groups, the process selects the group with the best longer-term heuristic score (again choosing randomly in case of a tie) and commits the group.

Because the processing may be time-constrained (the groups need to be determined before the user scrolls past the initial static content), some embodiments initially use only the short-term impact evaluation when iterating through the grouping process. If additional time is available, the process re-evaluates the entire set of groups by identifying more potential groups for longer-term impact evaluation at each iteration, in order to identify groups that leave fewer of the documents unassigned. Some embodiments continue to increase the number of potential groups for which the longer-term impact is calculated until time runs out (because the user has scrolled past the static content) or until a pre-set maximum number of evaluations is reached.

Many examples of dynamic grouping and a document reader application that displays personalized content are described below. Section I describes a GUI for a document reader application that displays sections for document groups. Section II then describes a grouping algorithm used for grouping documents into groups for the sectioned display. Section III describes several example electronic systems that implement some embodiments described herein.

I. Document Reader GUI

Some embodiments of the invention provide a document reader application with an aggregated feed view that displays personalized documents (or articles) for a user of the application. The aggregated feed view includes documents from a variety of different sources (e.g., publishers, authors, etc.) and related to a variety of different topics. The aggregated feed view of some embodiments is divided into sections for the personalized documents. In some embodiments, the different sections are generated based on dynamically generated groups of the personalized documents.

In some embodiments, the personalized documents are identified at a server based on user preferences (e.g., favorite topics or sources, reading habits, etc.). The personalized documents of some embodiments are then analyzed and tagged based on the content of the documents. The server of some embodiments sends the tags for the personalized documents to the client device, where they are dynamically grouped based on the assigned tags. The document reader application, at a client device (e.g., a mobile device, computer, etc.), then generates a layout for the personalized documents based on the document groups to be displayed for the user. In some embodiments, the document reader also provides, in the aggregated feed, common content that is not based on the user's preferences, but is provided to all users of the document reader application.

A. GUI for Document Groups

FIG. 1 illustrates an example of a GUI 100 for a document reader application that displays sections of common content. In some embodiments, the GUI 100 for the document reader application is designed to provide the aggregated content from various publishers with the appearance of a personalized magazine. GUI 100 includes masthead 110, document display area 120, and menu bar 130. Menu bar 130 of some embodiments includes icons for performing various operations in the document reader application, such as viewing different collections of documents (e.g., aggregated feeds, source feeds, etc.), adding new sources or topics to the document reader application (e.g., adding to a user's favorites, subscribing to new sources, etc.), and otherwise navigating through the document reader application. In this example, the "For You" icon of the document has been selected (shown in bold) to display an aggregated feed of personalized documents that have been identified for a user of the document reader application.

Masthead 110 shows various summary information for the user of the document feed. In this example, masthead 110 displays the date, weather, and a location. Alternatively, or conjunctively, masthead 110 displays other summary information, such as sports scores, traffic alerts, feed refresh notifications, etc. In addition, masthead 110 of some embodiments displays a signature logo 115 associated with the document reader application to provide a distinctive appearance with signature branding for the view of the documents in the user's aggregated feed. In some embodiments, the aggregated feed is divided into multiple different sections (e.g., top stories, personalized group sections, etc.) and masthead 110 provides section navigation controls (not shown) for navigating to different sections of the aggregated feed.

In some embodiments, the masthead is displayed with different sizes based on a user's interaction with the aggregated feed. The different sizes allow the GUI 100 to provide relevant information to the user while also maximizing the space available for displaying the documents of the aggregated feed. For example, in some embodiments, the full masthead 110 is shown at the top of GUI 100 when the application is opened to provide a full magazine experience. Masthead 110 is then hidden as a user scrolls down through an aggregated feed to maximize the space available for displaying the aggregated feed, and shown in a minimized state (e.g., a shorter view with smaller fonts and/or less information) when the user scrolls back up through the aggregated feed. In some embodiments, when the user scrolls to the top of the aggregated feed, the minimized masthead returns to the full masthead 110.

The document display area 120 is a region of the GUI 100 that displays document panes (or summaries) for the various documents of the aggregated feed. Each displayed document pane provides summary information (e.g., an image, headline, excerpt, source, etc.) for an associated document of the aggregated feed.

In some embodiments, document display area 120 displays the document panes of an aggregated feed in several different sections. The sections of some embodiments include common sections that display document panes that are provided to all users of the document reader application, as well as personalized sections that have been personalized for the user. In the example of this figure, document display area 120 includes a top document section 124, entitled "Top Stories", and an algorithmic document section 128, entitled "Trending Stories".

The top document section 124 of some embodiments displays document panes for a curated (e.g., selected/approved by an editor) set of top documents that have been selected for all users of the document reader application. In this example, the top document section 124 displays document panes for the top news stories of the day.

In some embodiments, the top document section 124 is the first section that is displayed when the document reader application is opened. In some such embodiments, the document reader application displays the top document section 124 in a signature layout that is unique to the top document section 124, providing a predictable and identifiable layout associated with the document reader application.

Top document section 124 also shows a user interface (UI) control 160 to display more top documents. In some embodiments, the UI control 160 is used to replace the documents displayed within the top document section 124 with more top documents. In other embodiments, selection of the UI control 160 provides a new feed view that displays additional top documents.

The algorithmic document section 128 of some embodiments is another common section that includes documents that have been selected for all users of the document reader application, but rather than a curated set of documents, the algorithmic document section 128 includes documents that have been programmatically selected based on interactions of other users of the document reader application. For example, the algorithmic document section 128 displays document panes for trending stories that are growing in popularity with other users (e.g., based on the number of times a document is read, shared, liked, etc.).

In this example, the different sections 124 and 128 are separated by a gray line. In different embodiments, the separation between different sections is displayed differently. For example, in some embodiments, each section is colored differently. In other embodiments, the sections are displayed in a same color (e.g., white), but each section is displayed with a gradient, so that the bottom of each section is different (e.g., darker) than the top of the next section.

Figure 2:
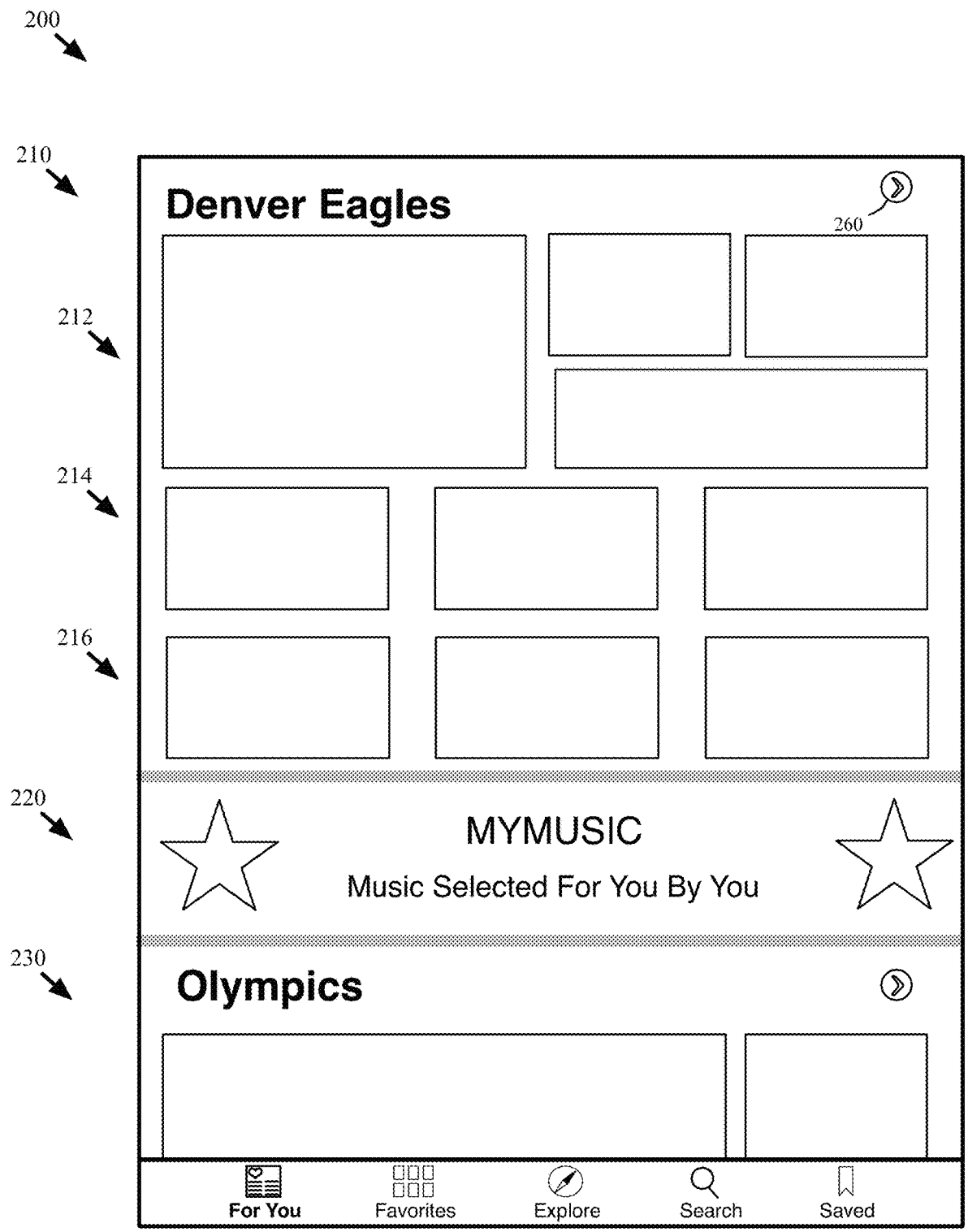
FIG. 2 illustrates an example of a GUI for a document reader application that displays sections of personalized and curated content.

FIG. 2 illustrates an example of a GUI 200 for a document reader application that displays sections for groups of personalized and common content. In some embodiments, the personalized sections of GUI 200 are a part of the layout for the aggregated feed described above with reference to FIG. 1. In some embodiments, the layout for the aggregated feed starts with common content in order to allow for dynamic grouping for the personalized content, as described in further detail below. In this example, GUI 200 shows a personalized group section 210, an advertisement section 220, and a curated section 230.

The personalized group section 210 and the curated section 230 show document panes (depicted as white boxes) for associated documents. In this example, and in other examples of this application, the document panes are shown as simple white boxes. More detailed descriptions and examples of the document panes are described below with reference to FIG. 4.

In this example, personalized group section 210 displays document panes for several articles that are related to a particular topic ("Denver Eagles"). The personalized group section 210 of some embodiments is one of several personalized sections, in which each personalized section displays documents (or document panes) for a particular group of the personalized documents. For example, in some embodiments, the personalized documents are dynamically grouped based on tags associated with the personalized documents. The process for dynamically generating groups of documents for the personalized sections is described in further detail below in Section II.

The documents of the group are positioned within the personalized group section 210 to form a layout for the personalized documents of the group. In some embodiments, the layout of the personalized section 210 is divided into subsections 212, 214, and 216. The first subsection 212 of some embodiments is a head subsection, while subsections 214 and 216 are body subsections. In some embodiments, a head subsection is the first subsection of each section and includes a primary document pane for a primary document that is emphasized for the reader. Each section then includes zero or more body subsections.

In some embodiments, the documents of the group are positioned within each subsection based on a template that is selected from a group of templates. In some embodiments, the template for each subsection is selected based on the type of subsection (e.g., head or body), the set of documents to be displayed, the templates for the surrounding subsections, etc. The process for generating layouts for a document section is described in further detail below in Section B.

In some embodiments, personalized group sections include various controls for interacting with the group (or topic) of the personalized section, such as displaying additional documents related to the topic, disliking or blocking the topic (e.g., removing the particular topic from a whitelist of available topics), adding the topic to a list of favorite topics associated with the user. Personalized group section 210 shows a user interface (UI) control 260 to display more articles related to the topic ("Denver Eagles") of personalized section 210. In some embodiments, the UI control 260 is used to replace the articles displayed within the personalized group section 210 with the additional articles related to the topic. In other embodiments, selection of the UI control 260 provides a new feed view that displays the additional articles related to the topic. In some embodiments, some of the controls for interacting with the group (e.g., adding a topic to the list of favorite topics) are shown on the new feed view.

In addition to the personalized group section 210, GUI 200 shows an advertisement section 220 that displays an advertisement for a music service. In some embodiments, advertisements are periodically interspersed between the sections of the aggregated feed. In some embodiments, the placement (e.g., size, location) of an advertisement section in the aggregated feed is based on an amount paid by the advertiser. Alternatively, or conjunctively, the placement of the advertisement sections may also be based on the surrounding personalized sections. For example, in some embodiments, an advertisement section is related to a particular topic and is more likely to be placed near a personalized section related to the particular topic.

In order to prevent a user from confusing advertisement sections with the personalized content sections, the advertisement sections of some embodiments are visually distinguished from the personalized content sections. In this example, advertisement section 220 is set apart with separators (shown as gray lines) between the advertising section 220 and the other sections 210 and 230. Alternatively, or conjunctively, the advertising sections of some embodiments are visually distinguished by a color scheme or style for the advertising sections.

GUI 200 also shows a curated section 230 for curated content (e.g., content selected/approved by an editor). In some embodiments, curated sections are dispersed through an aggregated feed to diversify the content in a user's feed. In some embodiments, the curated sections provide documents for curated topics that are not likely to be permanent favorite topics for a user. For example, curated topics may only be relevant for temporary periods of time (e.g., the Olympics, Iowa caucuses, etc.). The curated section 230 of some embodiments also includes curated documents that are selected for their relevance to the curated topic, while in other embodiments the documents are identified in other ways (e.g., programmatically, etc.).

Like the advertisement section 220, in order to prevent a user from confusing curated content sections with the personalized content sections, the curated sections are visually distinguished from the personalized content sections. In some embodiments, the advertisement sections and the curated sections are visually distinguished from the personalized content sections in different ways. For example, the different types of sections may use different color schemes, or one type of section may use a particular color scheme while the other type uses separators.

In some embodiments, the GUI 200 for an aggregated feed layout includes other types of sections. For example, in some embodiments, when the groups for the different personalized sections are dynamically generated, some of the articles cannot be grouped, such as when they do not have enough related articles to form another group. In some such embodiments, the GUI 200 includes an ungrouped section (or an orphan section) for any articles that are not a part of the groups of the grouped sections.

Figure 3:
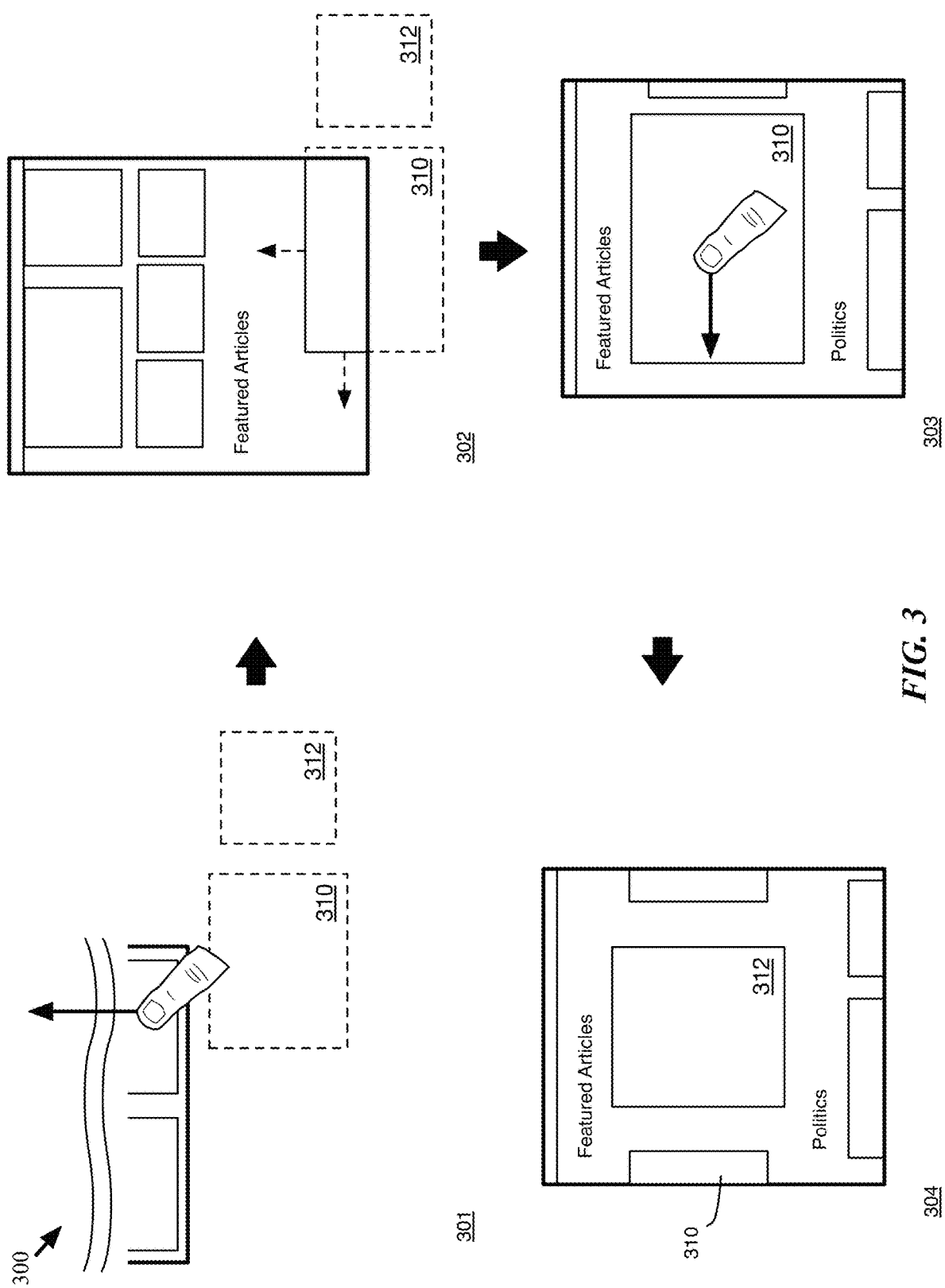
FIG. 3 illustrates an example of a featured article section.

In some embodiments, the document reader application displays a special featured article section for featured articles as a part of the aggregated feed. The featured articles of some embodiments include premium content from different publishers, content requiring a subscription, content which the publishers have paid to promote, etc. FIG. 3 illustrates an example of a featured article group in four stages 301-304. The first stage 301 shows the bottom end of a GUI 300 for a document reader application. The first stage 301 also shows articles 310 and 312 of a featured article group, which are currently off-screen, but ready to be displayed in a featured articles section of GUI 300. In the first stage 301, a user slides up in the GUI 300 to show more of the aggregated feed.

The second stage 302 shows that the first article 310 of the featured article group expands into the featured article space of GUI 300. In some embodiments, the transition of the first article 310 is animated onto the GUI 300 as the user slides through the aggregated feed. In some embodiments, the document panes include multi-layer imagery, which are used to create a parallax effect when animating the document pane into the GUI 300. The parallax effect provides the impression of depth and movement in a two-dimensional image.

In the third stage 303, the first article 310 is displayed in the featured articles section. In some embodiments, unlike the other document sections, the featured article section only displays (or emphasizes) a document pane for a single document at a time. The format of the document panes of the featured articles section is also different from the document panes displayed in the other document sections in some embodiments. For example, in some embodiments, the document panes for the featured articles are displayed with a single, large image with overlaid descriptive text, similar to a cover of a magazine.

In this example, a portion of the next article 312 is also shown, indicating that another article is available and showing a portion of the associated document pane. In some embodiments, as the document panes for the featured articles are full images, the document panes have aspect ratios associated with the image. The document pane for the first article 310 has a horizontal format (e.g., a 4:3 aspect ratio). The third stage 303 shows that the user swipes to the left to show the next featured article 312. In some embodiments, the transition between articles uses an animation similar to the animation used to bring the first article into the display area (e.g., creating a parallax effect).

The fourth stage 304 shows that the next featured article 312 is displayed in the GUI 300. The document pane for the next article 312 has a vertical format (e.g., a 3:4 aspect ratio). In some embodiments, the document reader application displays the document panes for the featured documents with varying aspect ratios.

In some embodiments, a user navigates between the different document sections (e.g., common and personalized group sections) and through the content of each document section in a first direction (e.g., up-down), but navigates through the document panes of a featured article section in a different, second direction (e.g., left-right). In some embodiments, the second direction is orthogonal to the first.

In this example, GUIs 100, 200, and 300 show particular examples of different sections in an aggregated feed layout. It should be understood that this is not meant to limit the invention in any way. The different types of sections (e.g., personalized sections, advertisement sections, curated sections, etc.) can be displayed in various orders and combinations.

B. Section Layout Elements

In some embodiments, layouts for the sections of the aggregated feed are generated to provide a great user experience. Document panes provide a representation (or summary) for the documents of each section. Each section of some embodiments is made up of multiple subsections. In some embodiments, templates are selected for each of the subsections to position the document panes within each subsection.

Figure 4:
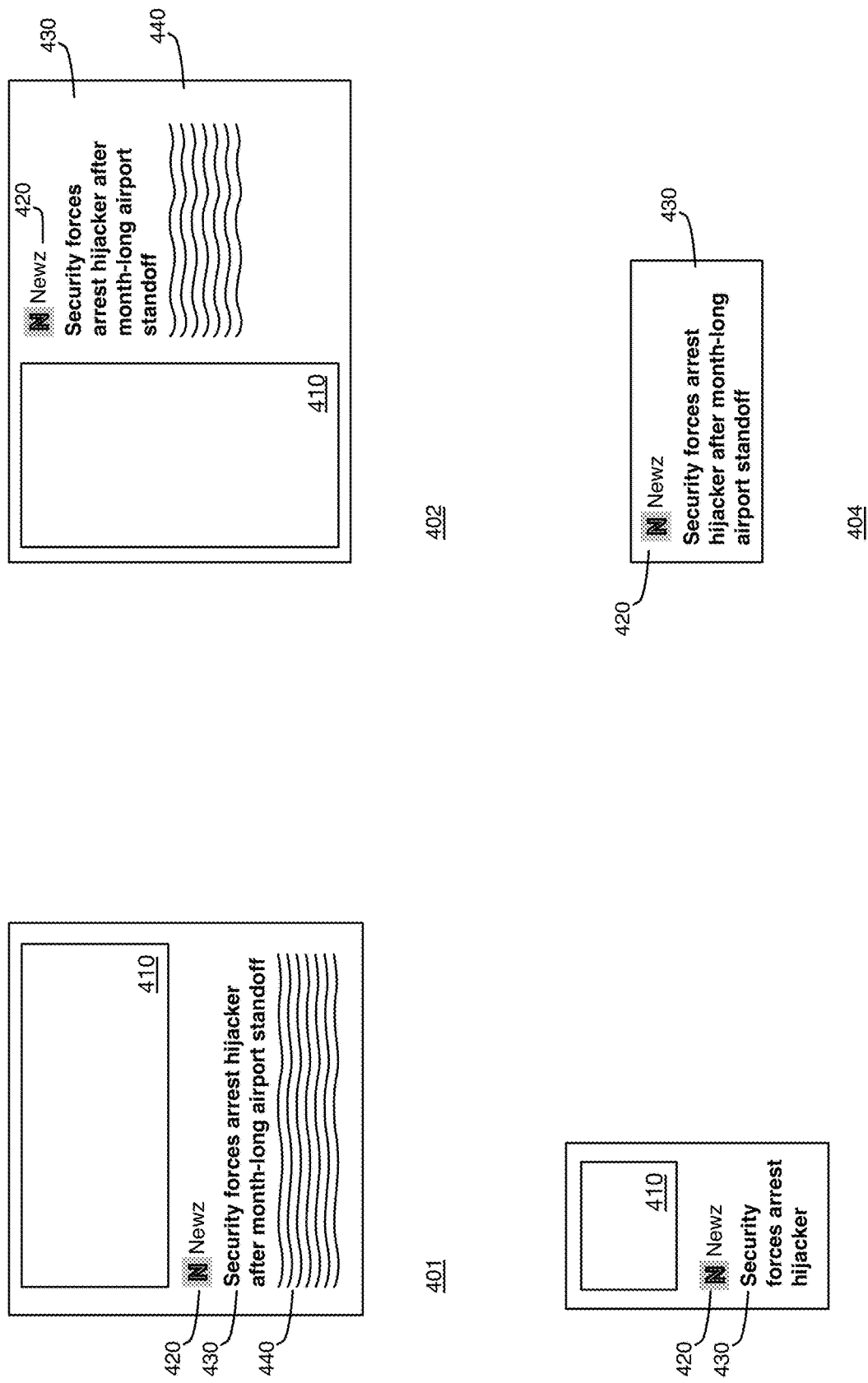
FIG. 4 illustrates examples of different formats for document panes.

FIG. 4 illustrates four examples of different formats for document panes. Document panes of some embodiments provide summaries of information related to a document. For example, for an article, the document pane may include one or more of an image associated with the article, a publisher (or source) of the article, a title of the article, and an excerpt (or summary) from the article. The different formats of the document panes provide different elements from the document, different positioning layouts for the elements, and different sizes.

The first example document pane 401 shows a document pane with an image 410, source information 420, title 430, and an excerpt (or brief summary) 440. The image 410 of some embodiments is one of several images associated with the document. For example, image 410 of some embodiments is a still image associated with a video document, a cover image for an article, etc. In some embodiments, the image 410 is modified (e.g., cropped, stretched, etc.) to fit a particular aspect ratio (e.g., 3:4, 4:3, 1:1, etc.) in order to maintain a pleasing appearance for the document panes in the aggregated feed layout.

The aggregated document feed of some embodiments includes documents from a variety of different sources. The source information 420 allows a user to quickly determine the source of a particular article. The source information 420 of some embodiments includes a logo and a source name ("Newz"). The logo and source name are provided by the source (e.g., the publisher or author) of the article. The excerpt 440 is a short excerpt or summary from the associated document.

In some embodiments, the document panes also include other information. For example, some embodiments include a related time value (e.g., the time since the article was retrieved or published), a status notification (e.g., breaking, trending, etc.), etc. Although this figure shows four examples of document panes, one skilled in the art will recognize that many other types of document panes with different layouts, sizes, information, and formats could be imagined.

The second example document pane 402 shows the same image 410, source 420, title 430, and excerpt 440. In this example, however, the layout positions the image 410 to the left of the document pane 402 and provides the source 420, title 430, and excerpt 440 to the right side. In some embodiments, the same image 410 can be reformatted (e.g., cropped, resized, etc.) to fit in the different document panes with different aspect ratios.

The third example document pane 403 shows the same image 410 and source 420, but in this example, the title 430 is shortened and no excerpt is displayed. In some embodiments, document panes include different amounts of information from the document. For example, in the fourth example document pane 404, only the source 420 and title 430 are displayed. The document panes of some embodiments are formatted and laid out to fit within templates for the different sections of the aggregated feed. The various formats and layouts can be mixed and matched to create a pleasing visual aesthetic.

The document reader application of some embodiments uses templates to position the document panes within a group section. In some embodiments, each group section is made up of one or more subsections, and each subsection has its own template to define the layout for the document panes of the subsection. Each template of some embodiments spans the width of the display area and defines the placement of each document pane within the subsection. Different templates may include a different number of document panes with different sizes, formats, and layouts.

Figure 5:
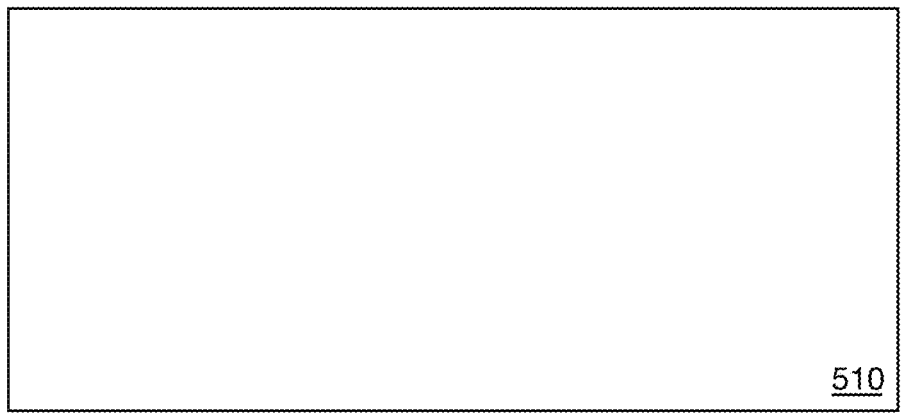
FIG. 5 illustrates examples of different head layout templates.
Figure 5:
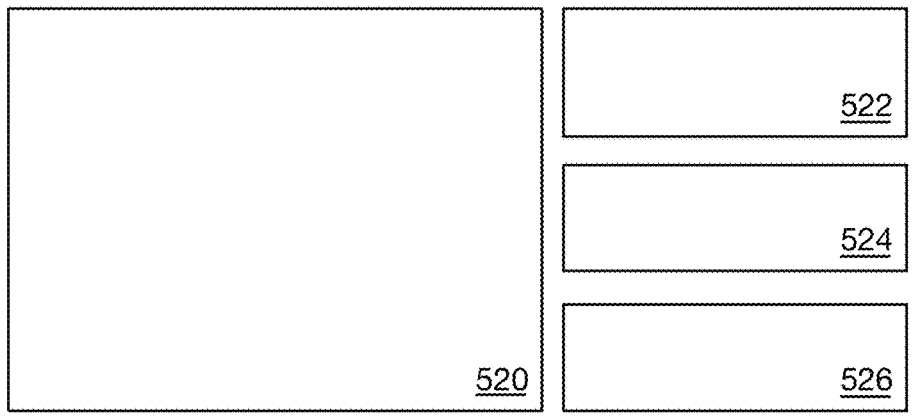
Figure 5:
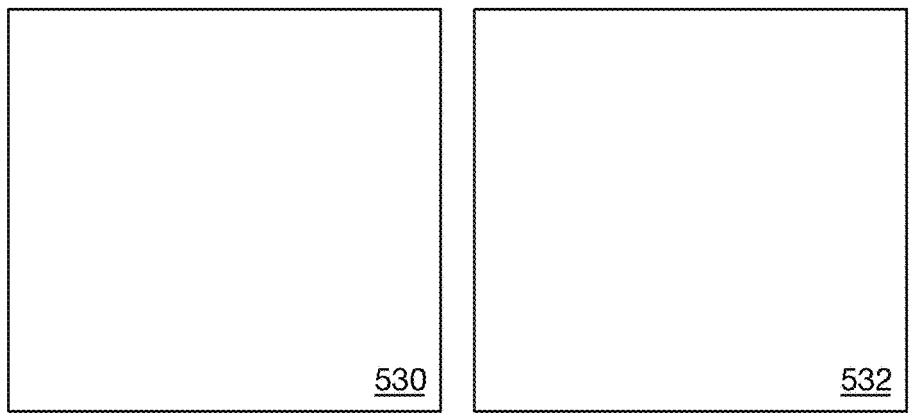

In some embodiments, a group section includes a head subsection and zero or more body subsections. The head subsection of some embodiments is the first subsection and templates for the head subsection provide different layouts than those of the body subsection templates. FIG. 5 illustrates three examples of different head subsection templates. Different head templates may include a different number of document panes with different sizes, formats, and layouts.

The first example template 501 shows a header template with a single primary document pane 510. In some embodiments, each head template includes a primary document pane for a primary document. The primary document of some embodiments is a highest-ranked document (e.g., based on user preferences, popularity with other users, relevance to the topic of the group, etc.)

In some embodiments, the primary document panes occupy at least half of the template width and the full template height. The primary document pane of some embodiments is the largest document pane to emphasize the primary document. In some embodiments, the primary document pane also uses different appearances (e.g., a different color scheme or other visual indications) to further emphasize the primary document within a particular section. In some embodiments, the primary document pane is the only document pane to provide an excerpt (or summary) from the associated article.

The second example template 502 shows a header template with a primary document pane 520 and a set of secondary document panes 522-526. In this example, the primary document pane 520 is the largest document pane in the template, but also provides document panes for other documents (i.e., secondary documents). The secondary document panes can be positioned in a variety of different ways with a variety of different sizes and formats to fit with the primary document pane 520.

In some embodiments, two primary documents may be selected for a particular group of documents. The third example template 503 shows a header template with two primary document panes 530 and 532.

Figure 6:
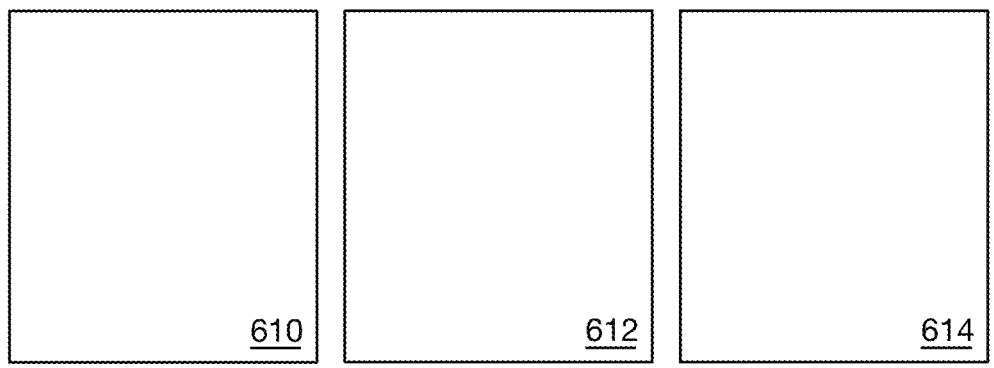
FIG. 6 illustrates examples of different body layout templates.
Figure 6:
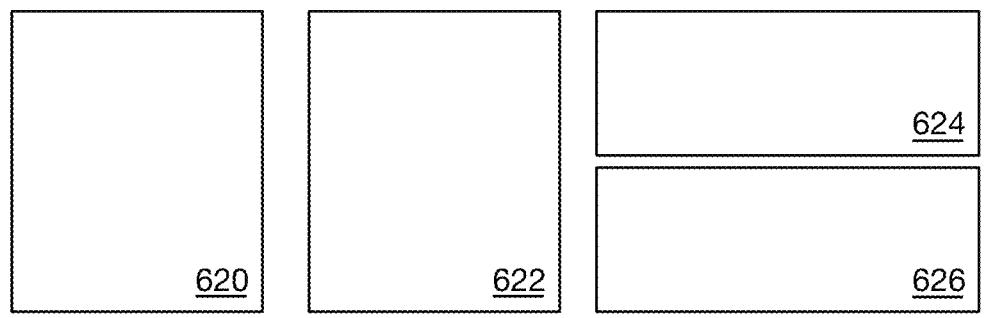
Figure 6:
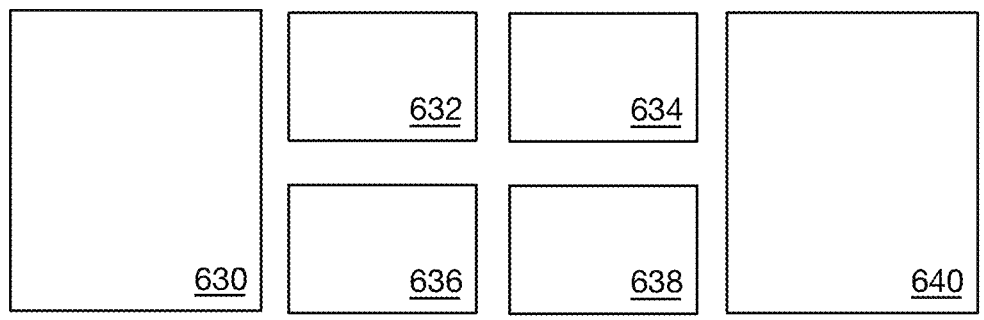

FIG. 6 illustrates three examples of different body layout templates. Different head templates may include a different number of document panes with different sizes, formats, and layouts. The first example template 601 shows a body template with three similarly sized document panes 610-614. In some embodiments, the document reader application prefers layouts with similarly sized document panes when the documents have images with a same aspect ratio and headlines of similar length.

The second example template 602 shows a body template with document panes 620-626, which are of different shapes and sizes. The second example template 602 fits four document panes, rather than the three document panes of the first example 601. In some embodiments, a particular template is designed to facilitate the alignment of the images of the different document panes. For example, in this example, template 602 may be designed for use when document pane 622 has a 4:3 aspect ratio image and text, while document pane 624 has a full-height 1:1 aspect ratio image, allowing the heights of the images of 622 and 624 to align with each other. In addition, the distribution of the document panes in the template divides the template in halves, rather than the thirds of the first template 601. The alignment of the different divisions of the templates affects the continuity of the section.

The third example template 603 shows a body template with six spaces 630-640. This example allows for more documents to fit in a single subsection, providing flexibility when arranging the documents for a particular section. In this example, the half-height document panes 632-638 may only provide a title for the corresponding documents, while document panes 630 and 640 include images as well.

C. Generating Section Layouts

Figure 7:
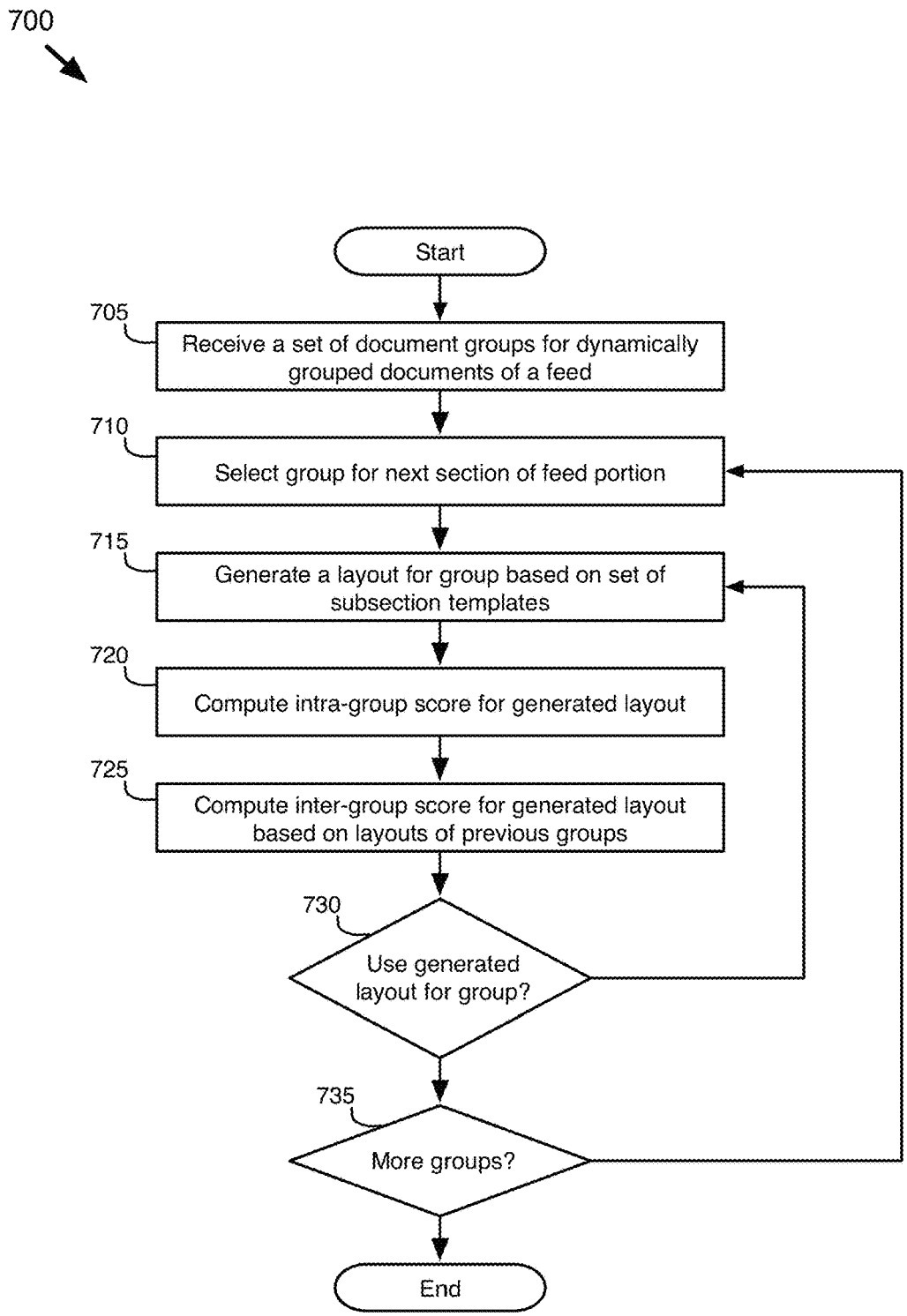
FIG. 7 conceptually illustrates a process for generating a layout with group sections for an aggregated feed.

FIG. 7 conceptually illustrates a process 700 for generating a layout with group sections for an aggregated feed. In some embodiments, the process 700 is performed by the device on which the feed is displayed. The process 700 begins by receiving (at 705) a set of document groups for dynamically grouped documents of an aggregated feed. Dynamically grouping documents into document groups is described in further detail below in Section II.

In some embodiments, the set of document groups includes all of the documents of the aggregated feed. However, in some embodiments, the set of document groups includes only a portion of the documents of the aggregated feed. For example, when a document reader application provides a section of ungrouped personalized documents, as described below with reference to FIGS. 11-13, the process 700 of some embodiments generates a layout with group sections for the remaining personalized documents.

The process 700 then selects (at 710) a document group from the received set of document groups for a next section of the feed portion. The document group for the next group is selected in various ways in different embodiments. In some embodiments, the groups are selected randomly. In other embodiments, the document groups are selected based on the topics to which each group relates.

In some embodiments, process 700 selects (at 710) the document group according to an order specified for the document groups. The ordering of some embodiments is based on properties of the various document groups. For example, in some embodiments, the ordering of the document groups is based on the number of documents in each document group. Alternatively, or conjunctively, the document groups of some embodiments are associated with a topic (or tag) and the ordering of the document groups is based on the associated topic (e.g., alphabetically, based on a relevance of each topic to the user, etc.).

In some embodiments, the document groups are ordered based on properties of the documents within the document groups. For example, the group ordering of some embodiments is based on the popularity or relevance of the documents for the particular user and/or for other users of the document reader application. Alternatively, or conjunctively, the ordering of some embodiments are based on the dates that documents in a document group are published (e.g., groups with recent documents are prioritized over groups with older documents). The group ordering of some embodiments is based on visual elements of the documents in the group (e.g., groups with many images are prioritized over groups without images, etc.).

In some embodiments, the ordering of the document groups (or topics) is affected by the other document groups in the set. For example, in some embodiments, groups at different levels of a hierarchy (e.g., sports is a higher level (i.e., more general) topic than basketball) are ordered so that lower level topics appear before the more general, higher level topics. In some embodiments, the document groups are ordered to intersperse unrelated groups between related groups to provide variety as a user navigates an aggregated feed.

Once a group has been selected (at 710), the process 700 then generates (at 715) a layout for the selected document group based on a set of subsection templates. As described above with reference to FIGS. 5 and 6, the subsection templates of some embodiments include head templates and body templates that are used to position document panes for the documents of the document group within a section layout. In some embodiments, the section layout with the subsection templates is generated based on a variety of variables (e.g., number of documents in the document group, whether the documents have images, aspect ratios of any images, position of the image within a document pane, title length, etc.).

In some embodiments, the process 700 generates (at 715) the layout by selecting a single head template from a set of static head templates and zero or more body templates from a set of static body templates. In some embodiments, the layout uses different sets of static head/body templates based on a size or resolution of a display area for the device (e.g., mobile phone, tablet, computer, etc.). In some embodiments, the size of a display area is defined in terms of a number of columns. For example, a first device (e.g., a mobile phone) may use an 8 column layout, while a second device (e.g., a tablet) uses a 12 or 16 column layout. In some such embodiments, the document reader application selects sets of head and body static templates specific to each column layout.

In some embodiments, the layout is generated in a manner that positions documents within the section to provide a visual effect with a descending level of visual density. Positioning documents with higher visual density at the top of each section provides a pleasing visual effect that draws a user's attention through the different sections of the aggregated feed. The ranking of documents for visual density is described below with reference to FIG. 8.

Once the layout for the selected group has been generated (at 715), the process 700 computes (at 720) an intra-group score for the generated layout. In some embodiments, the intra-group score is used to determine whether the generated layout is acceptable. The different shapes and sizes of the head templates and body templates allow for various combinations of the different documents within each template.

In some embodiments, the intra-group score is based on the subsection templates of the generated layout. In some embodiments, the process 700 computes (at 720) the intra-group score by evaluating transitions between a set of templates based on how each template lines up with the one before it. For example, it is undesirable in some embodiments to have an edge of a document pane of a first template that is near, but does not align with, a document pane of a second template. In some embodiments, a transition is favored when the edges of document panes in the first template either align with edges of the second template or have a minimum distance between the edges of the first template and the edges of the second template.

In some embodiments, the process 700 not only evaluates individual transitions between a pair of templates, but also evaluates each transition based on the previous one or more transitions. For example, in some embodiments, the transition between a particular body subsection and itself (e.g., repeated use of the particular body subsection) is a desirable combination. However, as the combination repeats, the transition becomes less desirable as excessive repetitions of the same subsection template becomes visually uninteresting.

In addition to the intra-group score, the process 700 also computes (at 725) an inter-group score for the generated layout based on layouts of the previous groups. For the first group of the layout, as there are no previous groups, no inter-group score is computed. In some embodiments, the inter-group score evaluates the generated layout in view of the layouts of the previous groups. In some embodiments, the process 700 computes (at 725) the inter-group score to evaluate the transitions between the generated layout and the previous one or more layouts in a manner similar to the evaluation of the transitions between the subsection templates described above. For example, in some embodiments, the inter-group score is computed to prevent the repetition of a same layout for multiple sections in a row or to prefer (or promote) particular transitions between the last body subsection template of the previous section and the head template of the generated section.

The process 700 then determines (at 730) whether to use the generated layout for the group. In some embodiments, the process 700 determines (at 730) to use a generated layout when the intra-group and inter-group scores for the layout exceed a particular threshold value or when all possible section layouts have been evaluated. In some embodiments, the process 700 determines (at 730) to use a generated layout after a particular period of time has passed or after a particular number of attempts. In such embodiments, the process 700 will use the best generated layout (based on the inter-group and intra-group scores) that is available when the period of time has passed or the number of attempts have been completed. In some embodiments, rather than generating multiple layouts for each group, the generation (at 715) of the layout uses a single-pass process to produce a single layout to be used for the document group and the process 700 always determines (at 730) to use the single layout.

When the process 700 determines (at 730) not to use the generated layout, the process 700 returns to step 715 to generate another layout for the document group. In some embodiments, the layouts generated (at 715) differ in at least one of the set of subsection templates used, the format of the individual document panes, or the order of the document panes in the section.

When the process 700 determines to use the generated layout for the group, the process 700 determines (at 735) whether there are more groups for which layouts need to be generated. When the process 700 determines (at 735) that there are more groups, the process 700 returns to step 710 to select another group for the next section of the aggregated feed portion. Otherwise, the process 700 ends.

Figure 8:
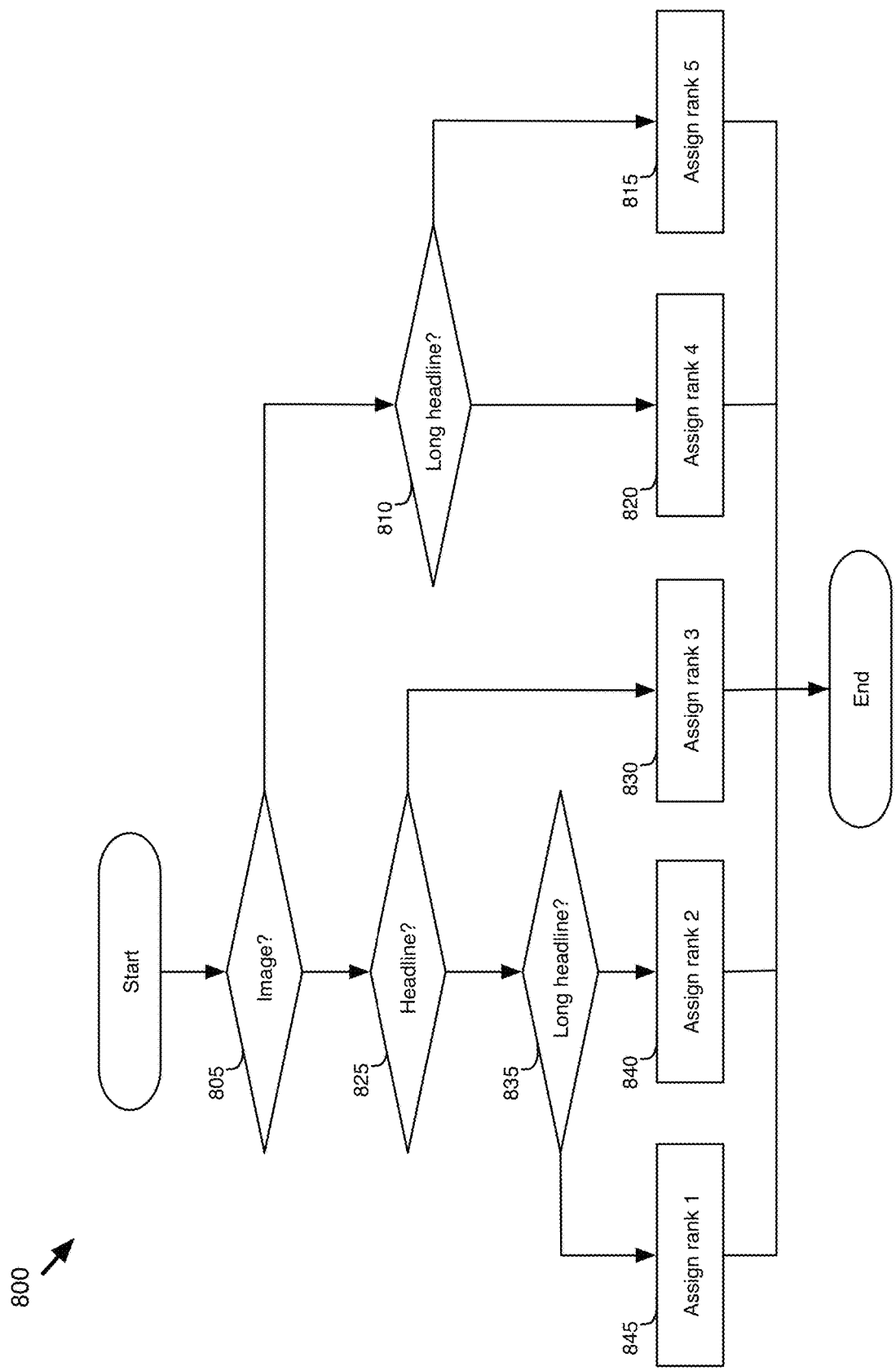
FIG. 8 conceptually illustrates a process for ranking document content based on visual aesthetics.

As described above, the document reader application of some embodiments arranges document panes for documents within a section of the aggregated feed based on visual aesthetics of the different document panes. FIG. 8 conceptually illustrates a process for ranking document content based on visual aesthetics. The process 800 begins by determining (at 805) whether the document has an image. When the process determines (at 805) that the document does not have an image, the process 800 determines (at 810) whether the headline is a long headline. In some embodiments, a long headline is any headline that exceeds a threshold number of characters. When the process 800 determines (810) that the headline is not a long headline (i.e., the document has no image and a short headline), the process 800 assigns (at 815) a lowest rank (rank 5 in this example). When the process 800 determines (at 810) that the headline is a long headline, the process 800 assigns (at 820) a rank of 4. In some embodiments, long headlines are preferred to short headlines because they provide a level of visual density for the document panes and avoid creating too much whitespace within a layout.

When the process 800 determines (at 805) that the document does have an associated image, the process 800 determines (at 825) whether the document has a headline. When the process 800 determines (at 825) that the document does not have a headline, the process 800 assigns (at 830) a rank of 3. In this case, a document with an image, even with no headline, is preferred over any document without an image.

When the process 800 determines (at 825) that the document does have a headline, the process 800 determines (at 835) whether the headline is a long headline. The process 800 then assigns a rank of 2 when the headline is short, and a rank of 1 when the headline is long. The process 800 then ends.

The process described in this example assigns different numerical rankings, but the numerical rankings are merely for illustration. The rankings are used to describe an example of the different document preferences when arranging the document panes for a section, but are not meant to limit the invention to a particular ranking system or in any other way. In some embodiments, the rankings are used to create a visual hierarchy of documents, emphasizing documents with higher visual density. For example, in some embodiments, the highest ranking articles are provided in the header, while the lower ranking articles are provided in descending rows beneath it so that the visual density of the aggregated feed slowly transitions to lower levels of density as the user proceeds through a section.

In some embodiments, the document reader application uses a content score (e.g., based on relevance to a user, interaction with the document by other users, etc.) to select the primary document, but uses the visual rankings to order the other documents of the section. In other embodiments, the content score is used in combination with the visual density rankings. For example, for various articles with the same ranking, the content score is used to place more relevant documents higher within the section.

D. Marking Tools in a Multi-Pane Layout

The document reader application of some embodiments provides different interfaces for different types and sizes of devices. For example, in some embodiments, the document reader provides a larger interface for tablet type devices and a smaller interface for other mobile devices (e.g., mobile phones, etc.). In some embodiments, particularly with smaller display areas, it is difficult to provide various tools for interacting with the documents without cluttering the screen. In some embodiments, the tools for interacting with the documents are hidden, and then provided upon further input (e.g., a swipe input) from the user. In some cases, the layouts for the smaller devices include a two-pane layout, in which a particular horizontal section displays two adjacent document panes.

Figure 9:
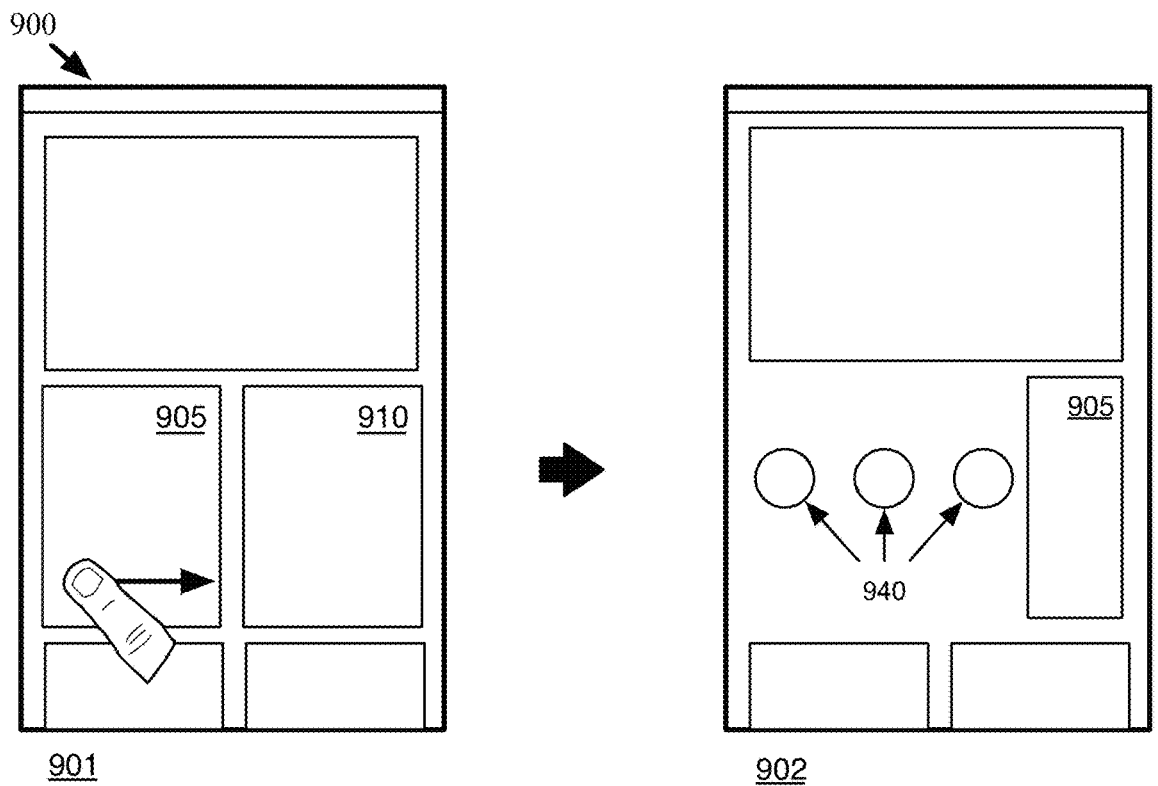
FIG. 9 illustrates an example of providing UI tools for marking documents in a two-pane layout.
Figure 10:
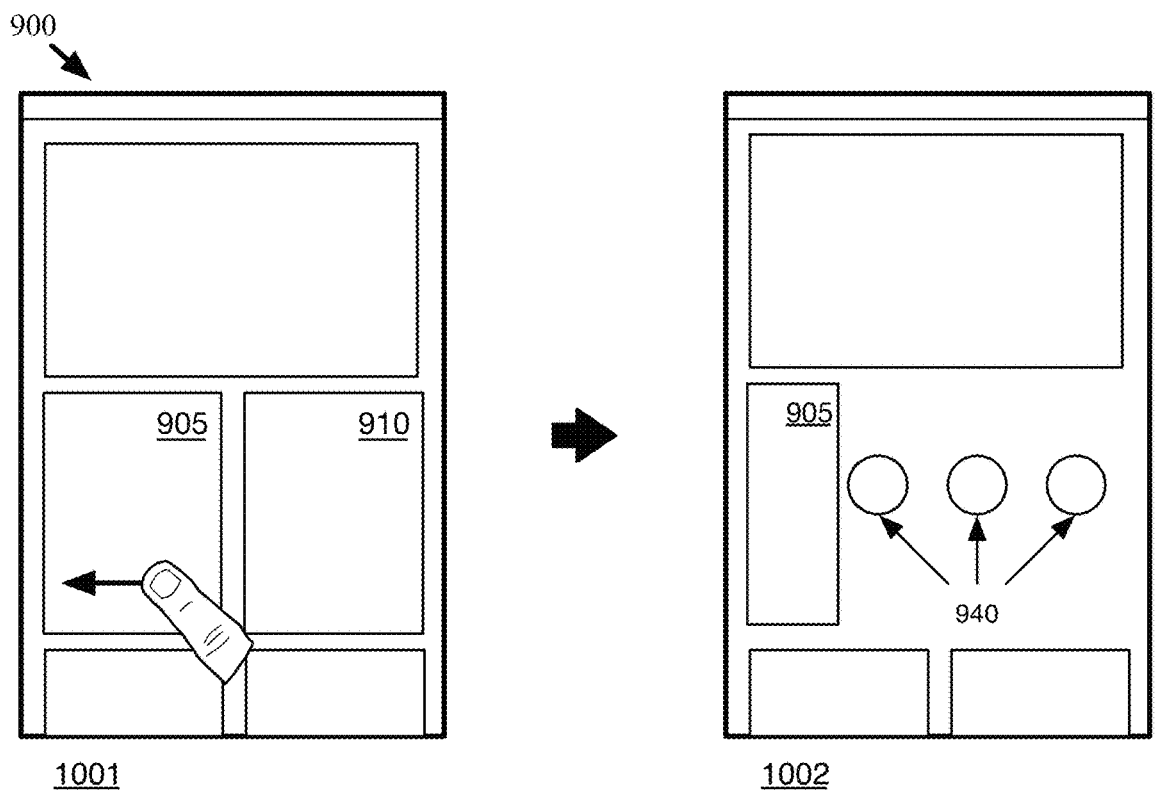
FIG. 10 illustrates another example of providing UI tools for marking documents in a two-pane layout.

FIGS. 9 and 10 illustrate two examples of providing tools for interacting with the documents in a two-pane layout. FIG. 9 illustrates an example of providing UI tools for marking documents in a two-pane layout in two stages 901 and 902.

The first stage 901 shows GUI 900 with various document panes. In particular, GUI 900 includes document panes 905 and 910, which are displayed in a two-pane layout. In the first stage 901, the user slides to the right across document pane 905. The document pane 905 slides to the right, pushing document pane 910 off-screen.

In the second stage 902, document pane 905 has been pushed to the right side of the screen, partially off-screen, to make room for the UI controls 940. In addition, UI controls 940 slide in from the left to fill in the space made by pushing document pane 905 to the right. The UI controls 940 are for performing various operations on the document associated with document 905. In some embodiments, the UI controls 940 include UI controls for sharing the document, liking/disliking the document, saving the document to be read later, etc.

FIG. 10 illustrates another example of providing UI tools for marking documents in a two-pane layout. The example of this figure is similar to the example of FIG. 9, but rather than sliding to the right, the first stage 1001 shows that the user slides to the left across document pane 905. The document pane 905 slides to the left, pushing document pane 910 off-screen. In some embodiments, pushing from the middle of the layout to an edge slides the other document pane 910 in the opposite direction (e.g., to the right) and off-screen. In other embodiments, sliding document pane 905 to the left causes document pane 910 to slide to the left, beneath document pane 905, and off-screen.

UI controls 940 slide in from the right to fill in the space made by pushing document pane 905 to the left. In the second stage 1002, document pane 905 has been pushed to the left side of the screen, partially off-screen, to make room for the UI controls 940. The UI controls 940 represent various different controls for interacting with the document 905. In some embodiments, the UI controls 940 include UI controls for sharing the document, liking/disliking the document, saving the document to be read later, etc.

E. Dynamic Group Layouts

In some embodiments, the group layouts for a user's personalized content are generated dynamically by the document reader application at a client device. In order to provide a responsive interface, the document reader application of some embodiments will be ready to provide the personalized content, even when a group layout has not been generated.

Figure 11:
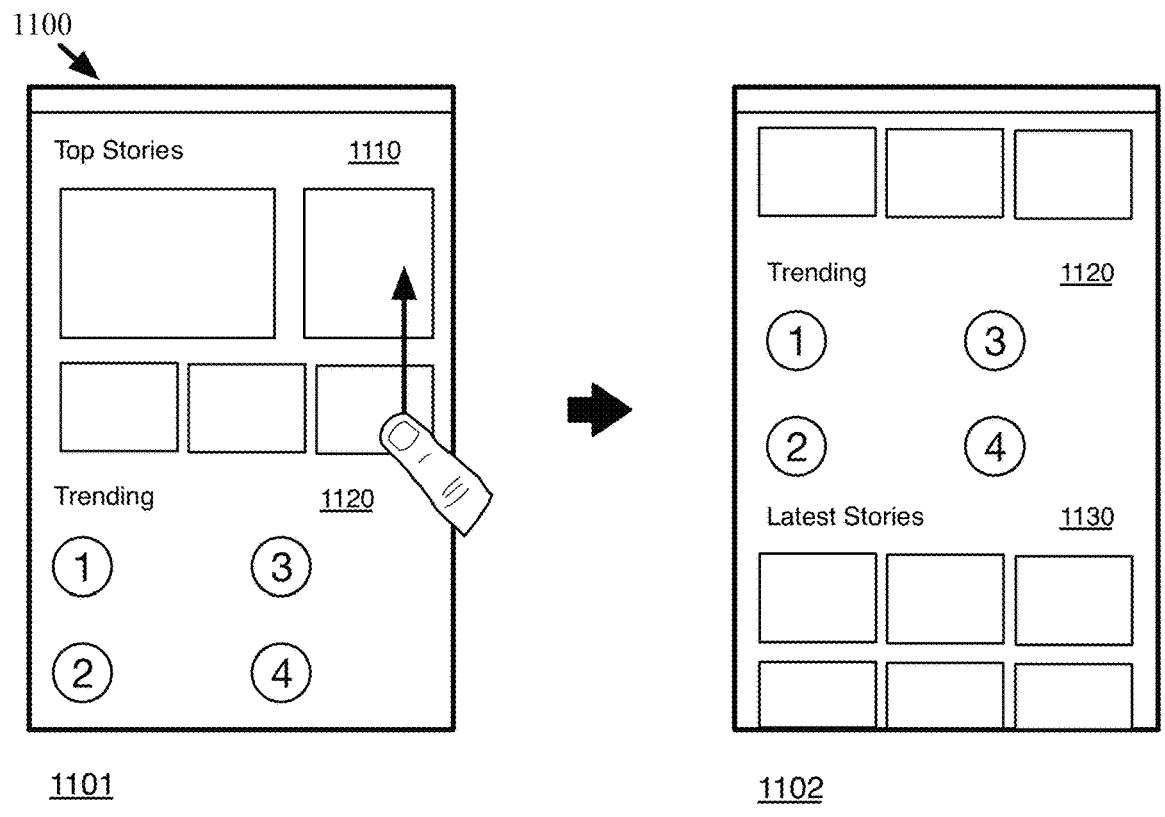
FIG. 11 illustrates an example of providing an initial ungrouped section of personalized content.

FIG. 11 illustrates an example of providing an initial ungrouped section of personalized content in two stages 1101 and 1102. The first stage 1101 shows GUI 1100 with common content sections 1110 and 1120. The common content sections provide a curated top stories section 1110 and an algorithmic trending stories section 1120, as described above with reference to FIG. 1. In the first stage 1101, the user provides input (slides up) to show more of the aggregated feed.

The second stage 1102 shows that the common content sections 1110 and 1120 have moved up to show a latest stories section 1130. In this example, the user input is received before an acceptable layout is generated (or when no acceptable layout is identified), so the second stage 1102 shows that the GUI 1100 displays an ungrouped section 1130 (Latest Stories) of personalized stories. In some embodiments, the ungrouped section 1130 displays documents that are not grouped based on any particular topic, but are selected from personalized documents designated to be displayed in the aggregated feed. In some embodiments, the documents of the ungrouped section 1130 are a set of the highest ranked stories (e.g., based on user preferences) for the user of the document reader application.

In some embodiments, the latest stories section 1130 is a preliminary ungrouped section that is displayed while a better grouped layout is being identified for the remaining articles that are left to be displayed. In some such embodiments, the articles displayed in the ungrouped section 1130 are removed from the grouping process, and the grouping process restarts and attempts to create a grouped layout for the remaining articles. The dynamic grouping process is described in further detail below in Section II.

Figure 12:
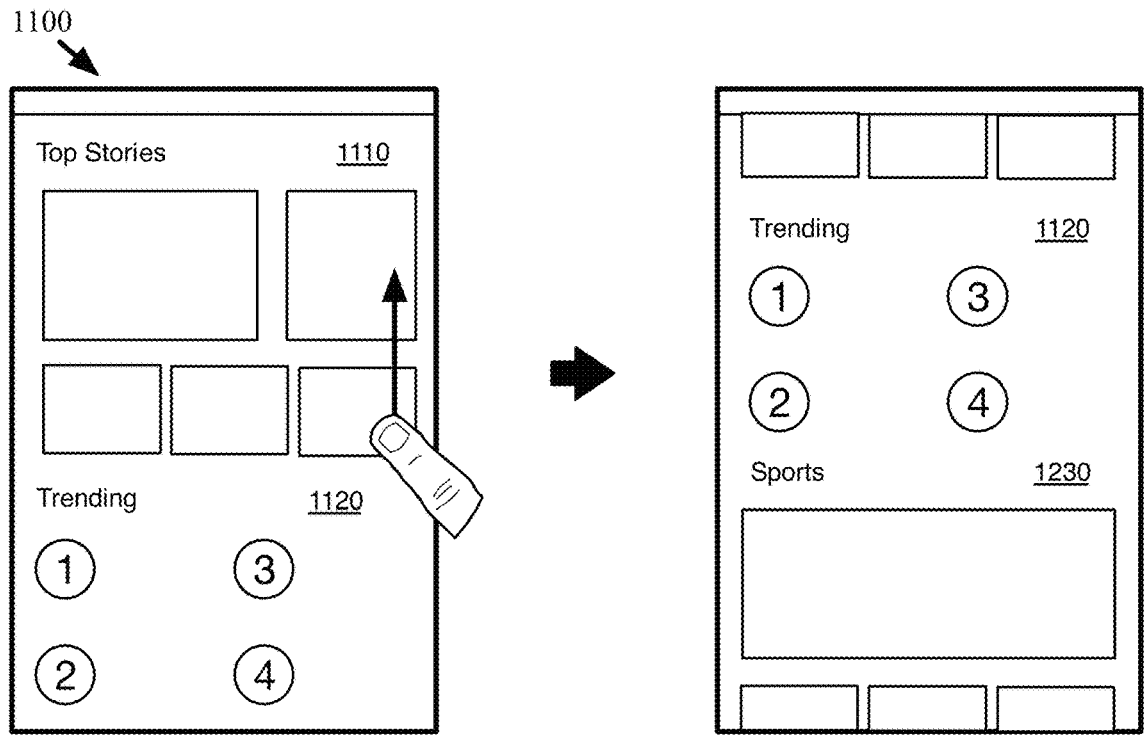
FIG. 12 illustrates an example of providing grouped personalized content.

FIG. 12 illustrates an example of providing grouped personalized content. The example of this figure is similar to the example of FIG. 11, however, in this example, the user input is not received until after the grouping process is able to identify an acceptable grouped layout. In some embodiments, the GUI 1100 initially provides a region of common content (e.g., common document sections, algorithmic sections, curated sections, etc.) before any personalized content in order to secure some time to generate a grouped layout.

In the second stage 1202, in response to the user input received in the first stage 1201, the common content sections 1110 and 1120 have moved up to show a group section 1230. As an acceptable layout is generated before the user input is received, the second stage 1202 shows that the GUI 1100 displays the personalized group section 1230 ("Sports") of the user's personalized content instead of the latest stories section described in FIG. 11.

Figure 13:
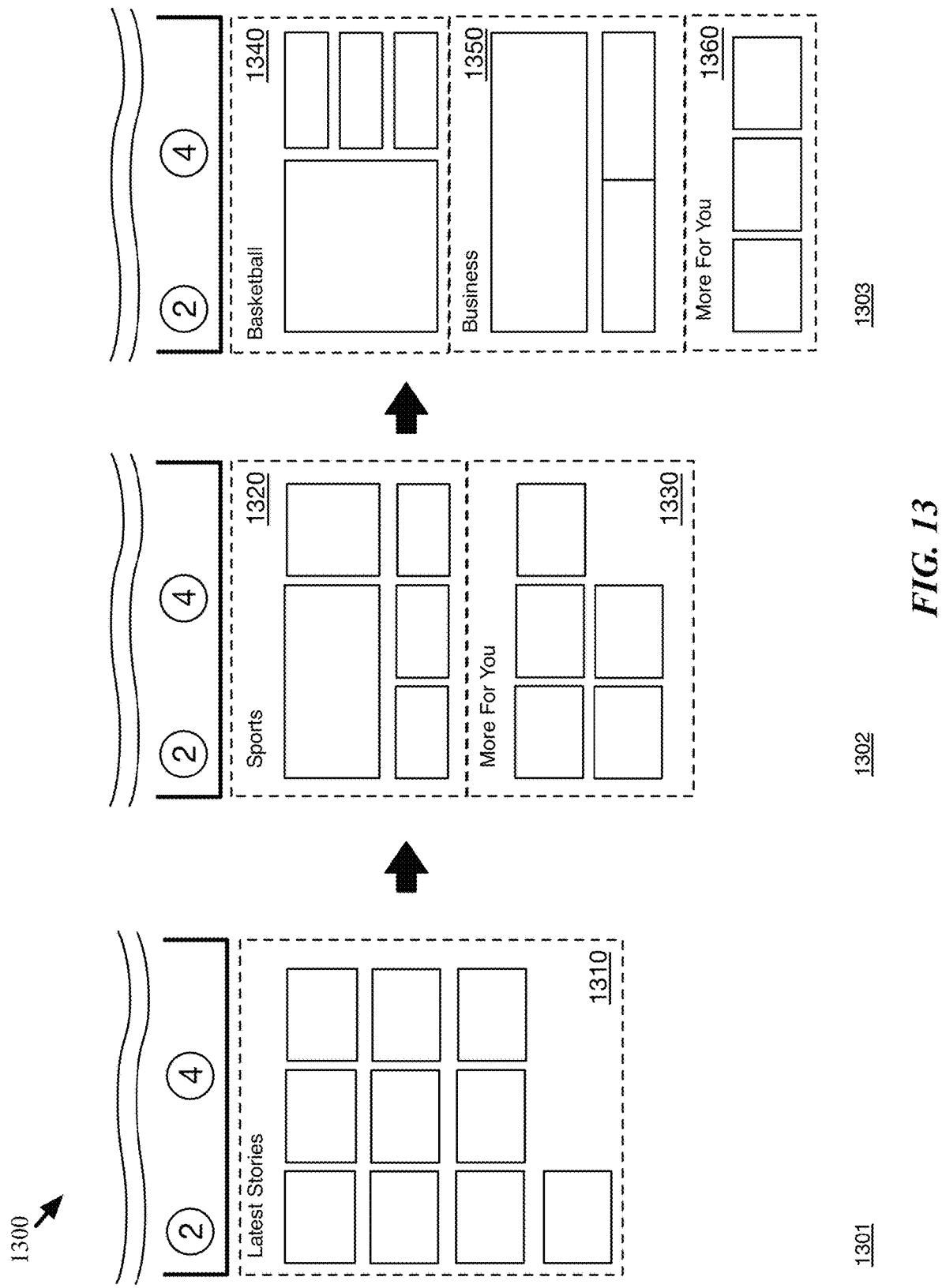
FIG. 13 illustrates an example of generating different group layouts to minimize orphans.

In some embodiments, the document reader application generates multiple grouping layouts for the personalized documents and selects the best available layout to be displayed when the user requests the personalized documents (e.g., by sliding through the aggregated feed). FIG. 13 illustrates an example of generating different group layouts to minimize orphans in three stages 1301-1303.

The first stage 1301 shows an initial ungrouped layout 1310 ("Latest Stories") for the personalized documents. In some embodiments, the initial ungrouped layout 1310 is a default layout that places the personalized content in a single ungrouped section, irrespective to any tags or topics to which the documents are related.

In the second stage 1302, the document reader application has generated an acceptable group layout. The second stage 1302 shows a group layout with a grouped section 1320 and an ungrouped section 1330. The grouped section 1320 shows a set of document panes for documents related to a particular topic ("Sports"). The ungrouped section 1330 shows a set of document panes for documents that could not be grouped. For example, the documents may not have had enough related articles to form another group of a minimum size.

However, in some embodiments, the document reader application continues to look for a better grouping solution. For example, in some embodiments, the application continues to search for a better solution for a designated period of time (e.g., up to 50 ms), while in other embodiments, the application continues to search for better solutions until the user input is received.

The third stage 1303 shows an improved grouped layout with grouped sections 1340 and 1350, along with an ungrouped section 1360. The grouped layout of the third stage 1303, in some embodiments, is preferred to the layout of the second stage 1302 because it only has three orphan documents in the ungrouped section 1360, while the solution of the second stage 1302 has five orphan documents in ungrouped section 1330. In some embodiments, the ranking of the grouping layouts is based on other factors, such as a number of groups produced, an evenness in the distribution of the documents across the different groups, a diversity of the groups produced, etc.

Figure 14:
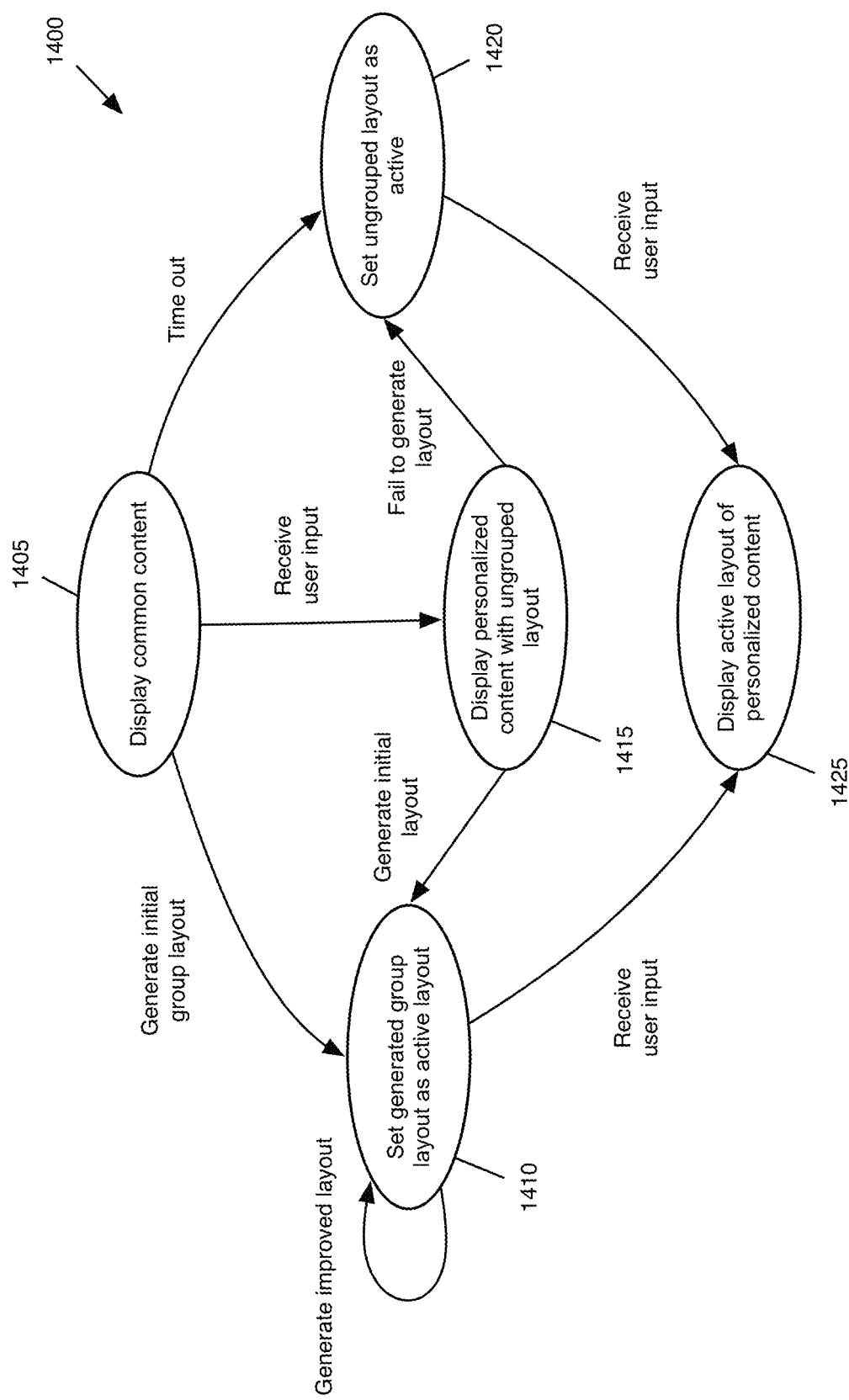
FIG. 14 conceptually illustrates a state diagram for a document reader application that provides grouped personalized content.

FIG. 14 conceptually illustrates a state diagram for a document reader application that provides grouped personalized content. Specifically, the state diagram 1400 refers to the display of common and personalized content in a document reader application. As shown, the application begins in state 1405, in which the application displays common content in the aggregated feed view. In some embodiments, the application enters state 1405 when the document reader is first opened, while in other embodiments, the application enters state 1405 from another view (e.g., a login screen, a favorites view, etc.) within the application.

From the state 1405, the application attempts to generate an initial group layout for the personalized articles of the aggregated feed. When the application succeeds in generating an initial group layout, the application transitions to state 1410, in which it sets the generated group layout as an active layout. Each group layout of some embodiments includes multiple group sections for different groups of documents, as well as an ungrouped section for orphan documents that are not assigned to any group. At state 1410, the program does not yet display the active layout, but rather continues to display the common content that was displayed in state 1405.

While in state 1405, the application continues to generate new group layouts for the personalized articles. When the application generates an improved layout (e.g., a layout with fewer orphans), the application returns to 1410 and sets the newly generated group layout as the active layout. From state 1405, when the application receives user input (e.g., a swiping touch input) to display the personalized articles, the application moves to state 1425 and displays the active layout of the personalized content.

When the application is displaying the common content in 1405, if the application receives the user input before an initial group layout can be generated, the application moves to state 1415 and displays a set of personalized content for an ungrouped layout. In some embodiments, the application continues to try to generate an initial grouped layout, using the remaining personalized content that was not included in the ungrouped layout.

When the application succeeds in generating an initial layout with the remaining documents, it transitions to the state 1410 and sets the generated group layout as the active layout for the remaining personalized documents. The application then attempts to improve the layout or transitions to state 1425 to display the active layout as described above. In such a case, the layout for the personalized documents may include an ungrouped section before the grouped sections and another ungrouped section for orphans after the grouped sections.

When the application fails to generate a layout, either because the operation times out or because no acceptable group layout can be generated, the application transitions to state 1420, where it sets an ungrouped layout as the active layout. When the user input is received, the application transitions to state 1425 to display the ungrouped layout as the active layout.

II. Dynamic Grouping of Documents

As mentioned, some embodiments display documents that are dynamically arranged in groups below the static content (e.g., the trending content, top stories, etc.). In some embodiments, the device receives a number of documents (e.g., new documents since the last time the user has viewed the document feed) and dynamically arranges these documents into the groups for display in the feed. The documents as received are assigned one or more tags (e.g., by the set of servers that provide the documents) that each indicate relevancy to a topic, and these tags are used for the groups in some embodiments. Of all the possible tags that are assigned to the received documents, the device identifies some or all of the tags for use in grouping the documents. The device then dynamically assigns the documents to groups for at least a subset of these identified grouping tags. In some embodiments, this dynamic grouping involves iteratively selecting tags and assigning some or all of the documents assigned that tag to a group for the tag, then removing the assigned documents for the next iteration. With the documents assigned to groups, the device adds the groups of documents to the feed (e.g., below the trending topics). Documents that are not assigned to any group are displayed below the groups in the feed (e.g., in the "More For You" section of the feed).

Figure 15:
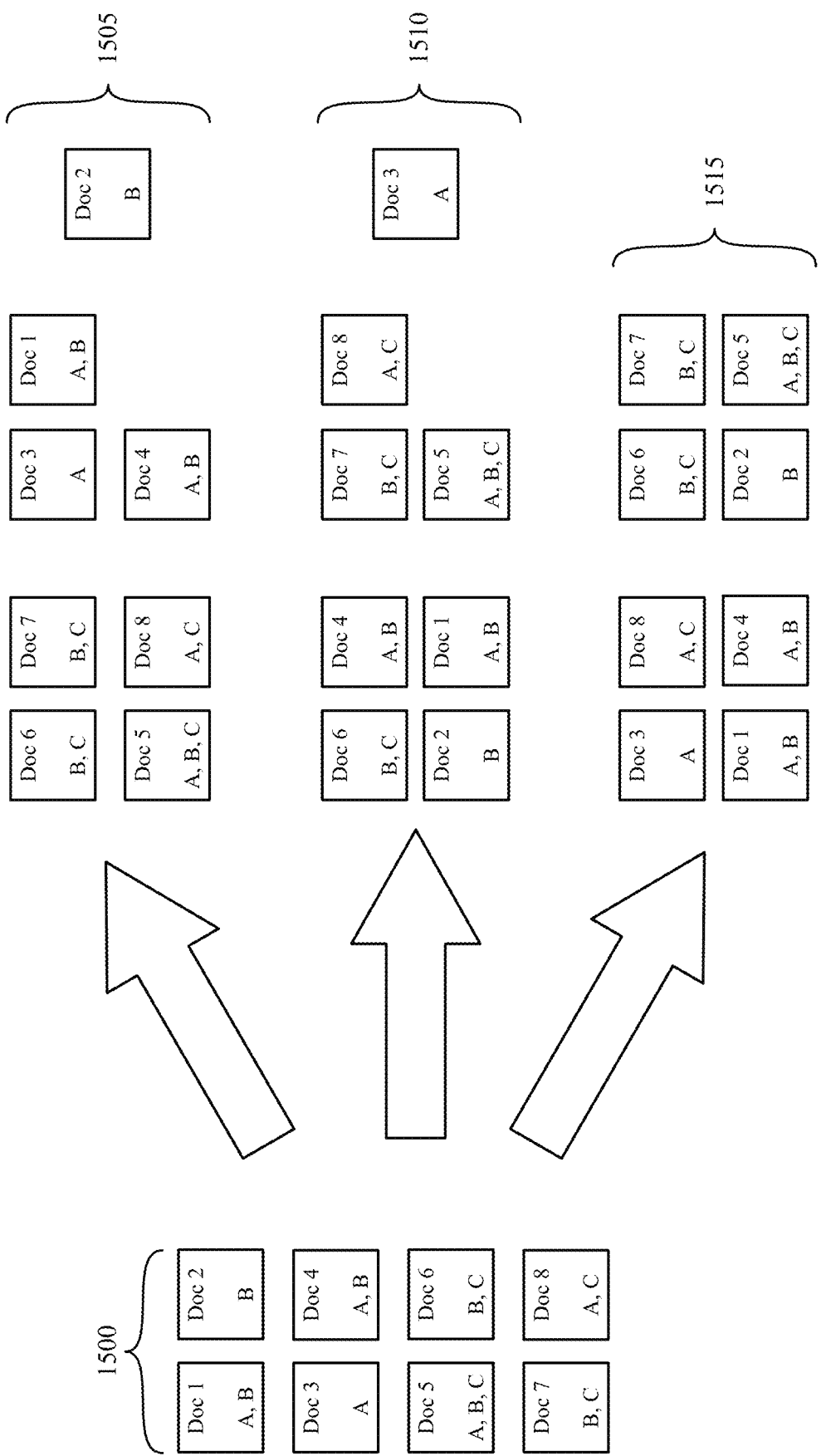
FIG. 15 conceptually illustrates a set of documents along with multiple possible groupings for those documents.

FIG. 15 conceptually illustrates a set of documents 1500 along with multiple possible groupings 1505-1515 for those documents. In some embodiments, the goal of the grouping process is to find an optimal grouping that minimizes the number of documents that are left ungrouped, for a minimum (and maximum) number of documents that can be assigned to a group. The iterative process is dynamic, such that a choice of which tag to select or which documents to select for a group based on the selected tag will affect the next tag selected, and may affect the set of documents left unassigned at the end.

In FIG. 15, the set of documents 1500 includes eight documents (labeled Doc 1-Doc 8) that are each assigned one or more of the tags A, B, and C. The figure illustrates three possible groupings 1505-1515 with a minimum of three documents in a group, though numerous other groupings are possible. In the first grouping 1505, the tag C is selected on the first iteration, and four of the documents (Docs 5-8) are assigned to the group for tag C according to a set of heuristics (which may use random selection to break ties between otherwise even options). Next, tag A is selected for the second iteration, and three of the remaining documents (Docs 1, 3, and 4) are assigned to the group for tag A. However, this leaves one document (Doc 2) without a group.

In the second grouping 1510, the tag B is selected on the first iteration, and four of the documents (Docs 1, 2, 4, and 6) are assigned to the group for tag B according to the set of heuristics. Next, tag C is selected for the second group, and the grouping process assigns the three remaining documents (Docs 5, 7, and 8) that are assigned tag C to this group. Again, this leaves one document (Doc 3, in this case) unassigned.

For the third grouping 1515, the tag A is selected on the first iteration, and four of the documents (Docs 1, 3, 4, and 8) are assigned to the group for this first tag according to the set of heuristics. Next, tag B is selected for the second group, and the grouping process assigns all four of the remaining documents (Docs 2 and 5-7) to this second group. This last grouping option 1515 does not leave any unassigned documents, and is thus an optimal solution of the three. A quick examination finds that there are several other groupings (e.g., Doc 5 could be switched from the tag B group to the tag A group, and Doc 1 and/or Doc 4 could be switched from the tag A group to the tag B group).

Because this is a simple example with only eight documents and three tags, finding an optimal solution with no unassigned documents is easy. However, for larger numbers of documents with more tags, minimizing the unassigned documents may be much more difficult (and computationally intensive). In fact, the general problem is such that in some embodiments it is not computationally feasible to explore the entire solution space (it is a NP-hard problem). Thus, some embodiments use an algorithm for grouping that uses heuristic move-ordering, heuristic position-evaluation, and brute force endgames to evaluate solutions in a style similar to single-player game strategy evaluations.

For the algorithm, notions of a position (a partial allocation of documents to groups, within the allowable range of group sizes) and a move (assignment of some articles to groups, which is a change in state from one position to another position) are defined, as well as a fast and simple move-ordering heuristic (e.g., minimizing the number of documents that will not be assignable to any group as a result of a move, referred to as orphans). In addition, the algorithm uses a probabilistic move evaluation function (e.g., the number of orphans remaining after a greedy algorithm is run that approximates the remaining moves in some embodiments).

From a single player game strategy perspective, the algorithm starts at an initial position (no articles yet allocated to groups) and selects a top K moves $m_1, m_2, \ldots m_K$ based on the move heuristic, which lead to corresponding positions $P_1, P_2, \ldots P_K$. For each of these positions, the algorithm computes the evaluation function, and executes the move with the best result from the evaluation function to advance to the next position (i.e., a selection of a set of documents for a group based on a particular tag). This process is repeated until sufficiently few articles remain to be grouped that a full exhaustive search can be run (in some embodiments, the exhaustive search is run with dynamic programming to avoid duplication). Because the algorithm is based on a probabilistic evaluation function and evaluating only a limited (K) number of moves (which may be selected randomly when numerous moves all have the same heuristic value), some embodiments rerun the algorithm multiple times (e.g., with increasing values of K) in order to identify progressively better solutions. The algorithm can exit either after a fixed time, or when necessary because the user has scrolled down to view the groups.

Figure 16A:
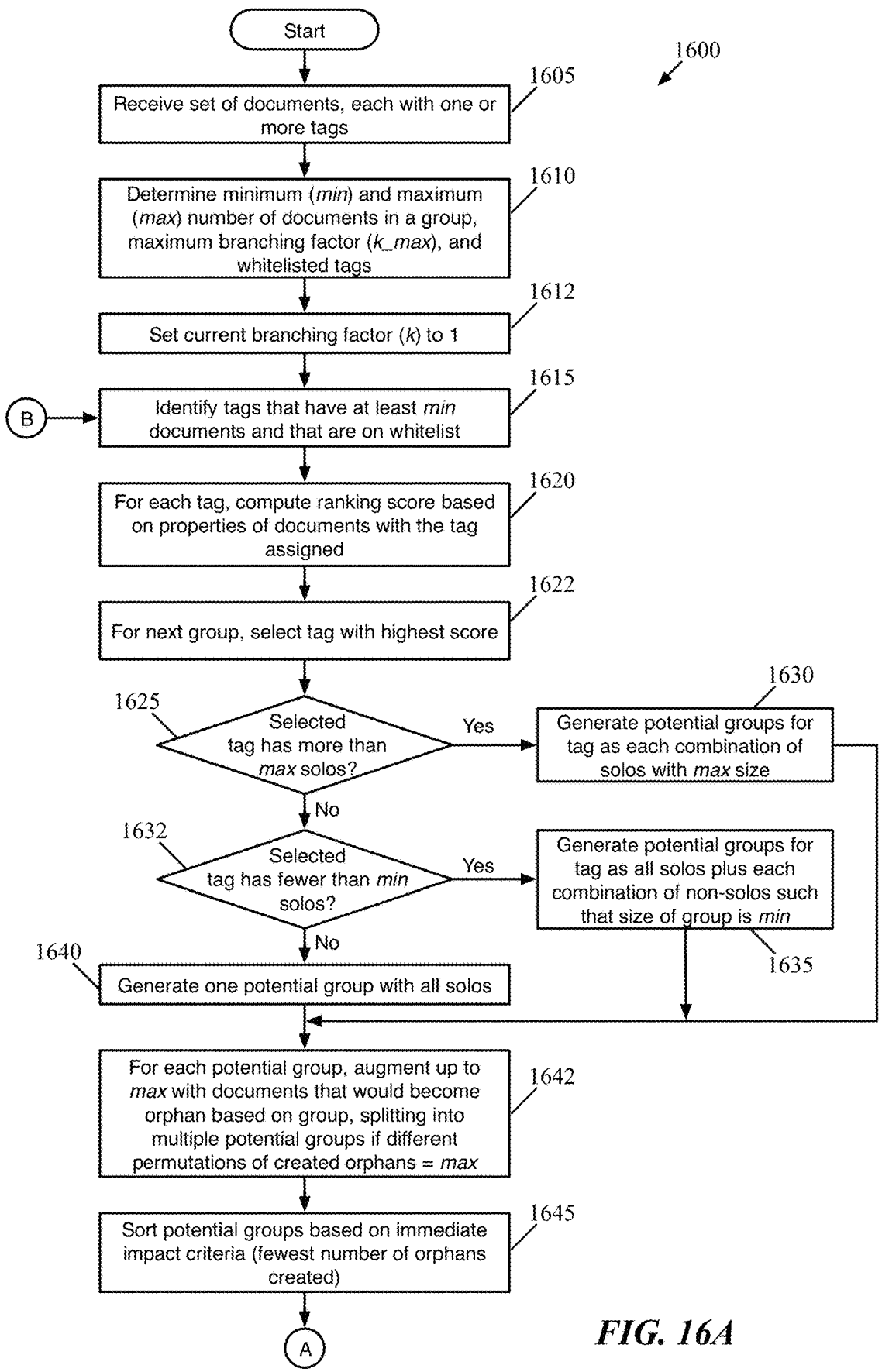
FIGS. 16A-B conceptually illustrates a process of some embodiments for performing dynamic grouping operations.
Figure 16B:
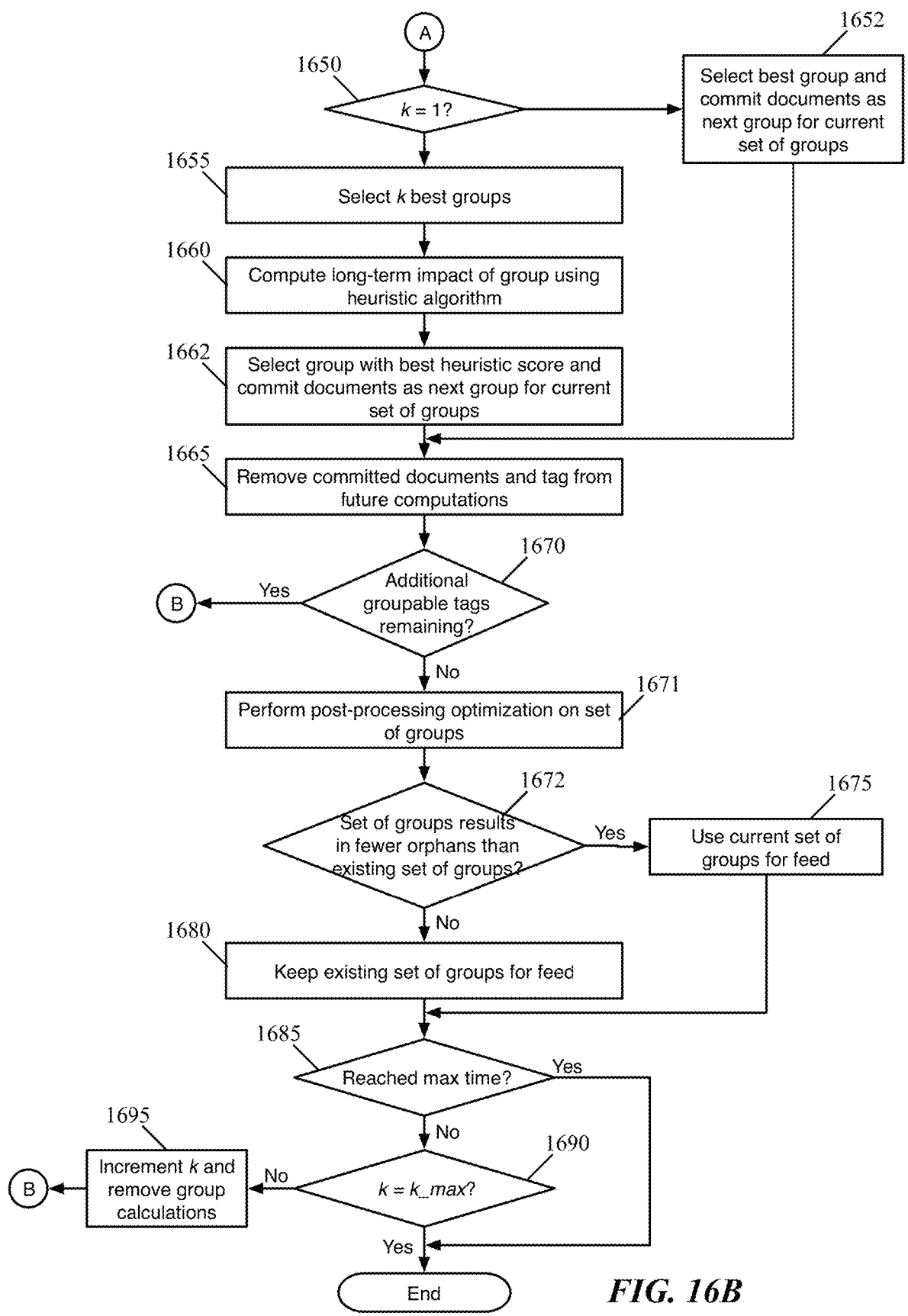

FIGS. 16A-B conceptually illustrate a process 1600 of some embodiments for performing such dynamic grouping operations. This process 1600 is performed on a device (e.g., a smart phone, tablet, or other user device) in some embodiments, when a user of the device attempts to view new documents in a feed. One of ordinary skill in the art will recognize that this process 1600 is merely one possible process for dynamically grouping documents on a device, and variations on this process (or wholly different algorithms) may also be used to group documents for the document feed of some embodiments.

As shown, the process 1600 begins by receiving (at 1605) a set of documents, each of which has been assigned one or more tags. In some embodiments, the device receives a set of documents that are new since the last time the feed was accessed. This may be a large number of documents, and the device then selects a subset of these documents according to a personalization algorithm. The personalization algorithm of some embodiments personalizes the feed according to past history and/or specified preferences of the user of the device. Some embodiments select up to a fixed number of documents using the personalization algorithm (e.g., 25, 60, 100, etc.), or select a fixed percentage of the number of new documents (up to a maximum, in some cases). The personalization processes of some embodiments are described in greater detail in U.S. Provisional Applications 62/276,919 and 62/310,751, which are incorporated herein by reference, and in concurrently filed U.S. patent application Ser. No. 15/273,943, entitled "Document Selection and Display Based on Detected Viewer Preferences", which claims priority to these two provisional applications and is incorporated herein by reference.

Each of the selected documents (and the unselected documents, for that matter) are assigned zero or more tags, which in some embodiments identify that the document relates to a particular topic. In some embodiments, the tag assignment is performed by the servers that amalgamate the documents and distribute the documents to the user devices. In general, documents will have more than one tag, as the tags may range from specific (e.g., a specific person) to general (a high-level topic such as politics, sports, etc.). Furthermore, some embodiments may include tags for categories other than topics, such as the source of a document or other category.

The process 1600 determines (at 1610) minimum and maximum numbers of documents that are allowed in a group (min and mar), a maximum branching factor (k), and a set of whitelisted tags. These variables used by the dynamic grouping optimization algorithm may be defined in the code of the device, or may be changed from time to time on the back-end servers (and pushed to the device). The whitelisted tags are a set of tags defined for use in grouping. Like the algorithm variables, this whitelist may be predefined in the code of the device, or updated by the set of servers as different topics become more popular within the articles provided by the set of servers, and provided to the device. In some embodiments, the whitelist primarily contains more general tags for high-level topics in favor of very specific tags. It should be understood that this operation 1610 does not necessarily happen at this particular stage in the process, as these variables might already be known, rather than determined at a specific operation.

The process then sets (at 1612) a branching factor (referred to as k) to 1. This branching factor, as described in more detail below, determines how many possible groupings will be evaluated using a heuristic algorithm (e.g., the greedy evaluation algorithm mentioned above) at each iteration of the process. Some embodiments use a constant branching factor for each run through the documents, as in the process 1600, while other embodiments use processes that vary the branching factor within a run. That is, the process 1600 increments k after all of the documents have been assigned to groups (or left unassigned). Other embodiments, however, may set a pattern of k-values for different iterations within an assignment of documents to groups (e.g., starting at larger values of k, but decreasing for later iterations when fewer documents and tags remain).

The process 1600 then begins the actual iterative algorithm of some embodiments. The process identifies (at 1615) tags (from the remaining tags, if not on the first iteration) that have at least min documents and that are on the whitelist. These are the set of tags to be used for grouping, also referred to as groupable tags. The min value may be based on a minimum number of documents that have been determined to be required to form an aesthetic group in the documents feed (e.g., 3, 5, etc.). In some embodiments, the whitelist check is performed prior to the iterative aspects, while the minimum number of documents may remove tags from consideration after one or more iterations through the grouping operations.

With the groupable tags identified, the process 1600 iteratively selects a tag to use to form a group, identifies one or more potential groups of documents for the tag (out of all of the documents that are assigned the tag), uses a set of heuristics to select one of the identified potential groups, and assigns the documents in the selected potential group to a group for the selected tag. The device then removes the documents in the selected group for the next iteration. In some embodiments, the goal of the iterative process is to minimize the number of documents that are left unassigned to any group. In assigning documents to groups, some embodiments ensure that each group has at least a minimum number of documents (e.g., 3, 5, etc.) and no more than a maximum number of documents (e.g., 10, 12, 20, etc.), in order to form aesthetic groupings.

To select a tag for a particular iteration, the process 1600 computes (at 1620), for each groupable tag, a ranking score based on properties of the documents that are assigned the tag. In some embodiments, this score factors in at least (i) a number of documents that are assigned the tag (the size of the tag) and (ii) a number of documents for which that tag is the only tag assigned (referred to as "solos"). For example, some embodiments calculate the score as the number of solos multiplied by a first weighting factor plus the size multiplied by a first weighting factor. In some embodiments, these weighting factors are determined by running machine learning algorithms on historical user data.

Some embodiments may also use other factors relating to the tag (e.g., personalized relevancy scores of the documents assigned the tag) multiplied by other weighting factors. For a simpler formula, some embodiments effectively use the number of solos as a primary score and the size (e.g., smallest number of documents or largest number of documents) as a tiebreaker. If multiple tags have the same score, some embodiments randomly order the tied tags. As a result of such random selections, running the iterative process multiple times may yield progressively better results (or occasionally worse results, in which case the new results will not be used). The process then selects (at 1622) the tag with the highest score for the next group.

Figure 17:
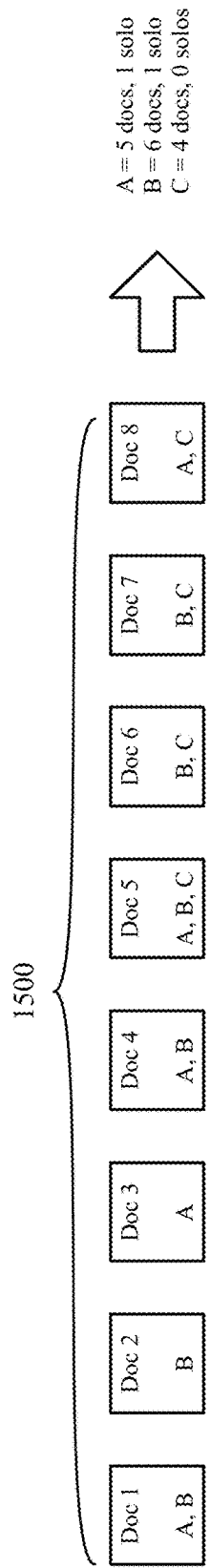
FIG. 17 conceptually illustrates a calculation for the set of documents from FIG. 15 that identifies statistics regarding several groupable tags.

FIG. 17 conceptually illustrates this calculation for the set of documents 1500 from FIG. 15. As shown, there are three groupable tags (A, B, and C) in this example. With most of the documents (all but Docs 2 and 3) having multiple tags assigned, the computation identifies that tag A is assigned to 5 documents including 1 solo, tag B is assigned to 6 documents including 1 solo, and tag C is assigned to four documents with no solos. In this case, using the above criteria, both tag A and tag B have the most solos (1), so size is used as a tiebreaker. For some embodiments, the smaller group is used as a tiebreaker, to prevent too many of the non-solo documents with the tag from being used in other groups. Thus, in this example, the grouping algorithm of some embodiments would choose tag A for the first group. If there is a tie in both criteria, some embodiments randomly select one of the co-optimal tags.

Though not shown in these figures, some embodiments may use additional optimizations in identifying which tag to select. For instance, some embodiments may prefer tags that are assigned to documents with higher personalization scores for the device user, or tags that themselves are preferred by the user. The personalization scores of some embodiments are described in further detail in U.S. Provisional Applications 62/276,919 and 62/310,751, which are incorporated by reference above.

Once a tag is chosen for a particular iteration, some embodiments identify a set of potential groupings of the documents for the tag, with each potential group including all of the solos for the group (unless the number of solos is larger than the maximum number in a group). Again, the process 1600 illustrates one possible means to come up with these groups, while other techniques may be used in other embodiments.

Specifically, the process 1600 determines (at 1625) whether the selected tag has more solos than the maximum number of documents allowed in a group. If this is the case, then the process generates (at 1630) a set of potential groups for the selected tag by determining each possible permutation of solos with the max size. For instance, if there are 18 solos and the maximum group size is 12 documents, then there are a total of $(18!)/(12!)(6!)=18,564$ potential groups. However, as noted below, in this case all of these possible groups will have the same cost, so one will be chosen randomly.

If there are fewer than mar solos for the selected tag, the process 1600 determines (at 1632) whether the selected tag has fewer than min solos. If this is the case, then the process generates (at 1635) potential groups for the tag as (i) all of the solos for the tag plus each combination of the remaining documents needed to reach the minimum number of documents for a group. For example, the potential groups for tag A in FIG. 17 (for a min value of 3) would all include the one solo, then two of the other four documents assigned tag A (for a total of $(4!)/(2!)(2!)=6$ potential groups). In other embodiments, all group sizes from minimum to maximum are put forth as potential groups, though this may result in a very large number of potential groups.

If the number of solos is at least min and no greater than max, then the process 1600 generates (at 1640) one potential group with all of the solos. In other embodiments, the process uses all of the solos, as well as various combinations of all possible group sizes from the number of solos up to max. That is, if max=12 and a tag has 8 solos, then the lone group of 8 as well as all possible groups of 9, 10, 11, and 12 will be calculated as potential groups.

With the potential groups initially computed, the process 1600 then augments (at 1642) each particular potential group with documents that would otherwise become an "orphan" (a document that would no longer be assigned any groupable tags) as a result of using that particular potential group. If there are already the maximum number of documents in the group, then the group will not be augmented. Furthermore, if the potential group creates more orphans that are assigned the selected tag than can be added (because max number of documents will be reached), then some embodiments split this potential group into multiple potential groups, by selecting different combinations of the would-be orphans. Other embodiments may not include such an augmentation operation.

Orphans can be created by a potential group in three different ways, in some embodiments. First, any solos for a tag that cannot be included because max is already reached for a potential group will be an orphan. Second, a document might have multiple tags (e.g., A/B), but as a result of the group selection for one of those tags, the other tag will no longer be assigned to enough remaining documents to form a group. These orphans may be augmented to the potential group at operation 1642. For example, if there are three documents with tags A/B and two solos with tag A, then a potential group of the two solos and one of the A/B documents will leave the other two A/B documents as orphans (but they can be added to this potential group). In addition, some embodiments augment groups from previous iterations with these orphans when possible (e.g., so long as those existing groups do not already have max documents).

The third type of orphan is similar, but cannot be added into the potential group. If a document is not assigned the tag that is being used to create a potential group, but will not be left with any groupable tags because other documents with the same tags are pulled into the group, this document will be an orphan (and cannot be cured by adding it to the potential group). For example, if there are two B/C documents, one A/B document, and two solos with tag A, then a potential group of the one solo and the two A/B documents will leave the two B/C documents as orphans (all examples here assuming a min value of three). Some embodiments will also augment committed groups from previous iterations when possible as well (so long as doing so will not go past max documents). In the preceding example, if there was already a group for tag C, then the two B/C documents could be added to that group. This allows the algorithm of some embodiments to encode each potential group as (X, Y, Z), where X=the set of documents in the potential group, Y=the would-be orphans assigned to committed groups, and Z=the set of orphans produced by the potential group.

Once the potential groups for the iteration are finalized, the process 1600 sorts (at 1645) the potential groups based on a short-term or immediate impact criteria—in this example, the number of orphans created. Some embodiments use size as a tiebreaker (e.g., preferring larger groups, up to max number of documents). In some embodiments, the device calculates a score using weighting factors, as with the tag selection at 1620 and 1622. For instance, some embodiments use the number of new orphans created by a potential group (e.g., Z in the encoding above) and the size of the potential group as weighted factors in the calculation. Other factors may be included in some embodiments, such as the personalized relevancy scores of the documents in the potential group. In some embodiments, these weighting factors are determined by running machine learning algorithms on historical user data. Irrespective of how it is calculated, the immediate impact score is a heuristic that can be calculated quickly by the device for each group, and does not involve approximating the rest of the group assignment process.

Figure 18:
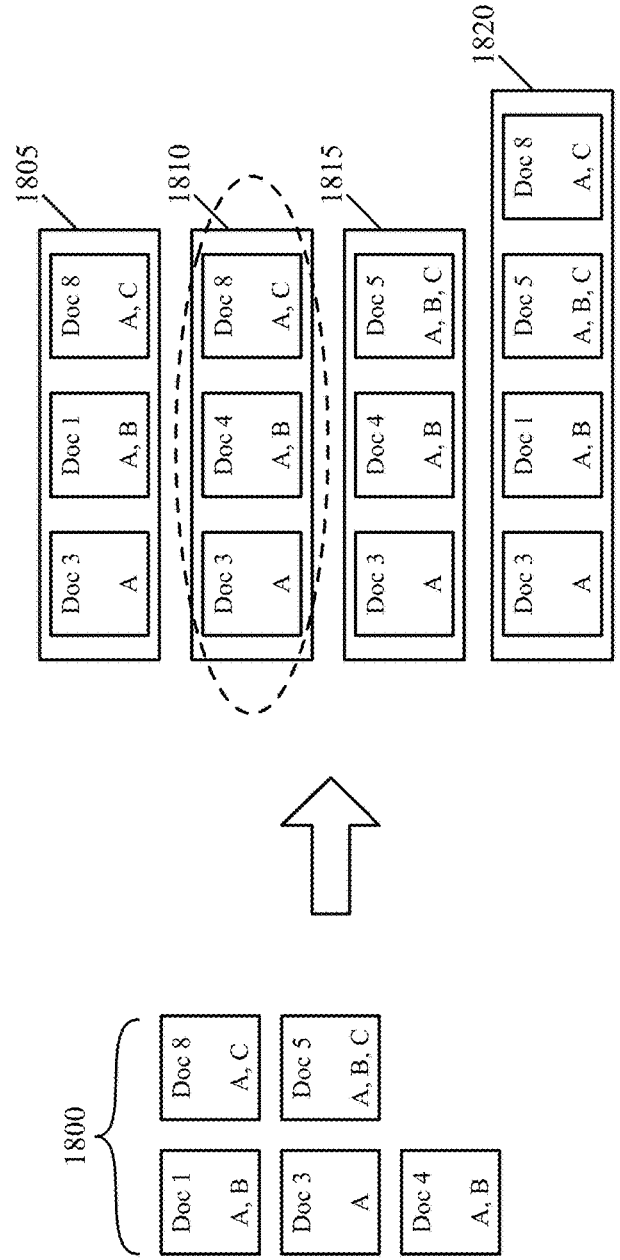
FIG. 18 illustrates an example of the computation of potential groups for some of the documents from FIG. 15.

FIG. 18 illustrates an example of the computation of potential groups for some of the documents 1500. Specifically, the tag A has been selected, so the dynamic grouping process would be creating potential groups from the set of five documents 1800 that are assigned tag A (Docs 1, 3, 4, 5, and 8). As shown, numerous potential groups are computed, including four groups 1805-1810 shown here. In this example, potential groups of multiple different sizes are created, rather than only groups of size three (min). Each of the potential groups will include Doc 3, because this is a solo assigned tag A, and then include at least two additional documents from the set 1800. In this example, assuming tag A is the first tag being processed, none of the documents will create any orphans, and the process selects group 1810 randomly.

Returning to FIG. 16, the process 1600 determines (at 1650) whether the current value for the branching factor k=1. As mentioned, some embodiments initially run the dynamic grouping algorithm by selecting a top potential move using only the short-term impact heuristic, and do not calculate the long-term impact of any of the potential moves. However, if time allows, some embodiments re-run the operations using larger branching factors (e.g., k=2, 3, . . . ). Thus, if k=1, the process selects (at 1652) the best potential group (ordered according to the short-term impact heuristic), and commits the documents in that potential group as the next group for this current set of groups. In some embodiments, when the short-term impact scores are equal for several groups, the process selects one of the groups randomly (as in FIG. 18). Some embodiments also use the size of a group as a first tiebreaker (e.g., preferring larger groups, or even groups of specific sizes that have been determined to be most aesthetic).

However, if k>1, the process 1600 selects (at 1655) the k best groups according to the short-term impact heuristic, again selecting randomly if necessary to break ties. The process computes (at 1660) a long-term impact evaluation of the group using a heuristic algorithm. For the longer-term impact heuristic, some embodiments use a greedy algorithm that approximates the rest of the groupings and identifies a number of orphans that result at the end of this approximation. The process then selects (at 1662) the potential group (of the k groups evaluated) with the best long-term heuristic score, and commits the documents in that potential group as the next group for this current set of groups. For tiebreakers, some embodiments use the short-term impact heuristic (e.g., the new orphans created) and size of group (e.g., preferring larger groups or even groups of specific sizes that have been determined to be most aesthetic), before selecting randomly among equal potential groups.

Various different algorithms may be used for this long-term impact evaluation. As mentioned, some embodiments use a greedy algorithm that quickly creates potential groups for various tags. For instance, some embodiments attempt to find groups of each particular allowable size from the remaining documents. As an example, if the allowable group size is 3-12, a "bottom-up" algorithm initially identifies any tags that are assigned to exactly 3 documents in the remaining documents, and create groups of 3 for these tags. Next, with these documents removed, the algorithm identifies any tags that are assigned to exactly 4 documents, and creates groups of 4 for these tags. This sweep of the documents proceeds up until any groups of exactly 12 are identified. Because this will often leave many groups unidentified (e.g., pulling 4 documents with tag A out might result in a group of 3 for tag B that was otherwise a group of 5), some embodiments repeat these sweeps until all documents that can be grouped have been. The resulting evaluation score, in some embodiments, is the number of orphans left over after the evaluation is performed.

Some embodiments use more complex scoring based on the long-term impact evaluation. As the evaluation results in a grouping of the documents, some embodiments compute a grouping score as a sum of group scores for each group within the grouping (set of groups). These group scores, in some embodiments, are computed as a factor of group size and/or document scores within the group. Each document, in some embodiments, is scored as a combination of a document relevancy score and potentially other features. Each of these sub-scores may use weighting factors in some embodiments. In addition, some embodiments explicitly factor in the number of orphans, while in other embodiments the score accounts for these by using the size of each group as a factor in the score (assuming the same initial number of documents, larger groups on the whole indicate fewer orphans).

As mentioned, multiple different algorithms that operate in this manner may be used. For instance, if the algorithm in the previous paragraph (one sweep, starting at min and finishing at max) is referred to as bottom-up (BU) sweep, and the opposite algorithm (one sweep, starting at max and finishing at min) is referred to as top-down (TD) sweep, the following options are some of the possibilities (it should be understood that other possibilities for the long-term evaluation function may be used, either based on these algorithms or using different algorithms):

TD: one TD sweep

BU: one BU sweep

TD*: continue repeating TD sweeps until the number of orphans is not being reduced BU*: continue repeating BU sweeps until the number of orphans is not being reduced TDBU: one TD sweep followed by one BU sweep BUTD: one BU sweep followed by one TD sweep TDBU*: continue repeating TDBU sweeps until the number of orphans is not being reduced BUTD*: continue repeating BUTD sweeps until the number of orphans is not being reduced IO: instead of proceeding from min to max or vice versa, schedule based on the preferred aesthetic group sizes (e.g., start in the middle and work outwards, such as 7/8/6/9/5/10/4/11/3/12, or possibly repeatedly come back to the preferred sizes (e.g., 7/8/6/9/5/7/8/6/10/4/11/7/8/6/3/12)

IO*: continue repeating IO sweeps until the number of orphans is not being reduced TD*+: continue repeating TD sweeps until the number of orphans is not being reduced, while each sweep at a particular number of documents picks up groups with that size and larger sizes (e.g., when searching for groups with size 8, groups of sizes 9/10/11/12 would also be identified)

BU*+: continue repeating BU sweeps until the number of orphans is not being reduced, while each sweep at a particular number of documents picks up groups with that size and smaller sizes (e.g., when searching for groups with size 8, groups of sizes 7/6/5/4/3 would also be identified)

IO*+: continue repeating IO sweeps until the number of orphans is not being reduced, while each sweep at a particular number of documents picks up groups with that size and previous sizes Irrespective of which long-term impact evaluation function is used, an evaluation score (e.g., the number of orphans remaining after performing the algorithm) is calculated for each of the k potential groups, and one of the k potential groups is selected (as indicated above, at 1662). Some embodiments also store a hash of each selected move (e.g., a hash of the current state of documents assigned to groups and remaining documents), so that future runs through the set of documents will not select the same state. Next, the process 1600 removes (at 1665) the committed documents and the tag used for the group from future computations within this run through the documents (some embodiments will keep the tag in case the tag has significantly more than mar solos, and create multiple groups for the same tag, however).

The above describes one iteration of a single run of the dynamic grouping process (i.e., select a tag, identify potential groups for the tag, select a potential group and commit documents for tag). The process then goes through a series of determinations to identify (i) whether to perform more iterations for the current run, and (ii) if the current run is complete, whether to perform another run (with a larger branching factor).

Thus, the process 1600 determines (at 1670) whether additional groupable tags remain after the most recent group has been committed. Assuming groupable tags remain, then the process returns to 1615, to identify the size and solo statistics for each remaining tag and select a next tag. However, if there are no tags remaining that are assigned to at least the min number of documents, then the process has completed the current run.

In this case, the process performs (at 1671) post-processing optimizations on the set of groups. In some embodiments, the process identifies any orphans that remain, and attempt to add each of these orphans to one of the groups in the set of groups (e.g., if this is not handled at the augmentation operations). Furthermore, some embodiments define an ideal range for group sizes in addition to the explicit min-ma range. For groups that are outside this range (e.g., a range of 6-10 documents), some embodiments try to swap documents between groups (for documents that have more than one tag) so as to produce more groups within the ideal size range.

With the set of groups complete, the process 1600 then determines (at 1672) whether the current (recently computed) set of groups results in fewer orphans than an existing set of groups. If k=1, and this is the first time the set of documents has been grouped, then there will not be an existing set of documents yet. However, for subsequent runs, the document grouping is compared to the previous best existing run to identify which should be kept going forward. For instance, if the first run (with k=1) returns a grouping that leaves six orphans while the second run (with k=2) returns a different grouping that leaves three orphans, the second grouping will be used. Thus, when the current grouping results in fewer orphans than the existing grouping, the process uses (at 1675) the current grouping as the set of groups for the feed, replacing the existing grouping. Otherwise, the process keeps (at 1680) the existing grouping.

Some embodiments use more complex scoring to compare sets of groups to each other. For instance, some embodiments compute a grouping score as a sum of group scores for each group within the grouping (set of groups). These group scores, in some embodiments, are computed as a factor of group size and/or document scores within the group. Each document, in some embodiments, is scored as a combination of a document relevancy score and potentially other features. Each of these sub-scores may use weighting factors in some embodiments. In addition, some embodiments explicitly factor in the number of orphans, while in other embodiments the score accounts for these by using the size of each group as a factor in the score (assuming the same initial number of documents, larger groups as a whole indicate fewer orphans).

The process 1600 then determines whether to run the iterative grouping operations again (e.g., with a new value of k). Different embodiments may use different conditions than those shown here, as the process 1600 presents one example of such a process. As shown, the process determines (at 1685) whether a maximum time has been reached. This time may be a hard cap (e.g., 50 ms from the receipt of the documents) or may be based on user interaction. For instance, some embodiments continue repeating the iterative process until either (i) a grouping that produces no orphans is found (this condition is not shown in process 1600) or (ii) the user has scrolled her feed display past the static content shown at the top, such that the device is required to display groups. If the maximum time has been reached, the process 1600 ends.

Otherwise, if more time remains, the process determines (at 1690) whether $k=k_{max}$. As mentioned above, some embodiments set a maximum branching factor so that the process will not run unendingly if the user never scrolls past the trending topics. As the branching factor increases, each run through the documents becomes more and more processor-intensive, and some sets of documents may not have a perfect (zero-orphan) solution. Thus, some embodiments set a maximum branching factor, and end once this is reached.

However, if $k_{max}$ has not yet been reached, some embodiments increment (at 1695) the value of k and remove the group calculations (i.e., remove the commitment of documents to any group, so that the original group remains. The process then returns to 1615 to begin the iterative process again and come up with another grouping of the documents.

One aspect of this iterative process is that the selection of documents for a tag in a first iteration will affect which tag is selected in the next iteration (and in subsequent iterations). That is, in some cases, selecting a first group of documents for a first tag results in the device selecting a second tag in the next iteration of the process, whereas selecting a second group of documents for the first tag results in the device selecting a third tag in the next iteration of the process rather than the second tag. This result occurs because documents may be assigned multiple groupable tags, and assigning a document to a group for a first one of its tags means that it will not be assigned to a group for any of its other tags.

Figures 19, 20:
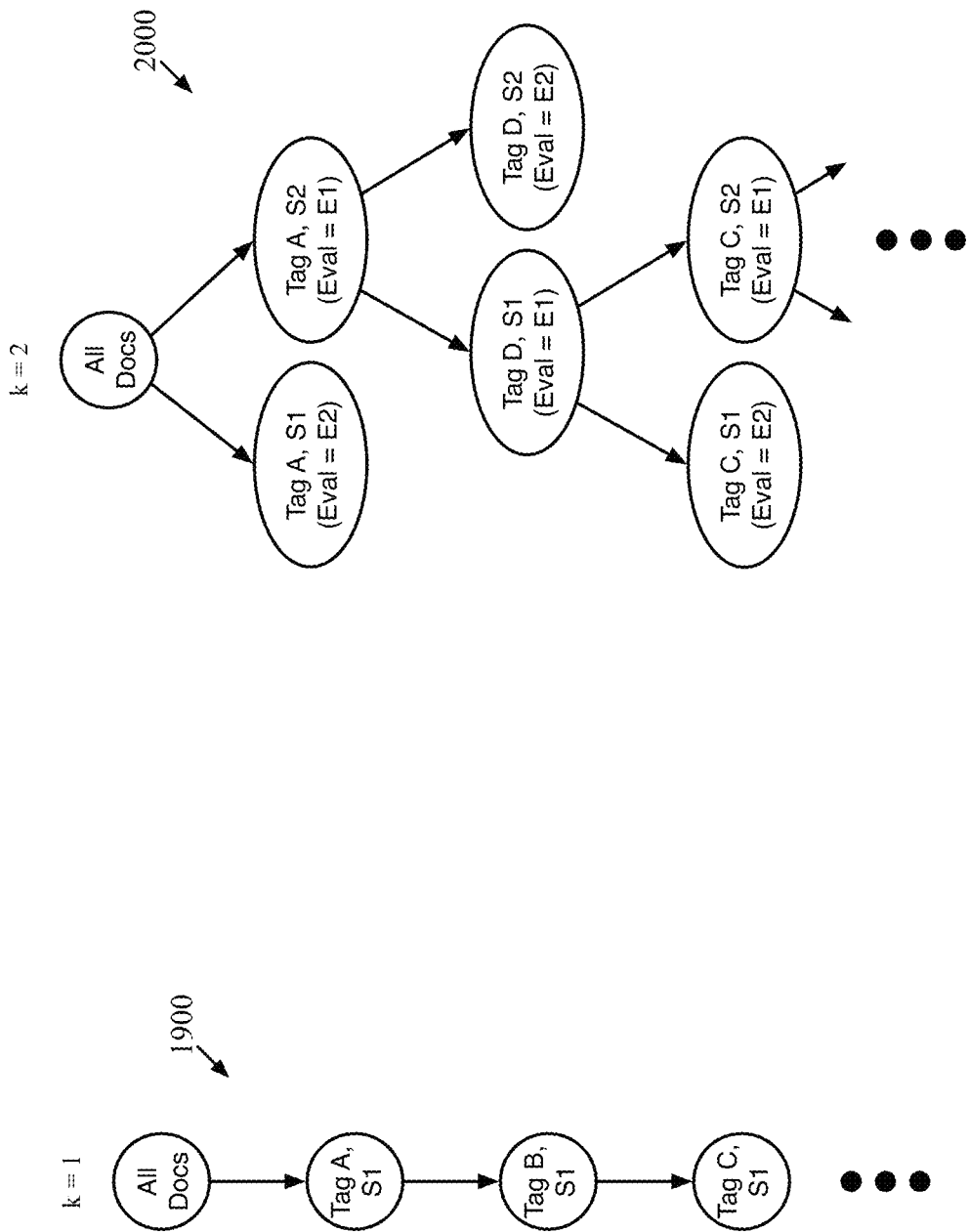
FIGS. 19-21 illustrate a representation of group selection as a tree for increasing values of k, the branching factor.
Figure 21:
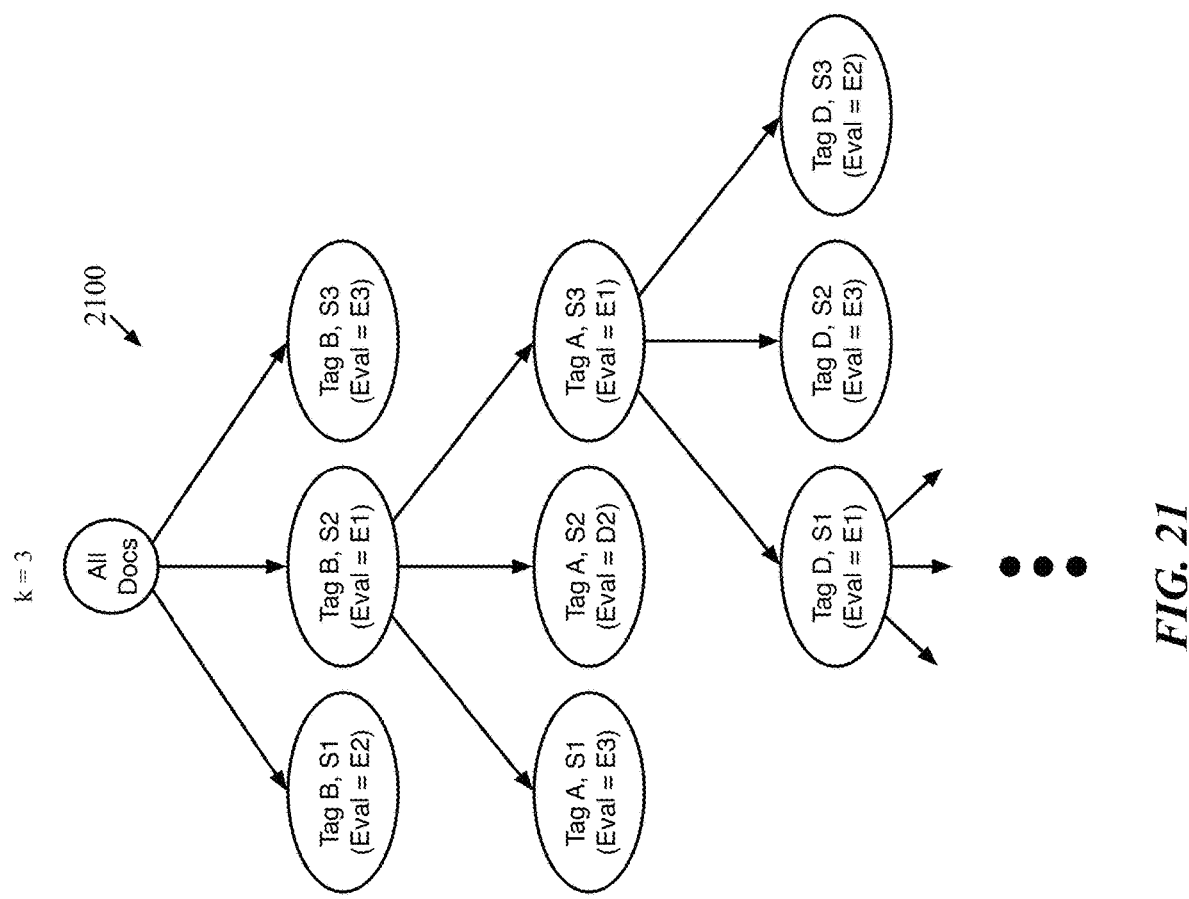

FIGS. 19-21 illustrate this feature for increasing values of k, the branching factor, representing the group selection as a tree. As shown in FIG. 19, for k=1, the graph can be represented as a tree 1900 with one node at each level. This diagram shows that starting with all documents, a first tag (Tag A) is selected. In these diagrams, S1, S2, etc. indicate the potential groups with the best short-term impact heuristics (e.g., number of orphans created, with ties broken randomly). Thus, for Tag A, the top short-term potential group is selected. This results in using Tag B for the next group and again using the top short-term potential group, which itself results in using Tag C, and so on.

In FIG. 20, the branching factor is set to 2, and thus the graph is represented as a tree 2000 with two nodes at each level. In this case, two potential groups S1 and S2 are identified for Tag A, and the evaluation function is applied to both. As shown, this results in evaluation heuristic scores of E2 (for group S1) and E1 (for group S2), with E1 being the best option. As such, a different group of documents is selected for Tag A in this second case. As a result, rather than selecting Tag B for the second group, the grouping algorithm selects Tag D and identifies the top two potential groups. The process calculates evaluation heuristic scores for these top two groups, and selects the potential group with the best score (S1). This process continues until the grouping is complete.

FIG. 21 then illustrates a branching factor of 3, with a tree 2100 having three nodes at each level. In this case, Tag B is selected for the first group (e.g., because it ranked equally with Tag A), and the evaluation function is applied to the top 3 groups for Tag B. The best option is selected, and Tag A is identified as the second tag. Again three options are selected and the evaluation heuristic score calculated for each of them, with the process again continuing until the grouping is complete. As these examples show, the selection of a particular set of documents for a tag may affect both the tag selected for the next group and the set of documents chosen for that next group.

Once a set of groups is determined, these groups are provided to a feed generator in some embodiments. The feed generator determines how to output each group into the feed (e.g., identifying a top article for the group, determining how to arrange the articles in a group, etc.). In addition, some embodiments do not necessarily place the groups in the feed in the order that the iterative process determines them. Instead, other factors may be used to order the groups within the feed, such as the relative importance of the topics to the user based on analysis of the user's reading history, the size of the groups, the generality or specificity of the groups, etc.

Several processes that some embodiments use to arrange the grouped sections in the document layout were described above. Several other processes for arranging the grouped sections will now be described by reference to FIGS. 22-28. These processes identify an arrangement of the grouped sections based on relationships between the groups that the processes dynamically derive from topic identifiers that are associated with documents that are candidates for the document layout. In other words, the arrangement of the grouped sections is not based on static topic relationships that are predetermined, but rather are defined based on a dynamic assessment of the topic identifiers of the candidate documents. This allows the hierarchal relationships of the groups to be different for different sets of candidate documents, as different sets of topic identifiers might be more prevalent in different sets of candidate documents that are identified at different times. Also, this allows hierarchical relationships to be fluidly defined between groups as new topic identifiers are dynamically generated or employed (e.g., as new events occur that are reported by news agencies or blogs).

Figure 22:
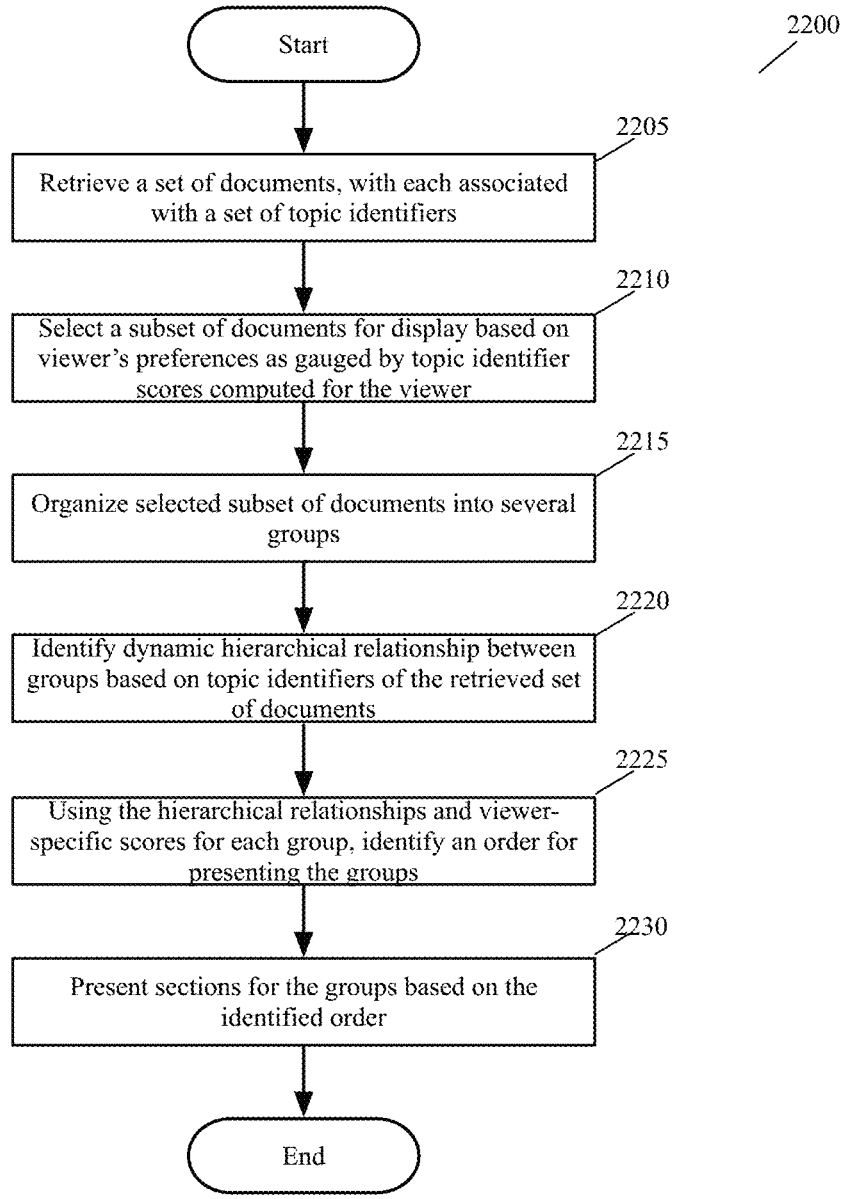
FIG. 22 illustrates an overall process that a document reader of some embodiments performs on some embodiments to display a document feed page that displays summaries of several documents

To illustrate how some embodiments dynamically group documents, assess their relationships, and present these groups, FIG. 22 illustrates an overall process 2200 that a document reader of some embodiments performs to display a document feed page that displays summaries of several documents. This document feeder executes on a computing device (e.g., a computer or a mobile device) in some embodiments. In some embodiments, the document feeder performs the process 2200 when it starts, when it is brought to the foreground or it is directed to do so by a user.

As shown, the document reader of some embodiments initially interacts (at 2205) with a set of servers to identify a set of candidate documents that are candidates for display by the reader. In some embodiments, the server set identifies some or all of the candidate documents based on the document feeds for which the reader is configured (e.g., automatically or based on user selection). In some embodiments, the process receives (at 2205) the candidate documents in order to identify these documents. In other embodiments, the process identifies (at 2205) the candidate documents from the server without receiving these documents in order to conserve network resources that would be uselessly consumed in receiving documents that the reader may never present or summarize for presentation. In these embodiments, the process identifies (at 2205) the candidate documents by receiving metadata about these documents from the server set. The received metadata for a document includes a number of document attributes (e.g., topic tags, feed tags, etc.) in some embodiments. The received metadata for a document also includes in some embodiments one or more components of the document, such as its headline, its headline photo, excerpts and/or RSS feed content. The received metadata in some embodiments also includes a server generated global score for the document.

In some embodiments, each time that the reader performs the process 2200, it asks the server set to identify the candidate documents that are new since the last time that the reader performed the process 2200 and identified the last batch of candidate documents. In some embodiments, each time the process asks (at 2205) the server set to identify a set of candidate documents, the server set identifies all new documents associated with all feeds for which the reader is configured, where a new document is one that the server set has not previously identified for the reader.

After 2205, the process 2200 selects (at 2210) a subset of the identified candidate documents as documents for presenting to the viewer on a feed layout page. The process 2200 selects the subset of documents based on viewer's preferences as gauged by the viewer's prior interactions with the reader (e.g., with the viewer's configuration of the reader, with the viewer's interaction with prior documents that the reader presented, etc.). In some embodiments, the reader detects viewer interactions with one or more displayed documents, and based on these interactions, computes attribute scores for attributes associated with the documents. The computed attribute scores in some embodiments identify a preference ranking for attributes associated with the documents. The reader in some of these embodiments then use the computed attribute scores to select the subset of candidate documents to summarize on the feed layout page. This approach is further described in concurrently filed U.S. patent application Ser. No. 15/273,943, entitled "Document Selection and Display Based on Detected Viewer Preferences", which is incorporated herein by reference. This concurrently filed patent application also describes how some embodiments select a personalized set of documents for presenting on the document summary feed page. As described above and below, some embodiments group the selected personalized set of documents into two or more groups and arrange these groups dynamically on the document summary feed page.

Once the process 2200 selects the subset of identified documents to display, the process 2200 performs (at 2215) one of the above-described processes to organize the selected subset of documents into two or more groups of documents. As mentioned above, the reader might not be able to organize each document in the selected subset into a group. The reader presents summary panes for such ungrouped documents in an ungrouped section of the feed layout page. Also, as mentioned above, the feed layout page in some embodiments includes one or more sections for displaying common content that is specified for all viewers.

After organizing the selected subsets of documents that were identified particularly for the viewer into groups, the process then performs operations 2220 and 2225 (1) to identify dynamic hierarchical relationships between the identified groups (i.e., the groups identified at 2215) based on the topic identifiers of the set of documents retrieved at 2205, and (2) to define a presentation order for the identified groups based on the identified hierarchical relationships and viewer-specific scores for each of the identified groups. These two operations 2220 and 2225 will be further described below by reference to FIGS. 23 and 24.

Once the process identifies an order for the identified groups at 2225, the process 2200 generates the feed layout page with the sections for the identified groups arranged based on the identified order. In addition to grouped sections that show document summary panes for similarly related documents that are collected specifically for a viewer, the feed page layout of some embodiments can also display summary panes for common content specified for all viewers and/or summary panes for documents that could not be grouped with other documents. Hence, in such cases, the order that is identified at 2225 specifies just the order of the sections for the identified groups. Other sections (e.g. the common content sections or the ungrouped document section) might be placed before, between or after the sections for the identified groups.

Figure 23:
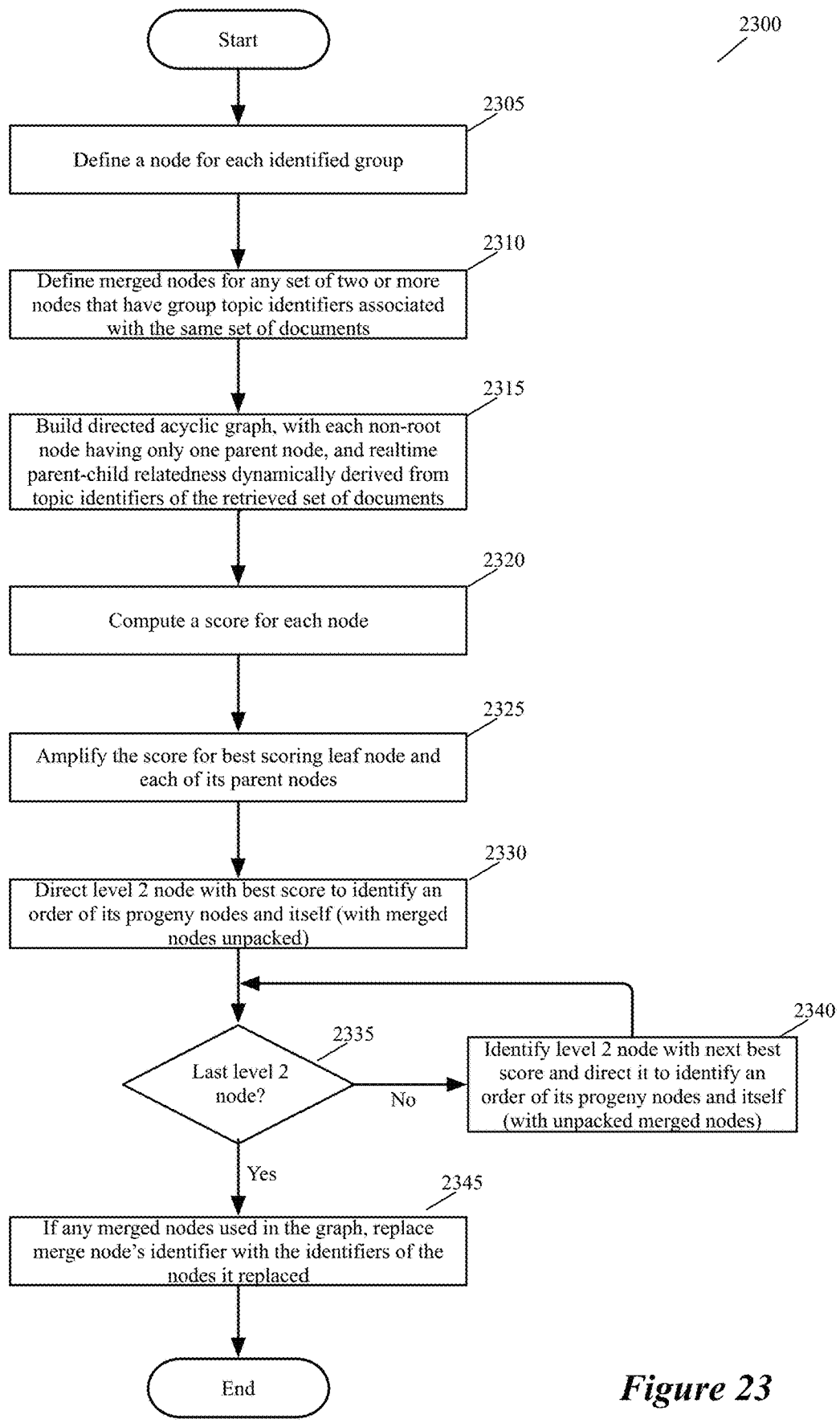
FIG. 23 illustrates a process that identifies the hierarchical relationships between the identified groups and to define a presentation order for the identified groups based on these relationships.

FIG. 23 illustrates a process 2300 that the process 2200 performs (at 2220 and 2225) to identify the hierarchical relationships between the identified groups and to define a presentation order for the identified groups based on these relationships. To do these operations, the process 2300 dynamically generates a node graph that expresses relationships between the groups of documents. The process generates this node graph based on the topic identifiers of the groups as they are used by all the retrieved documents (i.e., by the documents retrieved at 2205). In some embodiments, this graph is a directed acyclic graph in which each non-root node only has one parent node and no lower level node is a parent of a higher level node in the graph. The process 2300 will be described by reference to FIG. 24, which pictorially illustrates examples of several of the operations of the process 2300. Each of these examples is illustrated in a different section 2402-2414 of FIG. 24.

Figure 24A:
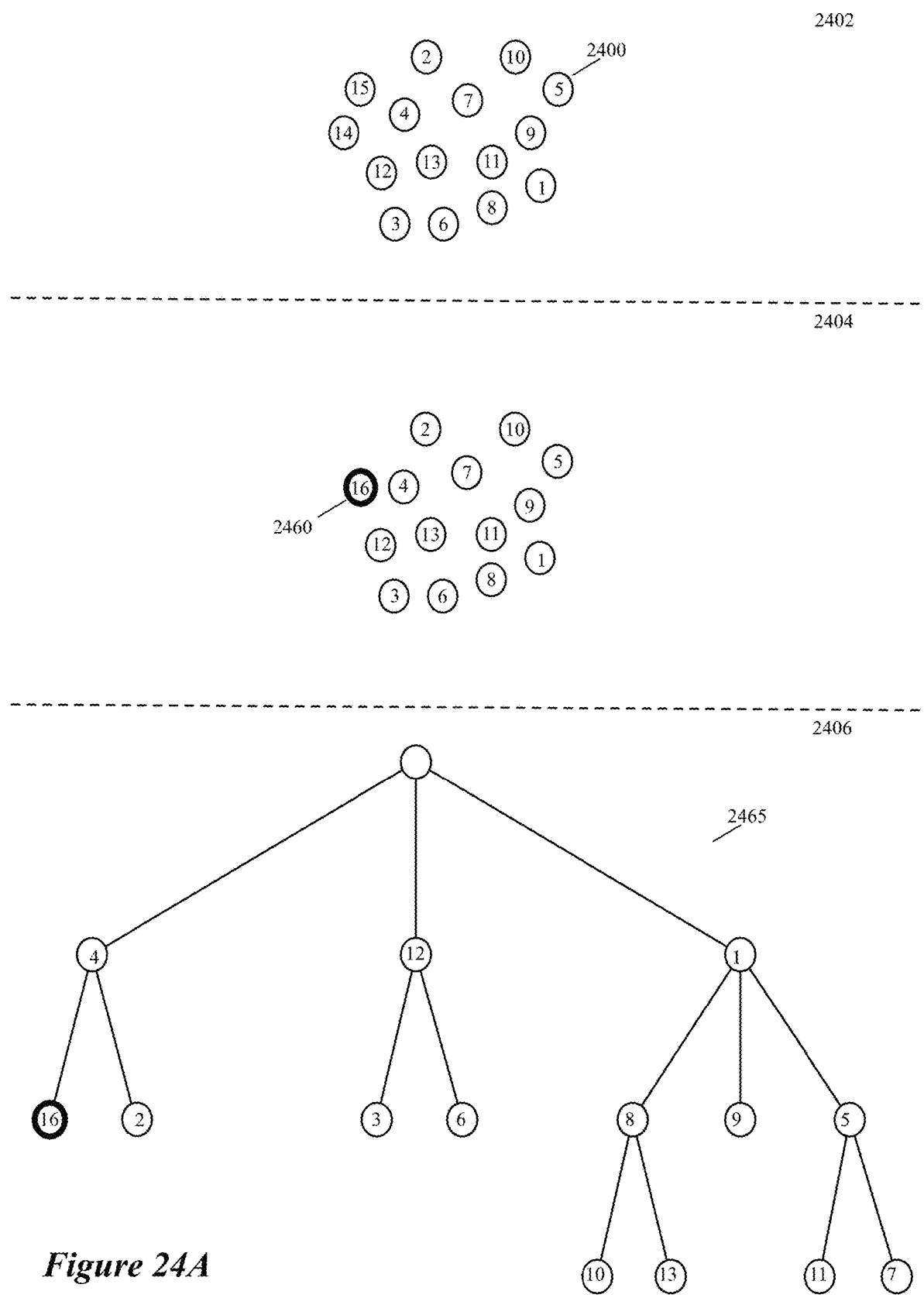
FIGS. 24A-C pictorially illustrate examples of several of the operations of the process of FIG. 23.

As shown, the process 2300 initially starts (at 2305) by defining a node for each group of documents identified (at 2215) by the process 2200. Section 2402 of FIG. 24A illustrates fifteen nodes 2400 that are defined for several document groups identified at 2215. The node that is defined for a group is assigned the topic identifier of the group (e.g., through the node's association with the group).

Next, at 2310, the process 2300 defines a merged node for any set of two or more nodes that are assigned to two or more topic identifiers that are associated with the same exact subset of documents in the retrieved set of documents (i.e., in the documents retrieved at 2205). The merged node replaces the set of nodes for which it was created in the group of defined nodes. Section 2404 of FIG. 24A illustrates the group of defined nodes after two of these nodes (i.e., nodes 14 and 15) have been replaced by a merged node 2460, which is referred to below as the sixteenth node.

The following example illustrates how two nodes that represent two groups of documents might be merged in some embodiments. Assume that two article groups are defined to contain two sets of articles relating to two presidential candidates. For these two groups, the process 2300 initially defines two nodes at 2305. However, at 2310, the process might then determine that each article in the retrieved set of articles (i.e., each article retrieved at 2205) that is tagged with the name of one presidential candidate is also tagged with the name of the other presidential candidate. Hence, at 2310, the process 2300 creates a merged node for the two nodes previously defined for the two groups of articles relating to the two presidential candidates, and has this merged node replace the previously defined two nodes in the group of defined nodes. The merged node replaces the two nodes because for the purposes of assessing relationships based on the topic identifiers, the topic-identifier metadata from the retrieved set of documents cannot differentiate between these two nodes. Hence, these two nodes should just be treated as a single node. The process 2300 reintroduces the nodes that are replaced by the merged node when it reaches the merged node as it walks the graph to specify an ordering of the nodes. When reintroducing these nodes, the process 2300 places these nodes successively in the order in the location that the merged node would have taken in the order.

After 2310, the process 2300 defines (at 2315) directed edges between pairs of nodes in the defined group of nodes (i.e., in the group of nodes initially defined at 2305 that may have been modified at 2310 to include merged nodes). Each directed edge identifies one node as the parent node and another node as a child node. The collection of the nodes and edges defines a directed acyclic graph in which each non-root node only has one parent node and no lower level node is a parent of a higher level node in the graph.

Section 2406 of FIG. 24A illustrates an example of such a graph 2465. As depicted by graph 2465, the graph defined at 2315 has one root node and several non-root nodes. The root node is a placeholder node. The child nodes of the root node (i.e., the nodes in the second level of the graph) are nodes for which the process 2300 cannot identify another one of the defined nodes as a parent node. Hence, the process 2300 assigns the root node as the parent node for these second level nodes, and treats these second level nodes as a top level topic node.

Each non-root node can have one or more child nodes, but each child node can only have one parent node. A non-root node might also not have any child nodes. Such a childless node is referred to as a leaf node. As depicted by graph 2465, the graph defined at 2315 can have different length branches (i.e., different leaf nodes can appear at different depths of the graph). This is because a first group topic identifier might have N other group topic identifiers that successively nest under the first group and each other, while a second group topic identifier might have M other group topic identifiers that successively nest under the second group and each other, where N and M are different numbers. For example, in graph 2465, the root child node 4 only has two child nodes 2 and 16 (with node 16 being the merged node), while root child node 1 has three child nodes 5, 8, and 9, and four grandchild nodes 7, 10, 11, and 13.

At 2315, the process 2300 generates the graph by assessing the parent-child relationships between the defined nodes based on real-time dynamic data, which, in turn, allows the nesting and presentation of the group sections to be based on real-time data (e.g., data that mirrors real-time events in a news cycle). As further described below by reference to FIG. 27, the process 2300 in some embodiments builds the parent-child relationships by using, for the real-time dynamic data, the group topic identifiers as they are used by all the retrieved documents. By using the association between the group topic identifiers and the retrieved documents, the process 2300 establishes the parent-child relationships based on the current usage and prevalence of the topic identifiers, which can be indicative of current events when the documents relate to current events.

Figure 24B:
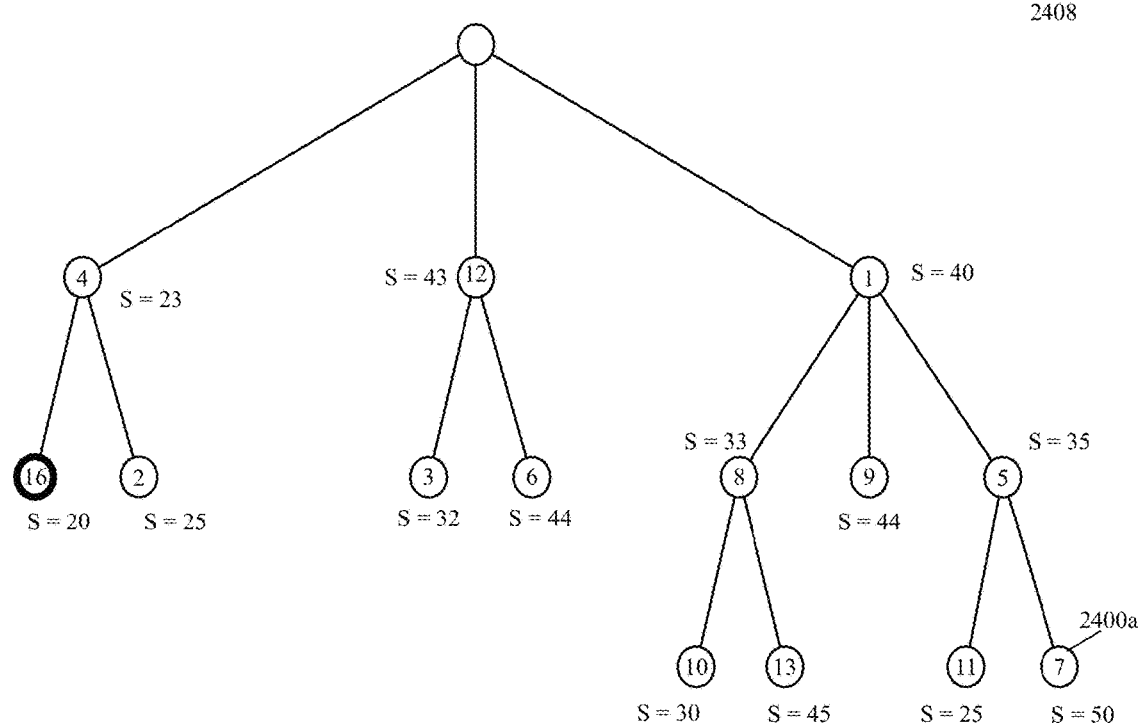
Figure 24B:
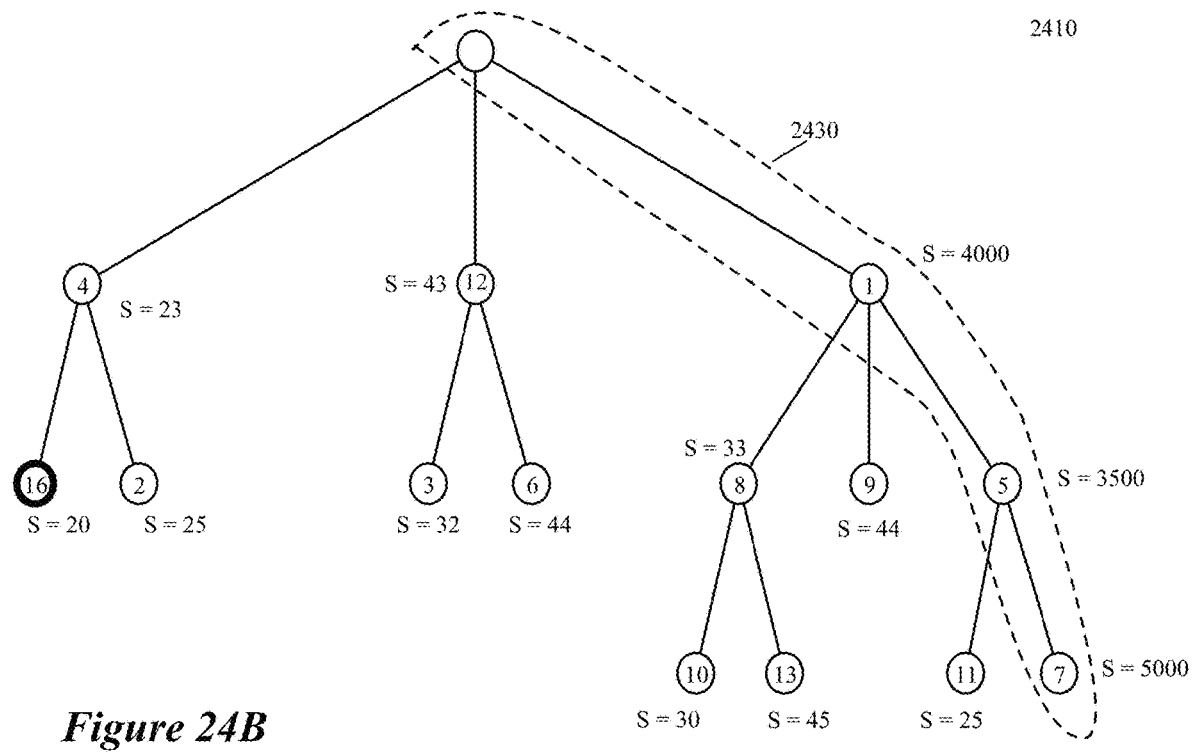

Next, at 2320, the process 2300 computes a score for each node in the graph. Section 2408 of FIG. 24B illustrates the graph 2465 after scores have been computed for each node in the graph. In some embodiments, the process 2300 computes the score for each leaf node as:

$$\text{Leaf Node Score} = (\text{Average\_Personalized\_Article\_Score} + \text{Personalized\_Group\_Score})/2,$$

where Average_Personalized_Article_Score is the average of the personalized scores of the articles in the group represented by the leaf node, and the Group_Score is the personalized score of the group. The personalized group score is based on the viewer personalized score of the topic identifier associated with the group. Computing the personalized score for a topic identifier and the personalized score for each article is described in the above-incorporated U.S. patent application Ser. No. 15/273,943.

For a non-leaf node, the score also accounts for the scores of the progeny of the non-leaf node. In some embodiments, the process 2300 computes the score for each non-leaf node as:

$$\text{Non-Leaf Node Score} = [\text{Sum\_Scores\_Progeny\_Nodes} + (\text{Average\_Personalized\_Article\_Score} + \text{Personalized\_Group\_Score})/2]/(\text{Number\_of\_Progeny}+1),$$

where Sum_Scores_Progeny_Nodes is the sum of the scores of each of the non-leaf node's progeny nodes, and Number_of_Progeny is the number of nodes that are the non-leaf node's progeny nodes. This equation essentially averages the non-leaf node's score with the scores of its progeny nodes. To compute these scores, the process 2300 starts by computing the scores of the leaf nodes and then moves upwards to compute the scores for the rest of the nodes.

After computing (2320) the scores for the nodes in the graph, the process then identifies (at 2325) the leaf node with the best score and amplifies the score of this node and each of node that is an ancestor of this node. This is done because the process wants to ensure that operations 2330-2340 identify the highest scoring leaf node as the first node in the node order that the process 2300 produces. Section 2410 of FIG. 24B illustrates the graph 2465 after the scores along branch 2430 have been amplified as the leaf node 2400a of this branch was the highest scoring node.

Next, at 2330, the process starts a recursive process in which the root node in the graph starts to direct its child nodes to identify a sequence of node identifiers of their progeny nodes. Hence, at 2330, the root node identifies its highest scoring child node and directs it to generate an ordered sequence of node identifies for its progeny nodes based on the scores of these nodes. This child node then recursively directs its highest scoring child node (assuming that it has one) to generate an order of its progeny nodes based on their scores. These recursive calls are made until the highest scoring leaf node is reached, which returns its own identity. The parent of the highest scoring leaf node then recursively calls its other child nodes (assuming that it has such other child nodes).

Once the parent of the highest scoring leaf node has called each of its child nodes and received their response, it places the node identifier orders that it received from its child nodes in the aggregated order according to the sequence in which it called its child nodes, and then places its own identifier at the end of this aggregated order, and then returns this aggregated order. These recursive calls continue (with each parent node successively calling its child nodes according to their scores and returning an aggregate ordered sequence after receiving responses from all its child nodes) until the root node's highest scoring child node returns the ordered list of its progeny nodes. Section 2412 of FIG. 24C illustrates the graph 2465 after the root node has received the ordered sequence of node identifiers for the branch 2430 that contains the highest scoring leaf node 2400c.

After receiving the response from its highest scoring child node, the root node then determines (at 2335) whether it has examined all of its child nodes. If not, the root node then directs its next highest scoring child node to generate an ordered sequence of node identifiers for its progeny nodes based on the scores of these nodes. The process 2300 loops through 2335 and 2340 until the root node calls each of its child nodes and receives the ordered sequence of node identifiers from each of its child nodes. When the process determines (at 2335) that it has processed all the child nodes of the root node, it replaces (at 2345) any merged node's identifier with the identifier of the nodes that the merged node replaced, and then ends.

Figure 24C:
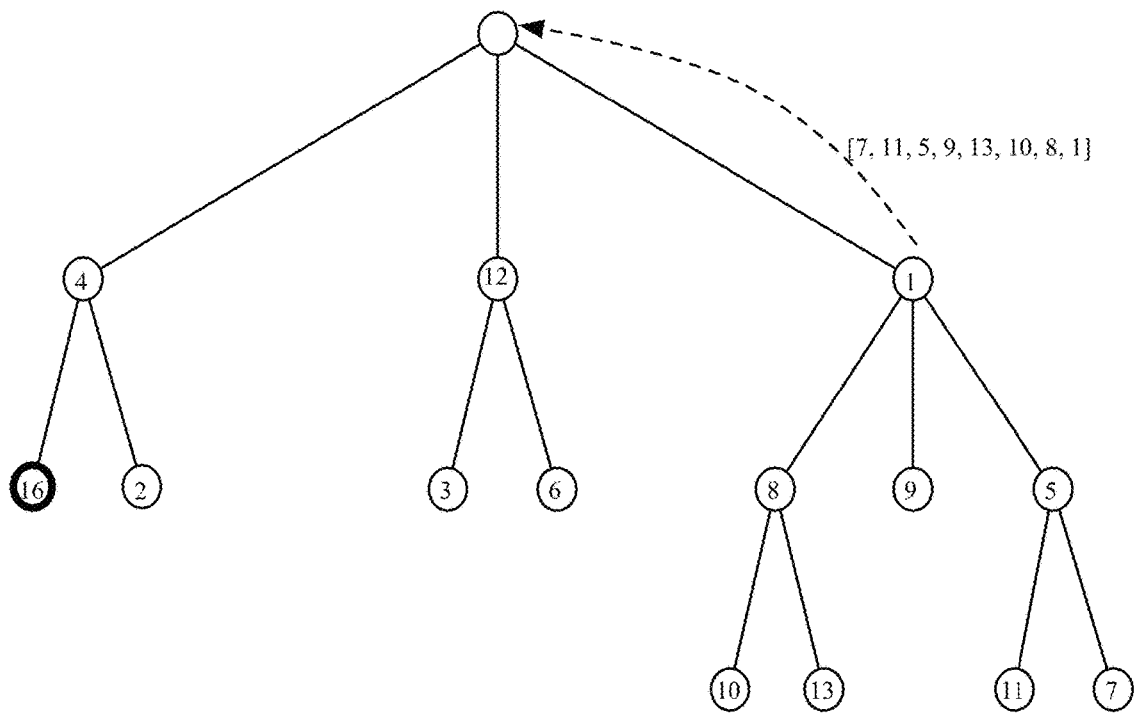
Figure 24C:
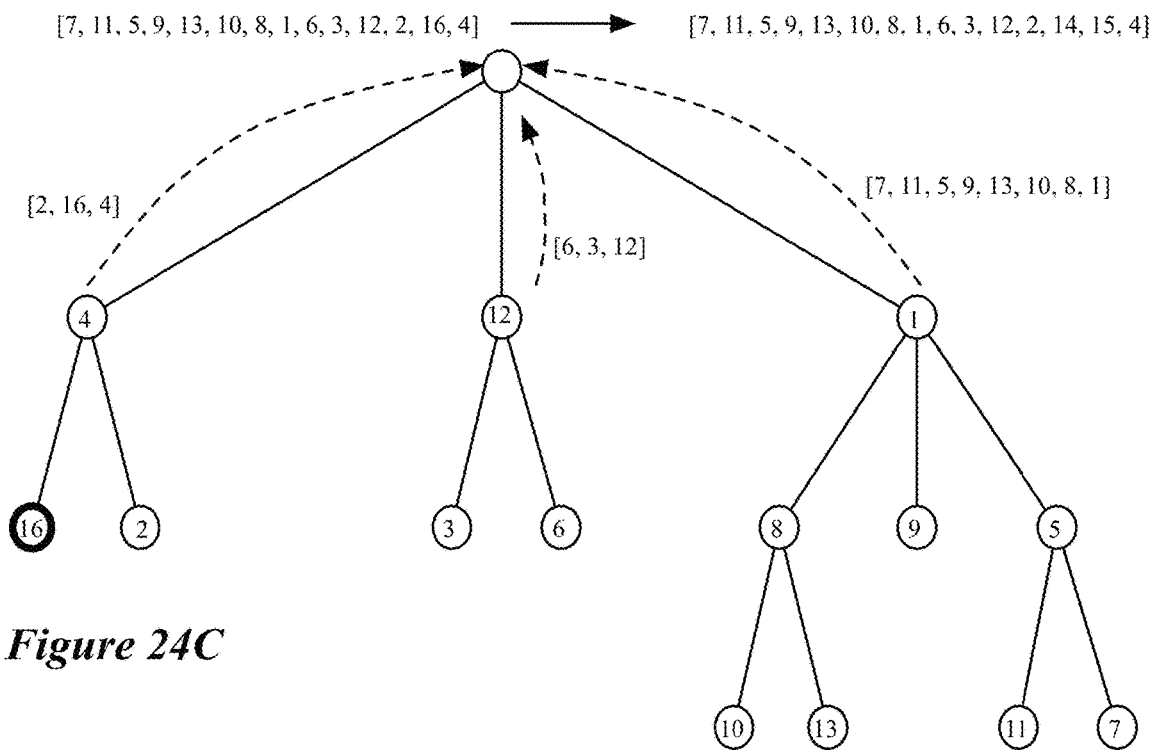
Figure 25:
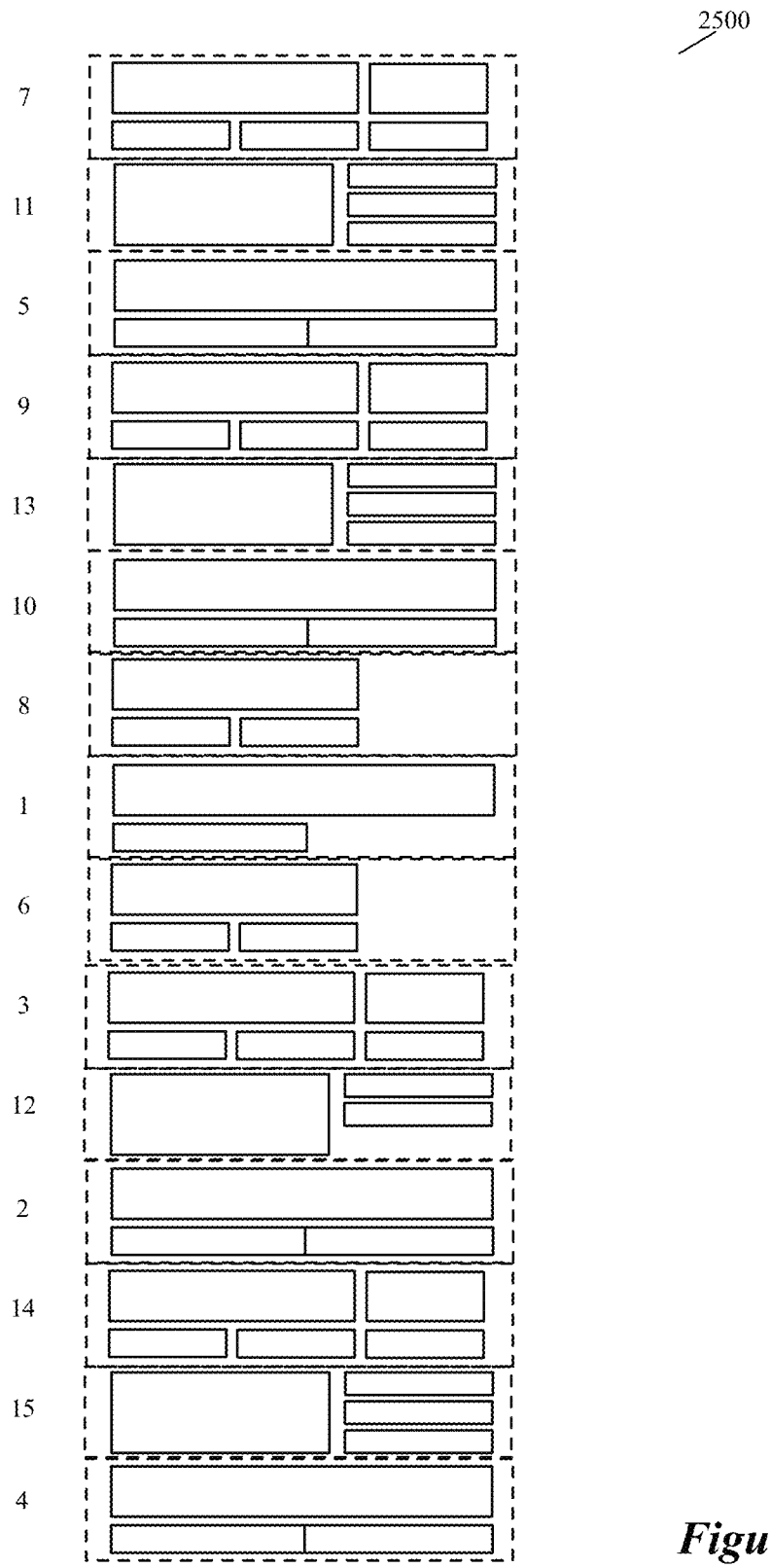
FIGS. 25 and 26 illustrate examples of feed layout pages generated according to the grouping order of the example of FIGS. 24A-C.
Figure 26:
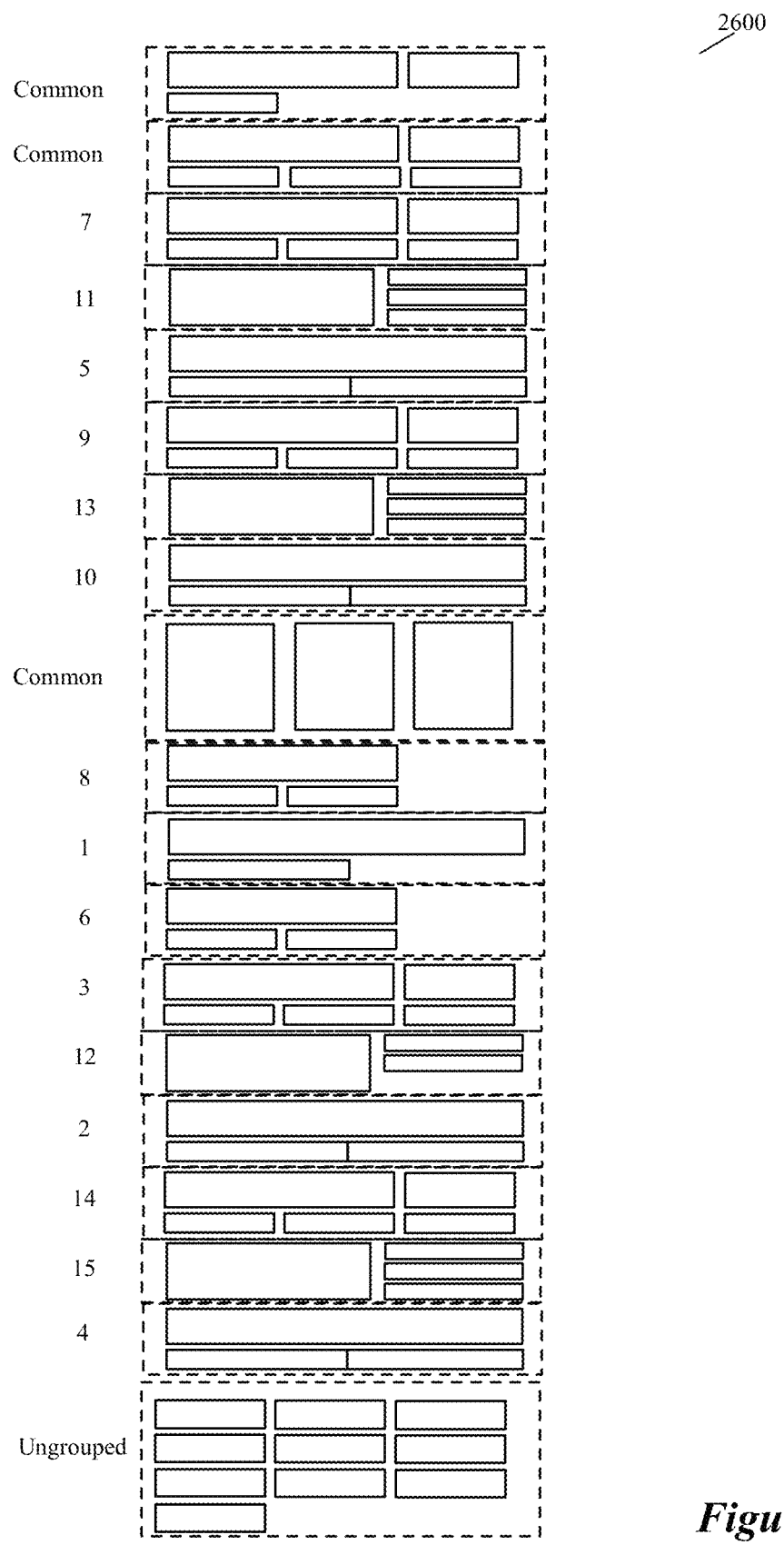

Section 2414 of FIG. 24C illustrates the graph 2465 after the root node has received the ordered sequence of node identifiers for all of its child nodes. This ordered sequence provides the following list of node identifiers: 7, 11, 5, 9, 13, 10, 8, 1, 6, 3, 12, 2, 16 and 4. Node 16 is the merged node. Hence, its identifier is replaced by the identifiers of the nodes 14 and 15 that it replaced. After this change, the list of node identifiers will be 7, 11, 5, 9, 13, 10, 8, 1, 6, 3, 12, 2, 14, 15 and 4. The reader then generates the feed layout page so that the sections for the groups follows this order as indicated by the feed layout page 2500 of FIG. 25. As mentioned above, the feed layout page might include common content or ungrouped content which the reader places before, between or after the grouped sections. FIG. 26 illustrates an example of a feed layout page 2600 with common content placed before and between the grouped sections, and an ungrouped section placed after the grouped sections, where the grouped sections have their relative arrangement specified based on the ordered sequence of node identifiers depicted in the section 2414 of FIG. 24C.

Figure 27:
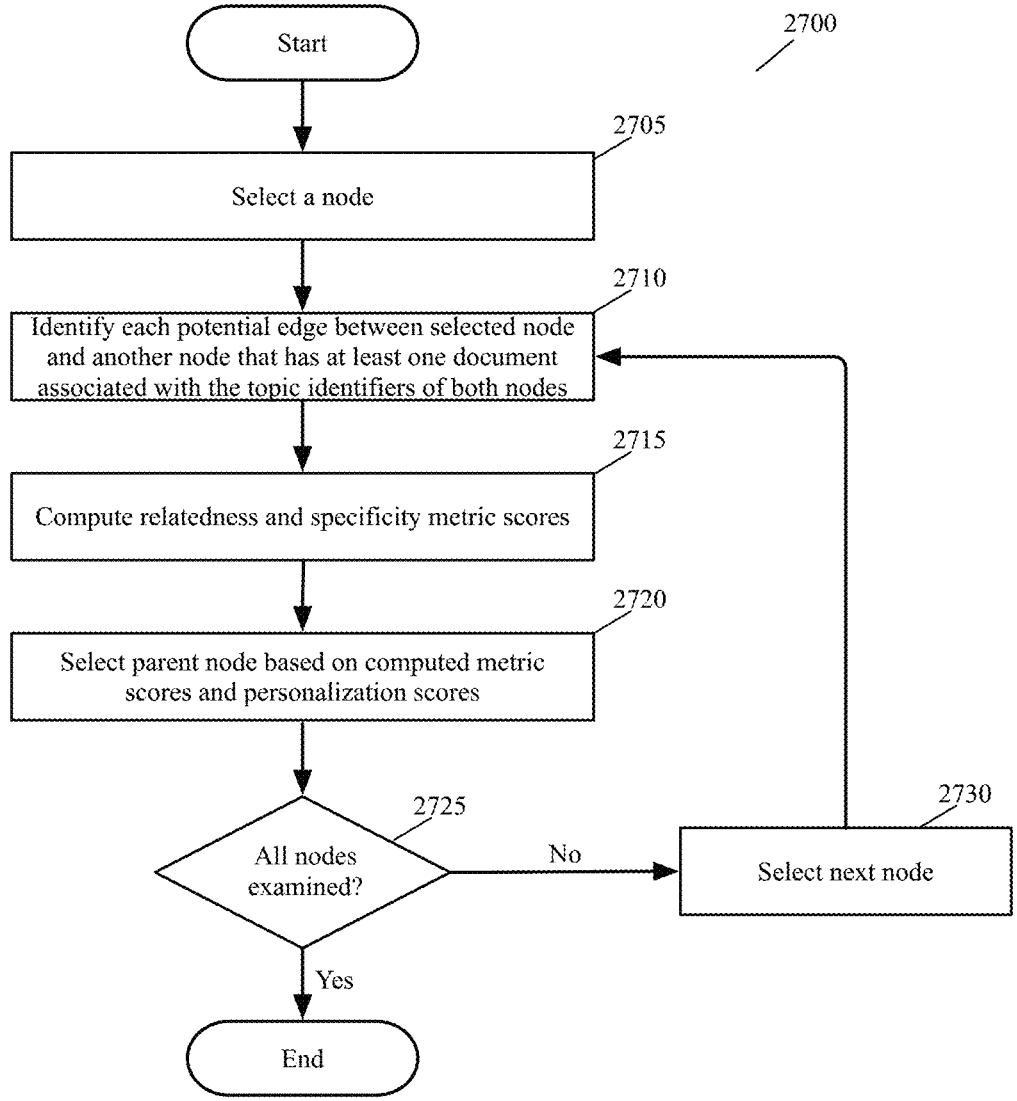
FIG. 27 illustrates a process that constructs a graph for a defined set of group nodes by assessing the parent-child relationships between the defined nodes based on the usage of the group topic identifiers by all the retrieved documents.

FIG. 27 illustrates a process 2700 that the process 2300 of some embodiments uses (at 2315) to construct a graph for a defined set of group nodes by assessing the parent-child relationships between the defined nodes based on the usage of the group topic identifiers by all the documents retrieved at 2205. The process 2700 has each node that is defined for a group at 2305 evaluate other nodes to determine whether any of them would be suitable as a parent node based on usage of each node's topic identifiers by the retrieved documents. Each particular node evaluates a potential edge to another node as a potential parent node when at least one retrieved document is associated with the topic identifier of the particular node and the potential parent node.

The process 2700 initially selects (at 2705) a node for which it has to identify a parent node. This node in the discussion below is referred to as Node A. Next, the process defines (at 2710) an edge between the selected node A and any other node when at least one of the retrieved documents is associated with the topic identifiers of both nodes. Specifically, the process defines a directed edge from node B representing topic B to node A representing topic A when at least one retrieved document is associated with the tags A and B for topics A and B.

Figure 28:
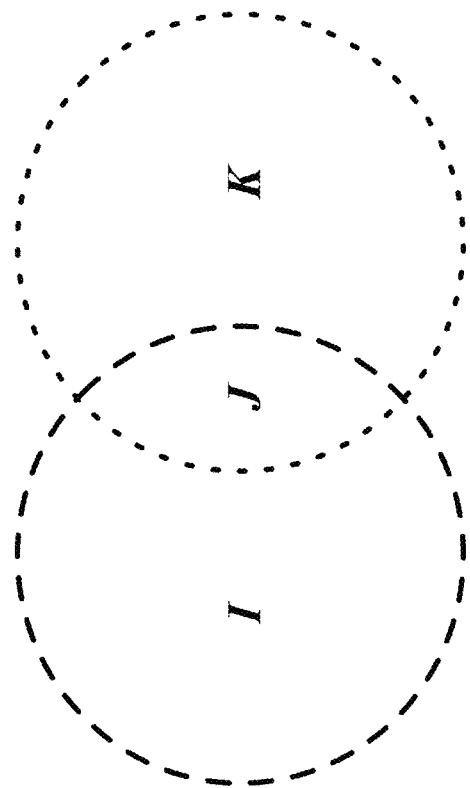
FIG. 28 illustrates a Venn diagram that illustrates the variables used in the computation of relatedness metrics of some embodiments.

In some embodiments, the process 2700 assigns (at 2710) the following three values to an edge between nodes A and B: (1) I, which is the number of retrieved documents mentioning topic A but not topic B, (2) J, which is the number of retrieved documents mentioning topic A and topic B, and (3) K, which is the number of retrieved documents mentioning topic B but not topic A. FIG. 28 illustrates that these 3 values together represent a Venn diagram of all the articles mentioning topic A or topic B. To ascertain parent-child relationship between the nodes, an edge is only worth considering if J>0, otherwise these two topics share nothing in common. Hence, no edge is defined (at 2710) when two nodes do not both include at least one article that mentions the grouping topics of each of the nodes.

For the selected node A, the process might identify (at 2710) several edges to several potential parent nodes. Hence, for the selected node, the process computes (at 2715) a relatedness value and a specificity value for each edge identified for that node. The relatedness value in some embodiments is defined as:

$$RV = \frac{J}{(I + J + 0.1 * \sqrt{K})},$$

while the specificity value is defined as $$SV = \frac{J}{(J+K)}.$$

Because the variable K (the number of articles unique to topic B) is first square rooted and then multiplied by a multiplier 0.1, the influence of this variable is dampened in the computation of the relatedness value (RV). As such, the relatedness value is largely defined by the ratio between the number of retrieved articles that are associated with both topics A and B, and the number of retrieved articles that are associated with topic A. Conversely, the specificity value (SV) expresses the ratio between the number of retrieved articles that are associated with both topics A and B, and the number of retrieved articles that are associated with topic B. Hence, the specificity value is lower when there are more articles that are associated with topic B but not topic A. When there are more articles that are associated with topic B but not topic A, the relatedness value is also lower, but this value is influenced more when there are unique articles for topic A (i.e., when there are more articles that are associated with topic A but not topic B).

Based on the relatedness and specificity values, the process 2700 then selects (at 2720) a parent node for the selected node A. The process 2700 is designed in some embodiments to maximize relatedness above a certain value. Hence, it rejects relatedness if it has a value below a threshold value (e.g., 0.7). When one identified particular edge for the selected node A has a relatedness value (RV) greater than the threshold value and greater than the other identified edges, the process selects this particular edge as the edge to the parent node B of the selected node A. However, when the largest relatedness value (above the threshold) is shared by two or more identified edges, the process selects the edge with the greater specificity value if one of the edges has a greater specificity value than the other edges.

If two or more edges with the best relatedness values also have identical specificity values, the process uses the personalization score of the nodes. If node A has a higher personalization score then node B, the edge is accepted. If nodes A and B happen to have identical personalization score also, the process falls back to comparing them alphabetically (e.g., the edge is accepted when the topic identifier for node B is alphabetically before the topic identifier for node A, the edge is accepted; otherwise, it is rejected) as its selection must be deterministic.

After identifying one of the edges as the edge to the parent of selected node A, the process determines (at 2725) whether it has identified a parent node for all the nodes (i.e., whether it has examined all the non-root nodes). If not, it selects another node A, and returns to 2710 to repeat its operations 2710-2720 for this newly selected node. When the process determines that it has identified a parent node for all nodes, it ends.

Figure 29:
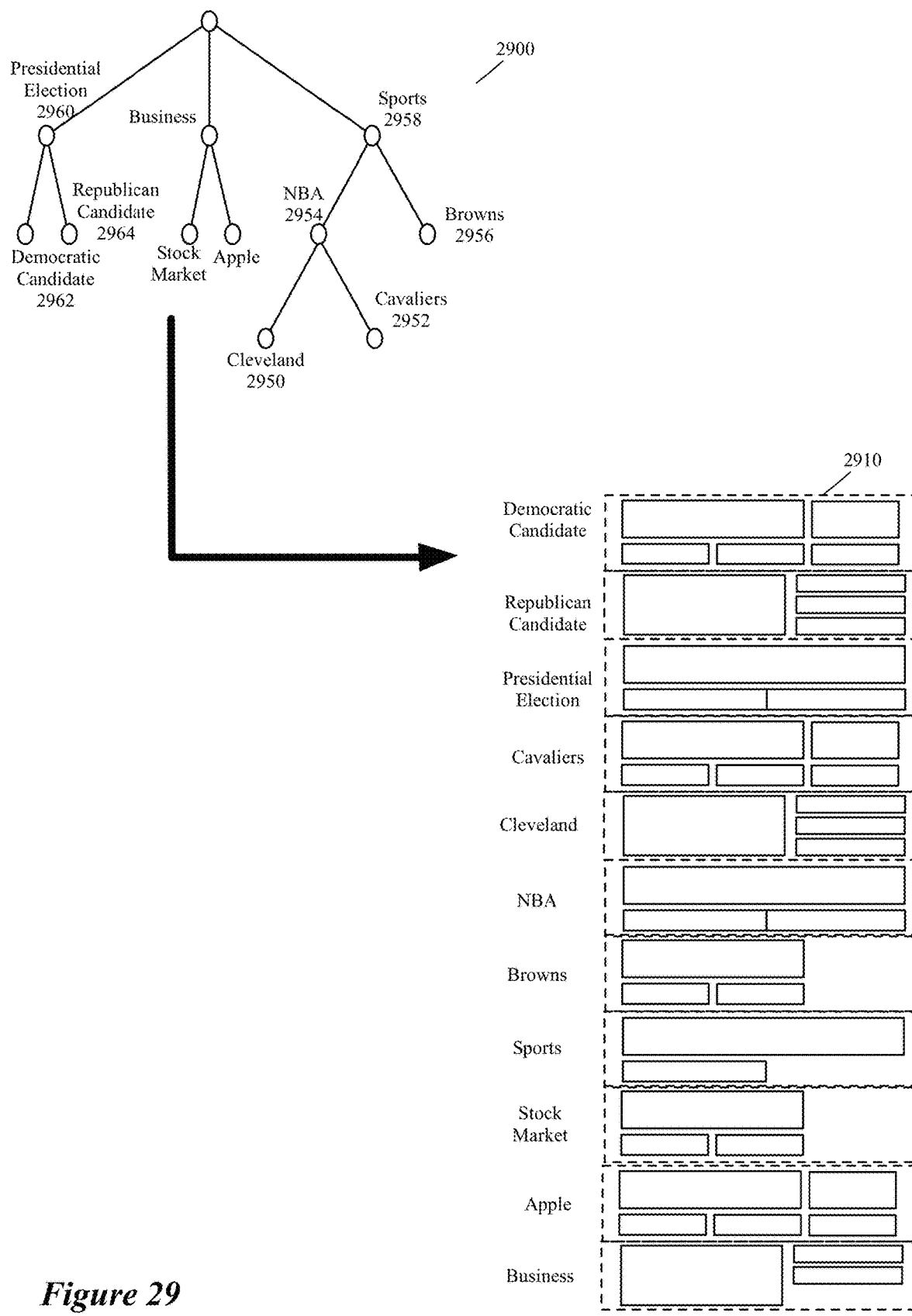
FIGS. 29 and 30 present two examples that illustrate some embodiments dynamically define parent-child relationships between group topic identifiers differently at different times based on different data that reflects the news events in different news cycles.
Figure 30:
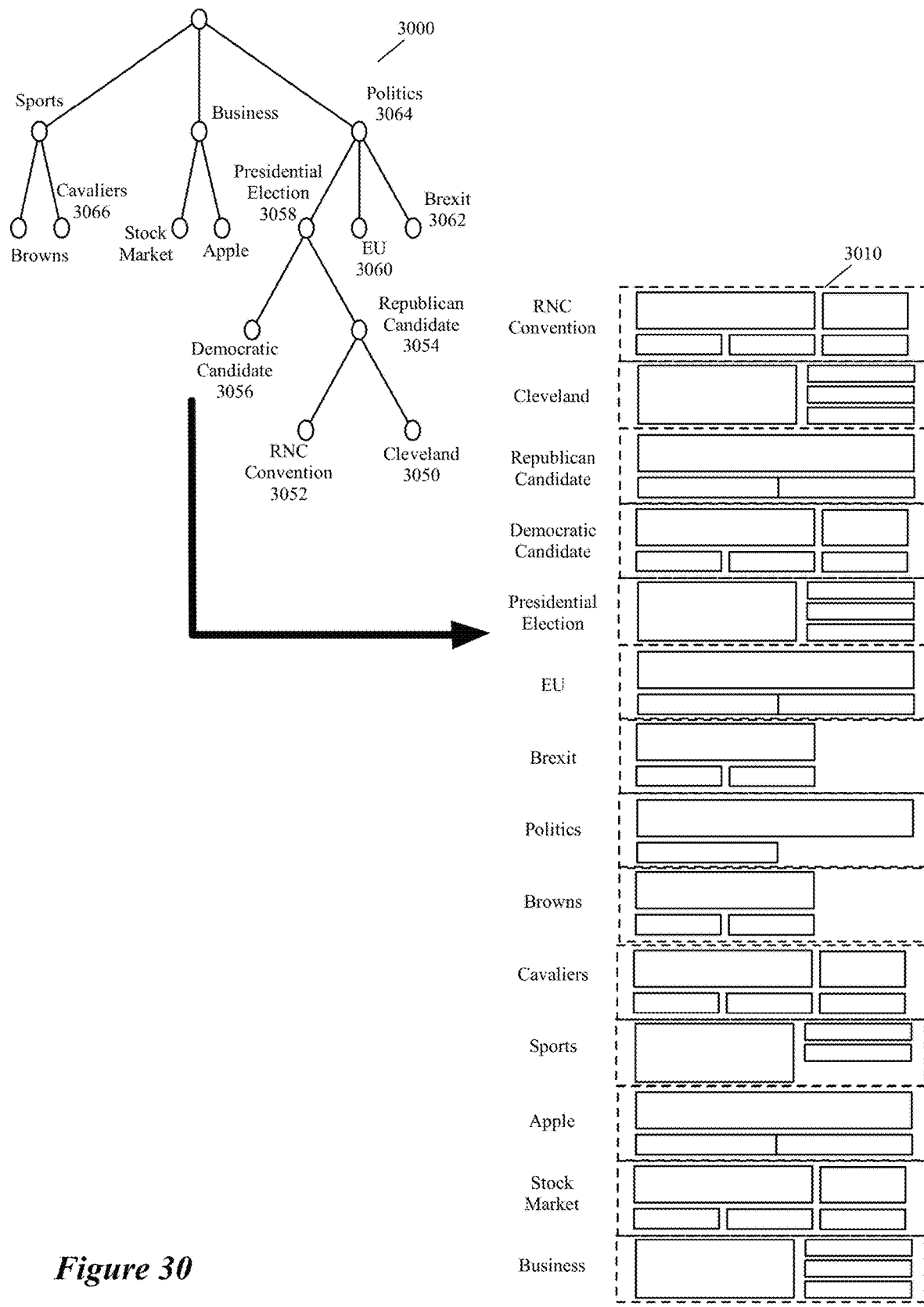

As mentioned above, the process 2300 in some embodiments builds the parent-child relationships by using, for the real-time dynamic data, the group topic identifiers as they are used by all the retrieved documents. By using the association between the group topic identifiers and the retrieved documents, the process 2300 establishes the parent-child relationships based on the current usage and prevalence of the topic identifiers, which can be indicative of current events when the documents relate to current events. FIGS. 29 and 30 present two examples that illustrate how the process 2300 can dynamically define parent-child relationships between group topic identifiers differently at different times based on different data that reflects the news events in different news cycles.

These two figures illustrate two different node graphs 2900 and 3000 that represent two different topic-identifier hierarchies that the process 2300 defines for two different news cycles. The node graph 2900 of FIG. 29 reflects a news cycle during which the Cleveland Cavaliers win the NBA championship during a year in which the presidential election is being held, while the node graph 3000 of FIG. 30 reflects a news cycle during which the Republican National Convention is held in Cleveland.

Both of these node graphs 2900 and 3000 have nodes for Cleveland and the Cavaliers, but the position of these nodes are nested differently in these two graphs. Graph 2900 nests the nodes 2950 and 2952 for Cleveland and the Cavaliers under the NBA node 2954, which it nests under the Sports node 2958 along with the Browns node 2956. On the other hand, graph 3000 nests the Cleveland node 3050 under the Republican Candidate node 3054 along with the RNC node 3052. In this graph, the Republican Candidate node 3054 and the Democratic Candidate node 3056 are child nodes of the Presidential Election node 3058, which is a child node of the Politics node 3064 along with the EU node 3060 and the Brexit node 3062. In graph 2900 of FIG. 29, the Presidential Election node 2960 also exists, but neither it nor any of its progeny nodes 2962 and 2964 are a parent of the Cleveland node 2950. Also, while the nodes 2950 and 2952 for Cleveland and Cavaliers are sibling child nodes of the Sports node, these two nodes 3050 and 3066 are not sibling nodes in the node graph 3000. This is because Cleveland node 2950 is part of the Sports branch of the graph 2900 of FIG. 29, while the Cleveland node 3050 is part of the Politics branch of the graph 3000 of FIG. 30.

FIGS. 29 and 30 also illustrate that their different node graphs 2900 and 3000 result in different layouts of the article summary pages 2910 and 3010. In the article layout 2900, the Cleveland section appears in a group of the Sports related sections (i.e., in the group of sections that include sections for the Cavaliers, Cleveland, NBA, Browns, Sports). On the other hand, in the article layout 3000, the Cleveland section appears in a group of the Politics related sections (i.e., in the group of sections that include sections for the RNC, Cleveland, Republican Candidate, Democratic Candidate, Presidential Election, EU, Brexit, Politics). Also, while the sections for Cleveland and Cavaliers appears next to each other in the article summary page 2910, the sections for these two topics do not appear next to each other in the article summary page 3010.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 31:
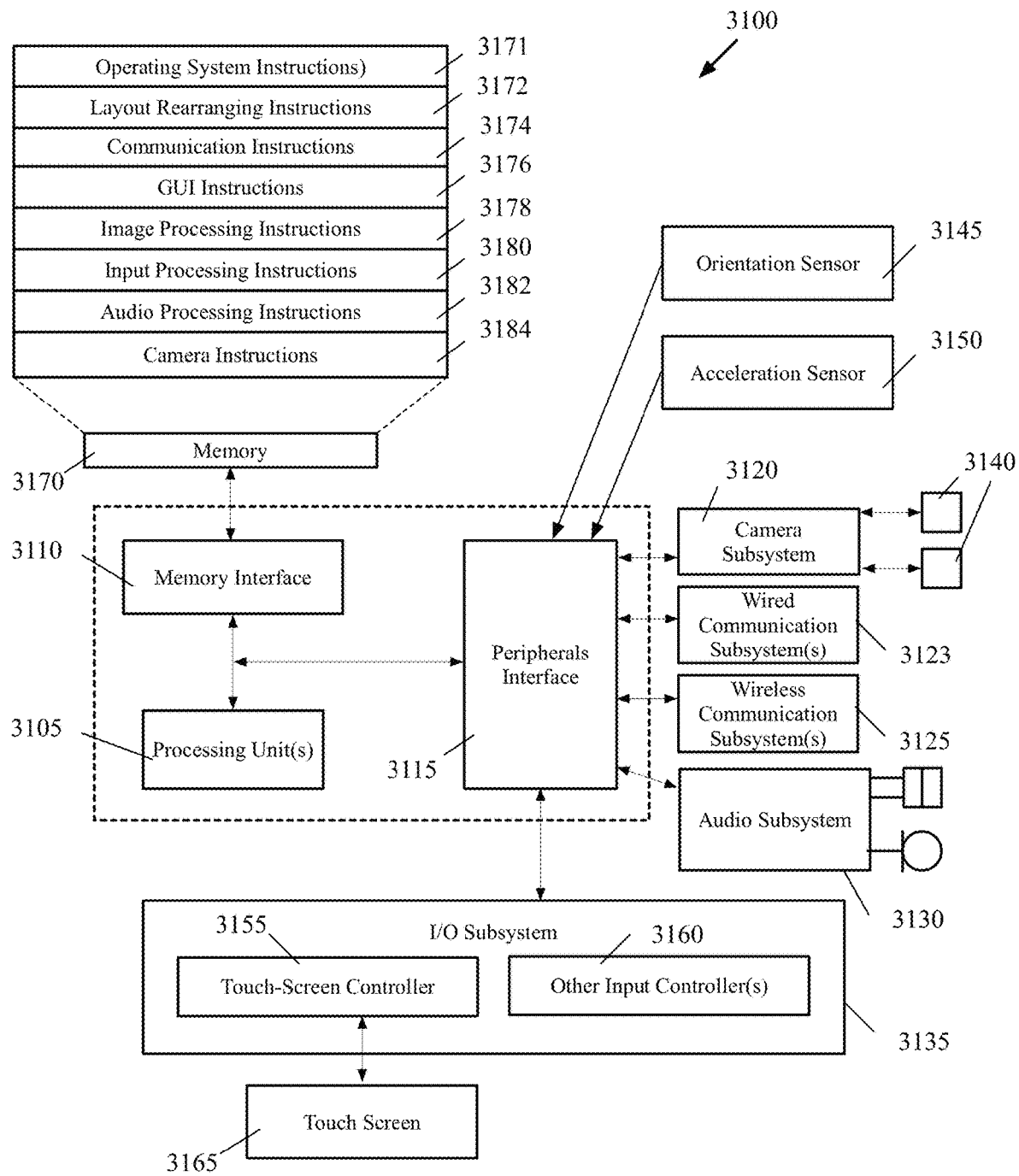
FIG. 31 illustrates an example of an architecture of a mobile computing device with which some embodiments are implemented.

The user data sharing of some embodiments occurs on mobile devices, such as smart phones (e.g., iPhones®) and tablets (e.g., iPads®). FIG. 31 is an example of an architecture 3100 of such a mobile computing device. As shown, the mobile computing device 3100 includes one or more processing units 3105, a memory interface 3110 and a peripherals interface 3115.

The peripherals interface 3115 is coupled to various sensors and subsystems, including a camera subsystem 3120, a wired communication subsystem(s) 3123, a wireless communication subsystem(s) 3125, an audio subsystem 3130, an I/O subsystem 3135, etc. The peripherals interface 3115 enables communication between the processing units 3105 and various peripherals. For example, an orientation sensor 3145 (e.g., a gyroscope) and an acceleration sensor 3150 (e.g., an accelerometer) is coupled to the peripherals interface 3115 to facilitate orientation and acceleration functions.

The camera subsystem 3120 is coupled to one or more optical sensors 3140 (e.g., a charged coupled device (CCD) optical sensor, a complementary metal-oxide-semiconductor (CMOS) optical sensor, etc.). The camera subsystem 3120 coupled with the optical sensors 3140 facilitates camera functions, such as image and/or video data capturing. The wired communication subsystem 3123 and wireless communication subsystem 3125 serve to facilitate communication functions.

In some embodiments, the wireless communication subsystem 3125 includes radio frequency receivers and transmitters, and optical receivers and transmitters (not shown in FIG. 31). These receivers and transmitters of some embodiments are implemented to operate over one or more communication networks such as a GSM network, a Wi-Fi network, a Bluetooth network, etc. The audio subsystem 3130 is coupled to a speaker to output audio (e.g., to output voice navigation instructions). Additionally, the audio subsystem 3130 is coupled to a microphone to facilitate voice-enabled functions in some embodiments.

The I/O subsystem 3135 involves the transfer between input/output peripheral devices, such as a display, a touch screen, etc., and the data bus of the processing units 3105 through the peripherals interface 3115. The I/O subsystem 3135 includes a touch-screen controller 3155 and other input controllers 3160 to facilitate the transfer between input/output peripheral devices and the data bus of the processing units 3105. As shown, the touch-screen controller 3155 is coupled to a touch screen 3165. The touch-screen controller 3155 detects contact and movement on the touch screen 3165 using any of multiple touch sensitivity technologies. The other input controllers 3160 are coupled to other input/control devices, such as one or more buttons. Some embodiments include a near-touch sensitive screen and a corresponding controller that can detect near-touch interactions instead of or in addition to touch interactions.

The memory interface 3110 is coupled to memory 3170. In some embodiments, the memory 3170 includes volatile memory (e.g., high-speed random access memory), non-volatile memory (e.g., flash memory), a combination of volatile and non-volatile memory, and/or any other type of memory. As illustrated in FIG. 31, the memory 3170 stores an operating system (OS) 3171. The OS 3171 includes instructions for handling basic system services and for performing hardware dependent tasks. The memory 3170 additionally includes layout rearranging instructions 3172 in order for the device 3100 to perform the layout rearranging process of some embodiments. In some embodiments, these instructions 3172 may be a subset of the operating system instructions 3171, or may be part of the instructions for an application.

The memory 3170 also includes communication instructions 3174 to facilitate communicating with one or more additional devices (e.g., for peer-to-peer data sharing, or to connect to a server through the Internet for cloud-based data sharing); graphical user interface instructions 3176 to facilitate graphic user interface processing; image processing instructions 3178 to facilitate image-related processing and functions; input processing instructions 3180 to facilitate input-related (e.g., touch input) processes and functions; audio processing instructions 3182 to facilitate audio-related processes and functions; and camera instructions 3184 to facilitate camera-related processes and functions. The instructions described above are merely exemplary and the memory 3170 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 31 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 31 may be split into two or more integrated circuits.

B. Computer System

Figure 32:
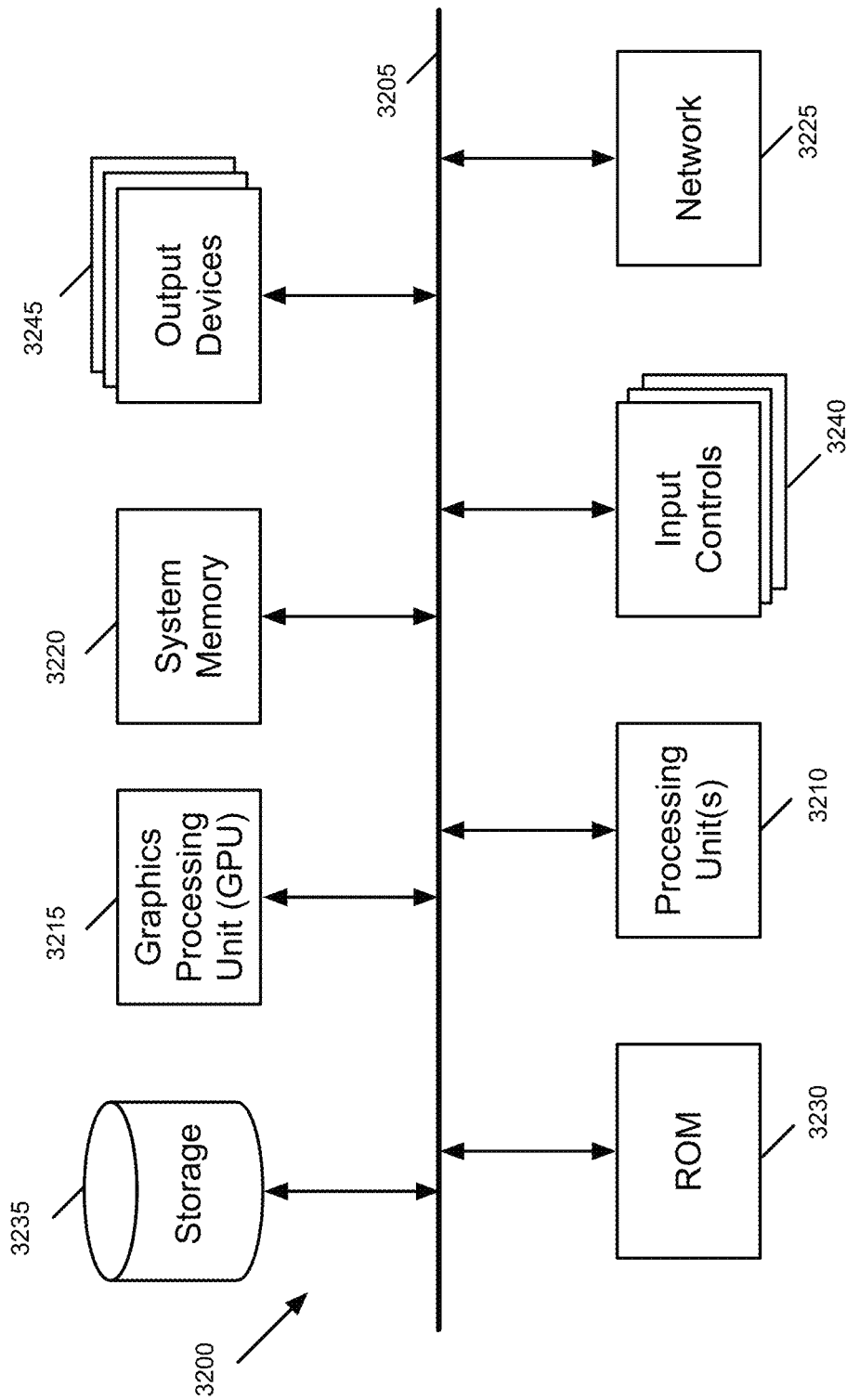
FIG. 32 conceptually illustrates another example of an electronic system with which some embodiments of the invention are implemented.

FIG. 32 conceptually illustrates another example of an electronic system 3200 with which some embodiments of the invention are implemented. The electronic system 3200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 3200 includes a bus 3205, processing unit(s) 3210, a graphics processing unit (GPU) 3215, a system memory 3220, a network 3225, a read-only memory 3230, a permanent storage device 3235, input devices 3240, and output devices 3245.

The bus 3205 collectively represents all system, peripheral, and chipset buses that communicatively connect the numerous internal devices of the electronic system 3200. For instance, the bus 3205 communicatively connects the processing unit(s) 3210 with the read-only memory 3230, the GPU 3215, the system memory 3220, and the permanent storage device 3235.

From these various memory units, the processing unit(s) 3210 retrieves instructions to execute and data to process in order to execute the processes of the invention. The processing unit(s) may be a single processor or a multi-core processor in different embodiments. Some instructions are passed to and executed by the GPU 3215. The GPU 3215 can offload various computations or complement the image processing provided by the processing unit(s) 3210. In some embodiments, such functionality can be provided using CoreImage's kernel shading language.

The read-only-memory (ROM) 3230 stores static data and instructions that are needed by the processing unit(s) 3210 and other modules of the electronic system. The permanent storage device 3235, on the other hand, is a read-and-write memory device. This device is a non-volatile memory unit that stores instructions and data even when the electronic system 3200 is off. Some embodiments of the invention use a mass-storage device (such as a magnetic or optical disk and its corresponding disk drive, integrated flash memory) as the permanent storage device 3235.

Other embodiments use a removable storage device (such as a floppy disk, flash memory device, etc., and its corresponding drive) as the permanent storage device. Like the permanent storage device 3235, the system memory 3220 is a read-and-write memory device. However, unlike storage device 3235, the system memory 3220 is a volatile read-and-write memory, such a random access memory. The system memory 3220 stores some of the instructions and data that the processor needs at runtime. In some embodiments, the invention's processes are stored in the system memory 3220, the permanent storage device 3235, and/or the read-only memory 3230. For example, the various memory units include instructions for processing multimedia clips in accordance with some embodiments. From these various memory units, the processing unit(s) 3210 retrieves instructions to execute and data to process in order to execute the processes of some embodiments.

The bus 3205 also connects to the input and output devices 3240 and 3245. The input devices 3240 enable the user to communicate information and select commands to the electronic system. The input devices 3240 include alphanumeric keyboards and pointing devices (also called "cursor control devices"), cameras (e.g., webcams), microphones or similar devices for receiving voice commands, etc. The output devices 3245 display images generated by the electronic system or otherwise output data. The output devices 3245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 32, bus 3205 also couples electronic system 3200 to a network 3225 through a network adapter (not shown). In this manner, the computer can be a part of a network of computers (such as a local area network ("LAN"), a wide area network ("WAN"), or an Intranet), or a network of networks, such as the Internet. Any or all components of electronic system 3200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 7, 8, 14, 16, 22, 23, and 27) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for displaying documents on a device, the method comprising:
   at the device:
   receiving a plurality of documents, without a presentation grouping, from one or more servers, each document assigned one or more tags indicating relevancy to a topic;
   identifying, from the one or more tags, one or more groupable tags that define potential groups to assign the plurality of documents to, the one or more groupable tags comprising a subset of a set of the one or more groupable tags that are associated with a minimum groupable number of the plurality of documents;
   identifying presentation groups from the potential groups based upon characteristics of the plurality of documents, by, iteratively:
   for each potential group of the potential groups, identifying a number of ungrouped documents that would exist if the potential group were selected as a presentation group, the ungrouped documents comprising a subset of the plurality of documents that would not group with any potential groups;
   identifying a top group of the potential groups having a fewest number of ungrouped documents;
   selecting the top group of the potential groups as a presentation group of the presentation groups; and
   dynamically assigning a corresponding subset of the plurality of documents to the presentation group of the presentation groups, removing the corresponding subset of the plurality of documents for assignment in subsequent iterations; and
   displaying at least a portion of the plurality of documents on the device arranged according to their assigned presentation groups.

2. The method of claim 1, wherein the plurality of documents received from the one or more servers are based on preferences of a user of the device.

3. The method of claim 1, wherein identifying the one or more groupable tags comprises identifying particular tags of the one more tags that match a set of tags indicated in a whitelist, wherein the set of tags on the whitelist are designated as high-level topic tags.

4. The method of claim 3, wherein the set of tags on the whitelist are received from the one or more servers.

5. The method of claim 1, comprising identifying a first presentation group of the presentation groups for a first groupable tag of the one or more groupable tags by selecting a first potential group from a plurality of potential groups for the first groupable tag based on a move-order heuristic that minimizes a number documents of the plurality of documents associated with the first groupable tag that will not be assigned to a presentation group if a potential group of the plurality of potential groups is selected as the first presentation group.

6. The method of claim 1, wherein receiving the plurality of documents comprises:
   selecting a first plurality of documents to be included in the potential groups, wherein the first plurality of documents comprises a predefined percentage of the plurality of documents.

7. The method of claim 1, wherein a set of documents assigned to a first potential group affects the one or more groupable tags selected for a second potential group.

8. The method of claim 1, comprising assigning the plurality of documents to the potential groups by:
   selecting a first groupable tag of the one or more groupable tags for a first potential group based on a first criteria; and
   assigning a first subset of the plurality of documents, to which the first groupable tag is assigned, to the first potential group based on a second set of criteria.

9. The method of claim 1, comprising:
   selecting a first groupable tag of the one or more groupable tags according to a first set of grouping criteria;
   assigning documents of the plurality of documents having the first selected tag to a first set of one or more potential groups of documents;
   selecting a first potential group of the first set of potential groups according to a second set of grouping criteria;
   assigning documents of the first selected potential group to a first presentation group;
   removing the documents in the selected potential group of documents and the first groupable tag from future consideration for being included in future potential groups of the plurality of documents;
   selecting a second groupable tag from one or more tags according to the first set of grouping criteria;
   assigning documents of the plurality of documents having the second selected groupable tag to a second set of one or more potential groups of documents;
   selecting a second potential group of the set of second potential groups according to the second set of grouping criteria; and
   assigning documents of the second selected potential group to a second presentation group.

10. The method of claim 9, wherein: the first set of grouping criteria comprises a first number of documents having a selected groupable tag and a second number of documents for which a selected groupable tag is the only tag a document has that can be used to form a potential group; and
   the second set of grouping criteria comprises a third number of documents having a selected groupable tag that will not be included in a presentation group.

11. A non-transitory machine readable medium storing a program which when executed by a set of processing units of a device displays documents on the device, the program comprising sets of instructions for:
   receiving a plurality of documents, without a presentation grouping, from one or more servers, each document assigned one or more tags indicating relevancy to a topic;
   identifying, from the one or more tags, one or more groupable tags that define potential groups to assign the plurality of documents to, the one or more groupable tags comprising a subset of a set of the one or more groupable tags that are associated with a minimum groupable number of the plurality of documents;
   identifying presentation groups from the potential groups based upon characteristics of the plurality of documents, by, iteratively:
   for each potential group of the potential groups, identifying a number of ungrouped documents that would exist if the potential group were selected as a presentation group, the ungrouped documents comprising a subset of the plurality of documents that would not group with any potential groups;
   identifying a top group of the potential groups having a fewest number of ungrouped documents;

selecting the top group of the potential groups as a presentation group of the presentation groups; and dynamically assigning a corresponding subset of the plurality of documents to the presentation group of the presentation groups, removing the corresponding subset of the plurality of documents for assignment in subsequent iterations; and displaying at least a portion of the plurality of documents on the device arranged according to their assigned presentation groups.

12. The non-transitory machine readable medium of claim 11, wherein the set of instructions for dynamically assigning the plurality of documents to the presentation groups comprises sets of instructions for:

computing a first assignment of the plurality of documents to a first set of the potential groups;

determining whether a display has been scrolled to view a first set of the presentation groups of documents; and when a user of the device has not yet scrolled the display to view the first set of the presentation groups, computing a second assignment of the plurality of documents to a second set of the potential groups.

13. The non-transitory machine readable medium of claim 12, wherein the set of instructions for displaying the documents arranged according to the presentation groups comprises a set of instructions for determining whether to include documents of the first set of the potential groups or documents of the second set of the potential groups in the first set of the presentation groups according to a set of grouping criteria, wherein the grouping criteria comprises a maximum number of documents that will be part of a potential group when its groupable tag is selected as the tag of the one more groupable tags.

14. The non-transitory machine readable medium of claim 13, wherein the set of grouping criteria measures a number of the documents that are not assigned to any of the potential groups.

15. The non-transitory machine readable medium of claim 12, wherein, when the first assignment of the plurality of documents to the first set of potential groups and the second assignment of the plurality of documents to the second set of the potential groups use varying amounts of time, and the second assignment of the plurality of documents to the second set of the potential groups uses more time to explore more possible groups for each of a set of the groupable tags than the first assignment of the plurality of documents to the first set of the potential groups.

16. The non-transitory machine readable medium of claim 12, wherein the set of instructions for displaying the documents comprises a set of instructions for displaying a set of content designated as curated content above the grouped documents, wherein the set of instructions for determining whether the user has scrolled to view the first set of the presentation groups comprises a set of instructions for determining whether the user has scrolled past the curated content.

17. The non-transitory machine readable medium of claim 16, wherein the set of curated content comprises a set of top documents displayed in a display area designated for the set of top documents that are sent from the one or more servers to a plurality of devices of different users.

18. The non-transitory machine readable medium of claim 11, wherein a subset of the plurality of documents are not assigned to any of the presentation groups.

19. The non-transitory machine readable medium of claim 18, wherein the program further comprises a set of instructions for displaying the subset of the documents not assigned to any of the presentation groups after a final presentation group of the assigned presentation groups is displayed.

20. The non-transitory machine readable medium of claim 11, wherein the program further comprises a set of instructions for identifying a first set of potential groups for a first groupable tag of the one or more groupable tags based on a branching factor indicative of a number of potential groups to be included in the first set of potential groups.

* * * * *